(12) United States Patent
Sisto

(10) Patent No.: US 11,412,850 B2
(45) Date of Patent: Aug. 16, 2022

(54) FLOATING SHELF APPARATUS

(71) Applicant: Salvatore Sisto, Bradley Beach, NJ (US)

(72) Inventor: Salvatore Sisto, Bradley Beach, NJ (US)

(*) Notice: Subject to any disclaimer, the term of this patent is extended or adjusted under 35 U.S.C. 154(b) by 102 days.

(21) Appl. No.: 16/834,033

(22) Filed: Mar. 30, 2020

(65) Prior Publication Data

US 2020/0221871 A1 Jul. 16, 2020

Related U.S. Application Data

(63) Continuation-in-part of application No. 16/220,435, filed on Dec. 14, 2018, now Pat. No. 11,067,218, and a continuation-in-part of application No. 16/104,046, filed on Aug. 16, 2018, now Pat. No. 10,602,843.

(60) Provisional application No. 62/648,179, filed on Mar. 26, 2018, provisional application No. 62/598,809, filed on Dec. 14, 2017, provisional application No. 62/546,402, filed on Aug. 16, 2017.

(51) Int. Cl.
| | |
|---|---|
| *A47B 96/02* | (2006.01) |
| *F16B 47/00* | (2006.01) |
| *A47B 96/06* | (2006.01) |
| *A47B 95/00* | (2006.01) |

(52) U.S. Cl.
CPC .......... *A47B 96/024* (2013.01); *A47B 95/008* (2013.01); *A47B 96/066* (2013.01); *F16B 47/003* (2013.01)

(58) Field of Classification Search
CPC ... A47B 96/024; A47B 96/066; A47B 96/067; A47B 96/027; A47B 96/061; A47B 96/008; A47B 96/06; A47B 96/028; A47B 95/008; F16B 47/003; F16B 11/006; F16B 5/0084; A47F 5/0846; A47F 5/0843; A47F 5/0853
USPC ............................................ 211/88.01, 126.5
See application file for complete search history.

(56) References Cited

U.S. PATENT DOCUMENTS

| | | |
|---|---|---|
| 2,587,912 A | 3/1952 | Simpson |
| 2,665,869 A | 1/1954 | Samuels |
| 2,754,974 A * | 7/1956 | Larson .................. A47L 13/512 |
| | | 211/70.6 |
| 2,947,093 A | 8/1960 | Masters |
| 3,337,172 A | 8/1967 | Jackson |
| 3,381,636 A | 5/1968 | Saiberlich |

(Continued)

FOREIGN PATENT DOCUMENTS

WO WO 2015/031960 3/2015

*Primary Examiner* — Patrick D Hawn
(74) *Attorney, Agent, or Firm* — Belles Katz LLC

(57) ABSTRACT

A floating shelf apparatus that includes a mounting bracket and a shelf. The mounting bracket is coupled directly to a support surface such as a wall and the shelf is mounted to the support surface to hang the shelf from the support surface. The mounting bracket includes a first portion that is coupled to the wall, a second portion having an S-shape that extends from a first end of the first portion, and a third portion having a linear shape that extends from a second end of the first portion. The shelf includes a ledge portion upon which items may be supported and a mounting portion that facilitates mounting the shelf to the mounting bracket. The mounting portion has a mounting element that interacts with the second portion of the mounting bracket to mount the shelf to the mounting bracket.

17 Claims, 54 Drawing Sheets

(56) References Cited

U.S. PATENT DOCUMENTS

| | | | |
|---|---|---|---|
| 3,437,214 A | 4/1969 | Sainsbury | |
| 3,507,082 A | 4/1970 | Heirich | |
| 3,664,622 A * | 5/1972 | Vaccaro | B65F 1/06 |
| | | | 248/95 |
| 3,669,035 A | 6/1972 | Grossman | |
| 3,675,882 A | 7/1972 | Dibble | |
| 3,704,675 A | 12/1972 | Bellasalma | |
| 3,848,843 A | 11/1974 | Levy | |
| 3,984,077 A | 10/1976 | Shine | |
| 3,989,215 A | 11/1976 | Weston | |
| 4,131,203 A | 12/1978 | Bridges | |
| 4,160,570 A | 7/1979 | Bridges | |
| 4,165,852 A | 8/1979 | Chervenak | |
| 4,215,840 A | 8/1980 | Babberl | |
| 4,311,295 A | 1/1982 | Jamar, Jr. | |
| 4,352,478 A | 10/1982 | Loew | |
| 4,381,715 A * | 5/1983 | Forman | A47B 96/066 |
| | | | 108/102 |
| 4,441,433 A | 4/1984 | Caldwell | |
| 4,457,436 A | 7/1984 | Kelley | |
| 4,669,690 A | 6/1987 | McEniry | |
| 4,691,887 A * | 9/1987 | Bessinger | A47B 96/065 |
| | | | 108/108 |
| 4,720,069 A | 1/1988 | Bessinger | |
| 4,765,575 A | 8/1988 | Bergi | |
| 4,817,538 A | 4/1989 | Michaelsen | |
| 4,825,601 A | 5/1989 | Halverson | |
| 4,843,977 A | 7/1989 | Bridges | |
| 4,886,236 A * | 12/1989 | Randall | A47B 96/022 |
| | | | 248/250 |
| 5,050,832 A | 9/1991 | Lee et al. | |
| 5,110,080 A | 5/1992 | Rieman | |
| 5,178,353 A | 1/1993 | Huxtable | |
| 5,197,703 A | 3/1993 | Pratolongo | |
| 5,303,895 A | 4/1994 | Hart | |
| 5,332,108 A | 7/1994 | Blass | |
| 5,342,014 A | 8/1994 | Wilson | |
| 5,513,575 A * | 5/1996 | Slade | A47B 96/02 |
| | | | 108/42 |
| 6,164,610 A | 12/2000 | Santiago | |
| 6,322,039 B1 * | 11/2001 | De Luccia | A47G 1/168 |
| | | | 248/222.14 |
| 6,837,384 B2 | 1/2005 | Secondino | |
| 7,225,935 B2 | 6/2007 | Breymaier et al. | |
| 7,255,236 B1 * | 8/2007 | Sauder | A47B 96/022 |
| | | | 211/135 |
| 7,540,456 B2 | 6/2009 | Thompson | |
| 7,708,252 B2 | 5/2010 | VanderBerg et al. | |
| 7,787,190 B2 | 8/2010 | Mitsuda et al. | |
| 7,802,766 B2 * | 9/2010 | Thompson | F16B 12/22 |
| | | | 248/220.1 |
| 8,020,820 B2 * | 9/2011 | Thompson | A47B 96/022 |
| | | | 248/220.1 |
| 8,042,700 B1 * | 10/2011 | Smalley | A47F 5/0807 |
| | | | 211/90.01 |
| 8,225,435 B2 * | 7/2012 | Kik, Jr. | A47K 3/282 |
| | | | 4/578.1 |
| 8,376,299 B2 | 2/2013 | Burkman | |
| 8,882,065 B2 | 11/2014 | Henriott et al. | |
| 8,998,008 B1 * | 4/2015 | Robertson | F16M 13/025 |
| | | | 211/90.01 |
| 9,163,415 B2 | 10/2015 | Nies | |
| 9,185,979 B1 | 11/2015 | Jenks et al. | |
| 9,521,915 B1 | 12/2016 | Tanger et al. | |
| 9,668,576 B2 | 6/2017 | Trunkle | |
| 10,028,483 B1 * | 7/2018 | Dahl | A01K 5/01 |
| 10,264,883 B2 * | 4/2019 | Stefenack | A47B 96/022 |
| 10,412,929 B2 * | 9/2019 | Kasper | A01K 7/005 |
| 10,480,710 B2 * | 11/2019 | Thompson | A47K 5/04 |
| 10,524,452 B2 * | 1/2020 | Feldman | A47B 57/04 |
| 10,602,843 B2 * | 3/2020 | Sisto | F16B 11/006 |
| 10,932,441 B2 * | 3/2021 | Martino | A01K 1/035 |
| 11,067,218 B2 * | 7/2021 | Sisto | A47B 96/061 |
| 2002/0125389 A1 | 9/2002 | Chu | |
| 2005/0189308 A1 * | 9/2005 | Warner | A47F 5/0823 |
| | | | 211/59.1 |
| 2005/0247653 A1 | 11/2005 | Brooks | |
| 2006/0197002 A1 | 9/2006 | Dute et al. | |
| 2008/0224004 A1 | 9/2008 | Gallien | |
| 2009/0224119 A1 | 9/2009 | Heffernan | |
| 2010/0308186 A1 * | 12/2010 | Thompson | A47B 96/022 |
| | | | 248/205.3 |
| 2011/0315647 A1 | 12/2011 | Andersson | |
| 2014/0238947 A1 * | 8/2014 | Hao | A47B 96/06 |
| | | | 211/88.01 |
| 2015/0182024 A1 * | 7/2015 | Nies | A47B 57/52 |
| | | | 108/42 |
| 2019/0186686 A1 * | 6/2019 | Sisto | F16B 13/0808 |

* cited by examiner

FLOATING SHELF APPARATUS

CROSS-REFERENCE TO RELATED APPLICATIONS

The present application is a continuation-in-part of U.S. patent application Ser. No. 16/104,046, filed on Aug. 16, 2018, which claims the benefit of priority to U.S. Provisional Patent Application Ser. No. 62/546,402, filed Aug. 16, 2017, the entireties of which are incorporated herein by reference.

The present application is also a continuation-in-part of U.S. patent application Ser. No. 16/220,435, filed Dec. 14, 2018, which claims the benefit of priority to U.S. Provisional Patent Application Ser. No. 62/598,809, filed Dec. 14, 2017, and U.S. Provisional Patent Application Ser. No. 62/648,179, filed Mar. 26, 2018, the entireties of which are incorporated herein by reference.

BACKGROUND

Shelves may be hung in an interior space for countless different reasons. For example, a shelf may be hung in a living room to display artwork, photographs, trinkets, or the like. A shelf may be hung in a bathroom to support items used for personal hygiene. A shelf may be hung in an office to display items pertaining to the work that is performed by the user of the office. Traditionally, shelves are mounted to a wall by supporting them on brackets that remain visible even after the shelf is mounted thereon. More recently, the concept of floating shelves have become popular whereby the bracket upon which the shelf is supported is hidden from view by the shelf, thereby making it appear as if the shelf is floating or otherwise suspended from the wall. However, floating shelves currently in existence tend to be unable to support a large amount of weight, sometimes causing such shelves to become detached from the wall. Furthermore, such floating shelves are often difficult to install and may not appear as seamless as the consumer desires. Thus, a need exists for a floating shelf apparatus that cures the aforementioned deficiencies.

SUMMARY

The present invention is directed to a floating shelf apparatus that includes a floating shelf and a mounting bracket that may be attached to a wall, whereby the floating shelf includes a support surface for supporting external objects.

The invention is directed to a floating shelf apparatus that includes a mounting bracket and a shelf. The mounting bracket is coupled directly to a support surface such as a wall and the shelf is mounted to the support surface to hang the shelf from the support surface. The mounting bracket includes a first portion that is coupled to the wall, a second portion having an S-shape that extends from a first end of the first portion, and a third portion having a linear shape that extends from a second end of the first portion. The shelf includes a ledge portion upon which items may be supported and a mounting portion that facilitates mounting the shelf to the mounting bracket. The mounting portion has a mounting element that interacts with the second portion of the mounting bracket to mount the shelf to the mounting bracket.

In one aspect, the invention may be a floating shelf apparatus comprising: a shelf comprising a ledge portion and a mounting portion, the mounting portion comprising a mounting element and a mounting cavity having an open rear end; a mounting bracket comprising: a first portion having a front surface and a rear surface opposite the front surface, the first portion extending from a first end to a second end along a longitudinal axis, wherein the first portion is configured to couple the mounting bracket to a wall with the rear surface of the first portion facing the wall; a second portion having a first leg that extends from the first end of the first portion in an upward direction that is oblique to the front surface of the first portion; and a third portion extending from the second end of the first portion in a downward direction that is oblique to the front surface of the first portion; and wherein the second and third portions of the mounting bracket are located within the mounting cavity of the mounting portion of the shelf and the mounting element of the mounting portion of the shelf interacts with the second portion of the mounting bracket to mount the shelf to the mounting bracket and hang the shelf from the wall.

In another aspect, the invention may be a method for mounting an item to a wall, the method comprising: providing an item to be mounted to the wall, a cover, and a force-distributing plate configured for placement against a surface of the wall; forming an assembly by inserting in order a threaded shaft of the fastener with an expansion part coupled to the shaft through a hole in the cover, a hole in the item, a hole in the force-distributing plate, and a pre-drilled hole in the wall; abuttingly engaging the force-distributing plate against the wall; and tightening the fastener, wherein the expansion part changes from an unexpanded state prior to tightening to an expanded state securing the item to the wall.

In yet another aspect, the invention may be a shelf support system comprising: a wall defining an outer surface; a perimeter frame formed by a plurality of side elements, at least one of the side elements mounted to the wall which supports the perimeter frame in a cantilevered manner; the perimeter frame defining an upwardly open receptacle; and a shelf insert inserted into the upwardly open receptacle, the perimeter frame circumscribing the shelf insert and at least partially concealing a side surface of the shelf insert, a top surface of the shelf insert being exposed.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
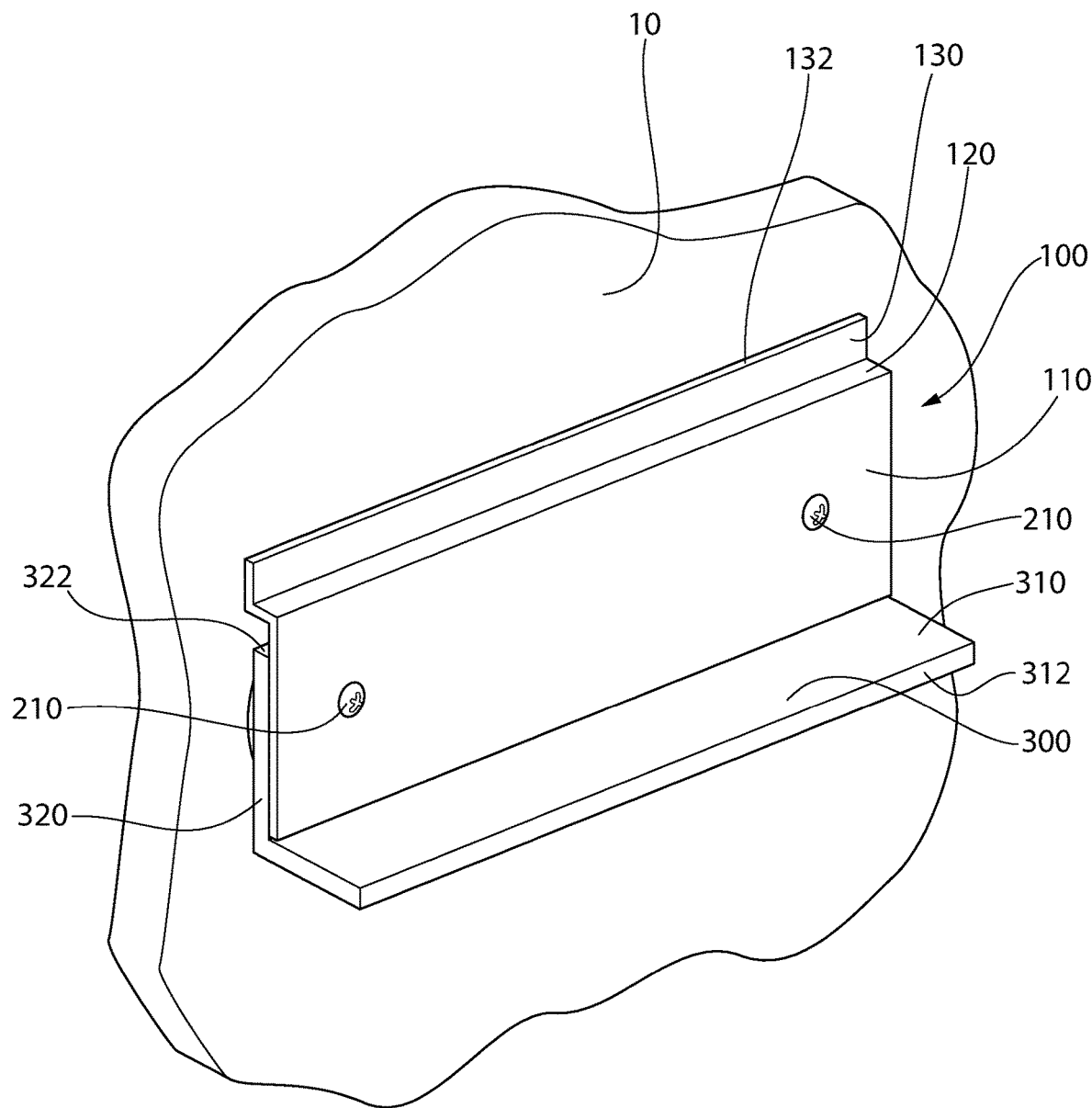
FIG. 1 is an upper perspective view of a mounting system with an accessory item in accordance with exemplary embodiments of the invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls. Unless otherwise specified, all percentages and amounts expressed herein and elsewhere in the specification should be understood to refer to percentages by weight. The amounts given are based on the active weight of the material. According to the present application, the term "about" means+/−5% of the reference value.

As stated above, a mounting system according to the present disclosure provides an esthetically pleasing and secure anchoring system for attaching an item to a hollow wall. In addition, the system provides a cover that blocks the top of an opening that can exists between other fastening systems and the wall to which the system is attached. This opening, if not covered, can allow foreign material (such as food in a kitchen) to enter the space between the system and the wall. Such foreign material can be unsightly and/or difficult to remove.

FIG. 1 shows an example of a fastening system in accordance with an embodiment of the invention in an assembled state. In this example, the fastening system includes a cover 100 that covers a mountable accessory object or item, in this non-limiting case a shelf 300, that is fastened to wall 10 by fasteners 200 (represented in this figure by fastener heads 210). The cover 100 and shelf 300 may be horizontally elongated in one embodiment.

Figure 3:
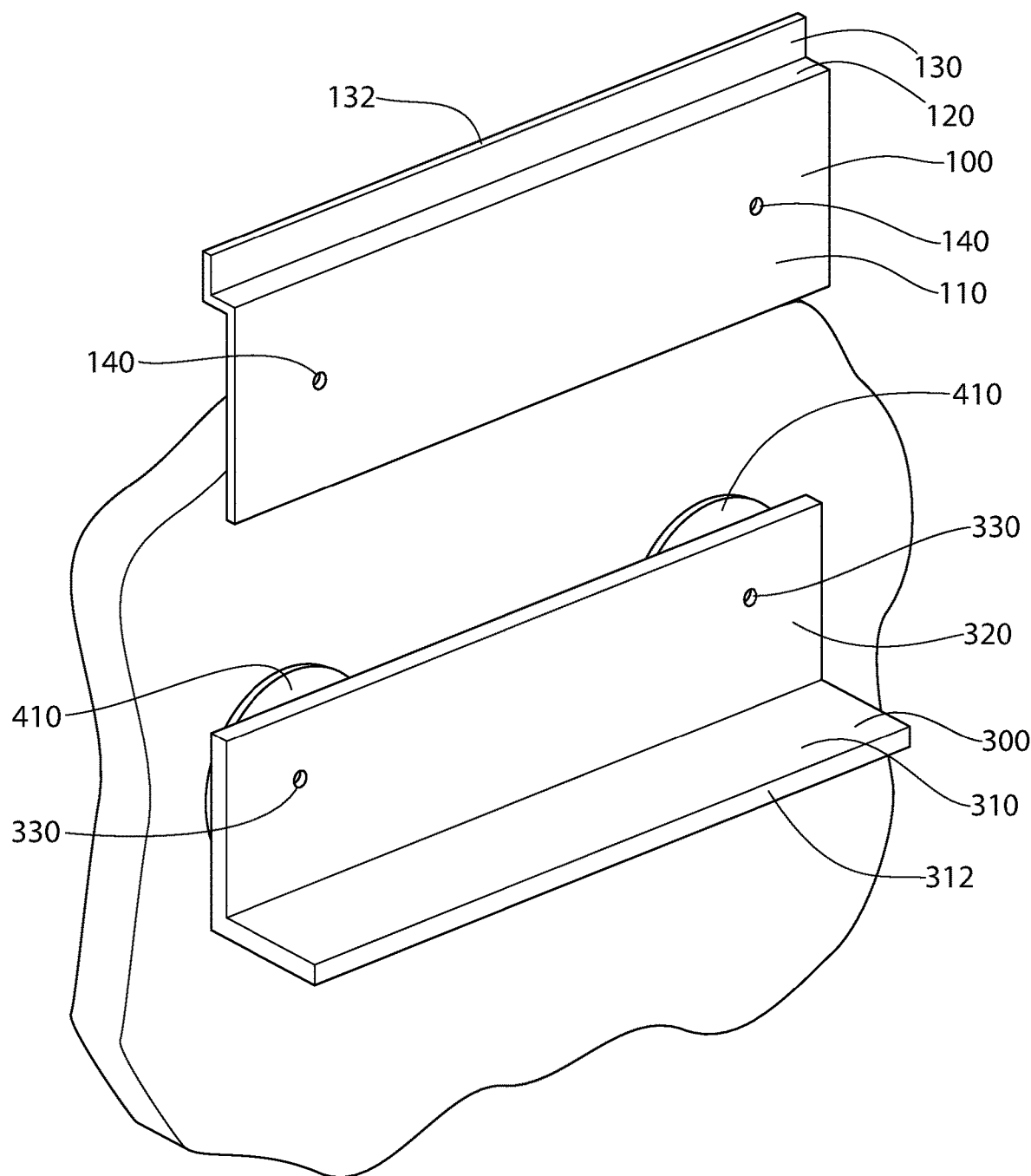
FIG. 3 is an upper perspective view of the mounting system of FIG. 1 in an unassembled state.

FIG. 3 shows the system of FIG. 1 in a partially disassembled state. FIG. 3 shows shelf 300 and force-distributing plates 410 in position on wall 10, but with cover 100 removed. If this system were to be installed without cover 100, force-distributing plates 410 would be visible, which can be esthetically undesirable. Cover 100 provides an esthetically pleasing solution by covering force-distributing plates 410 and an upper edge 322 (e.g. horizontal) of shelf 300.

Cover 100 has a first section 110 that, in this example, extends vertically parallel to an outer surface of wall 10. First section 110 defines a planar rear surface 902 and opposing parallel planar front surface 903. A second section 130 extends, in this example, parallel to first section 110 and is configured to press against the outer surface of wall 10. Second section defines a planar rear surface 906 and opposing parallel planar front surface 901. Each section 110, 130 has a greater height/width than their respective thickness formed by the bent plate or welded construction. A planar ledge 120 extends, in this example horizontally, between first section 110 and second section 130. Second section 130 has an upper edge 132 that, in this example, extends horizontally. In other examples, edge 132 can be radiused, angled, or of some other shape that is esthetically pleasing and/or satisfies another purpose. Cover 100 has two holes 140 through which fasteners can extend. Although two holes 140 are shown in this example, it is noted that fewer or more fasteners can be used and, as a result, fewer or more holes 140 can be provided.

Shelf 300 has, in this example, a first section 310 that extends horizontally perpendicular to the exposed flat surface or face of wall 10, and a second section 320 that extends vertically parallel to the face of wall 10 and perpendicular to the first section. Each section 310, 320 has a greater height/width than their respective thickness formed by the bent plate or welded construction. First section 310 has a front edge 312 that, in this example, extends horizontally and is vertically flat. In other examples, edge 312 can be radiused, angled, or of some other shape that is esthetically pleasing and/or satisfies another purpose. Two holes 330 are provided in second section 320 through which fasteners can extend. Although two holes 330 are shown in this example, it is noted that fewer or more fasteners can be used and, as a result, fewer or more holes 330 can be provided. Because the same fasteners are used to fasten shelf 300 and cover 100 to wall 10, holes 330 correspond in location and number to holes 140 which become concentrically aligned when the shelf and cover are assembled.

Shelf 300, force-distributing plates 410, and cover 100 can be formed of the same or different suitable metals such as, for example, stainless steel, aluminum, titanium, or other. Non-metallic materials such as plastics or any other suitable material may be used for these components provided they have sufficient strength and rigidity.

Two force-distributing plates 410 are shown in FIG. 3. Force-distributing plates 410 (discussed in more detail below) distribute the force exerted on the face of wall 10 by the fasteners so that the fasteners are not pulled though wall 10 or otherwise deform the outer surface of wall 10. FIG. 3 illustrates how force-distributing plates 410 can extend beyond (above in this example) the limits of second section 320 of shelf 300 (e.g. above horizontal top edge 322 of second section 320). This can produce an undesirable visual effect. As can be seen in FIG. 1, cover 100 hides force-distributing plates 410 to produce a more visually pleasing result. Cover 100 also covers a gap between second section 320 and the outer surface of wall 10 caused by force-distributing plates 410 (shown in more detail below).

It will be appreciated that in other possible constructions, force-distributing plates 410 may have a height which is less than or flush with the top edge 322 of shelf 300. This situation would still create an esthetically displeasing appearance and gap between the wall and shelf which could also benefit from the use of cover 100 to conceal the force-distributing plates and at least partially cover the gap.

Figure 2:
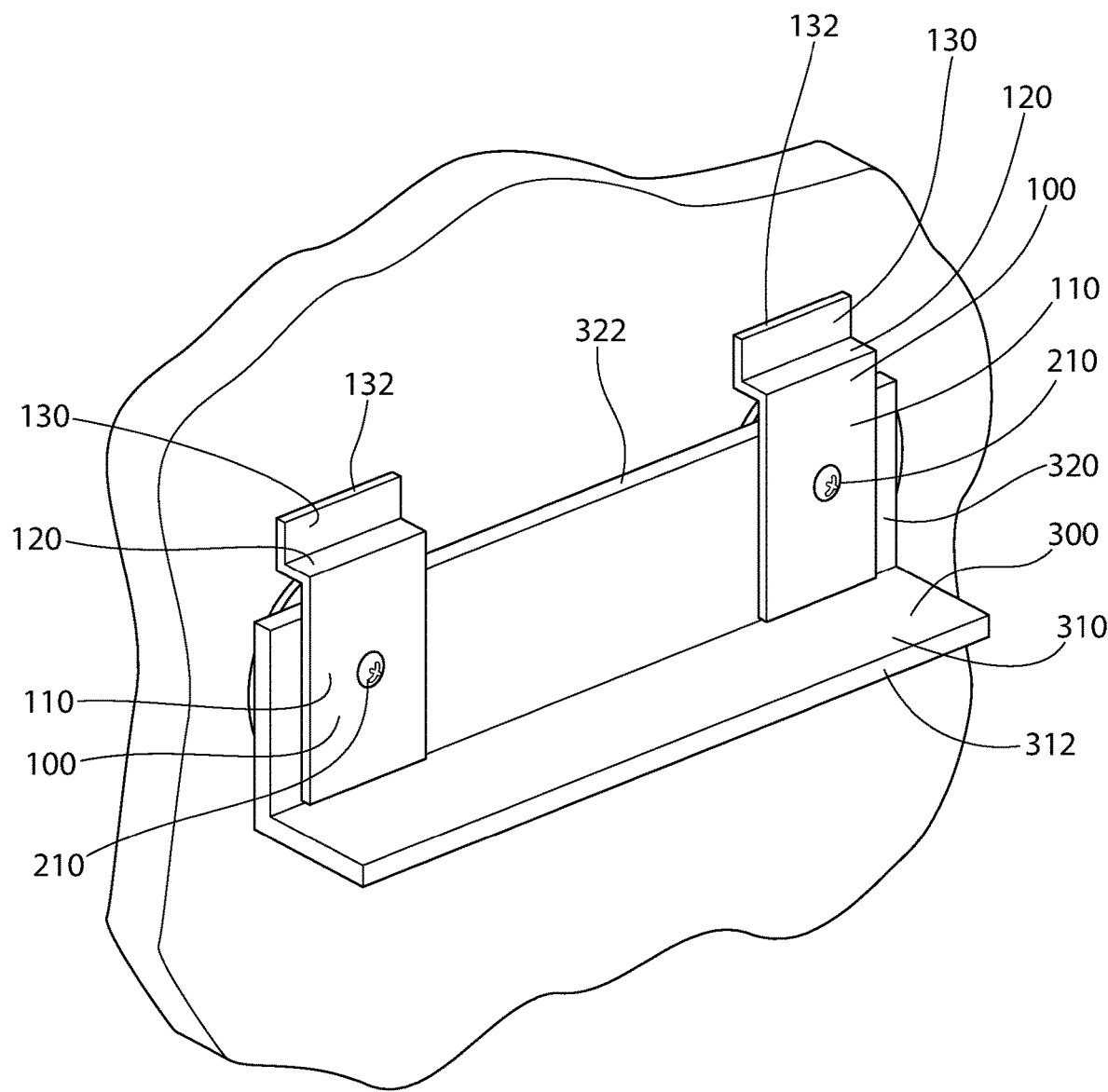
FIG. 2 is an upper perspective view of a mounting system in accordance with exemplary embodiments of the invention.

FIG. 2 shows another embodiment of the invention that is similar to the embodiment shown in FIG. 1, except that two covers 100 are used instead of one. This embodiment covers force-distributing plates 410 but gives a different visual appearance than the embodiment shown in FIG. 1 such that portions of the section 320 of shelf 300 remain visible, whereas in FIG. 1 the single cover 100 has a horizontal length coextensive with the shelf and conceals the entirety of the section 320. This present embodiment of FIG. 2 also exposes part of the gap between second section 320 of shelf 300 and the outer surface of wall 10 and, as a result, allows an accessory (such as, for example, a condiment rack) to be hung over the top horizontal edge 322 of the shelf.

Force-distributing plates 410 are generally flat or planar broadened structures in the general form of a washer with a width/height greater than their thickness. Force-distributing plates 410 and may have any suitable shape. In one embodiment, the plates 410 may be circular as depicted. Other non-polygonal shapes and polygonal shapes including rectilinear shapes (e.g. square or rectangular) may be used. The invention is thus not restricted by the shape of the force-distributing plates.

Figure 4:
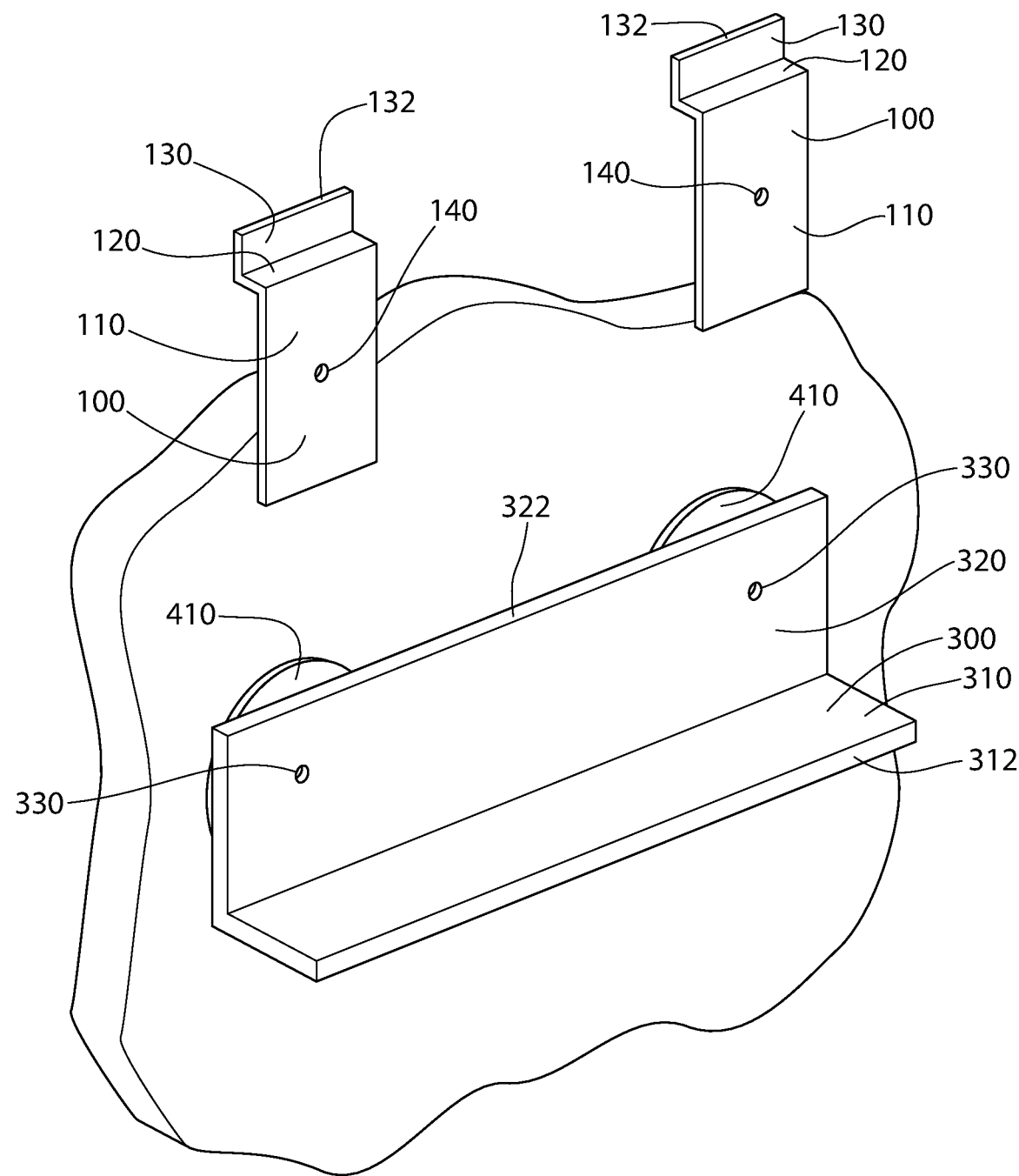
FIG. 4 is an upper perspective view of the mounting system of FIG. 2 in an unassembled state.

FIG. 4 shows the example shown in FIG. 2 in a partially disassembled state. FIG. 4 shows shelf 300 and force-distributing plates 410 in position on wall 10, but with covers 100 removed. If this system were to be installed without covers 100, force-distributing plates 410 would be visible, which can be esthetically undesirable. Covers 100 provide an esthetically pleasing solution by covering force-distributing plates 410, while leaving a portion of edge 322 of shelf 300 exposed.

Figure 5:
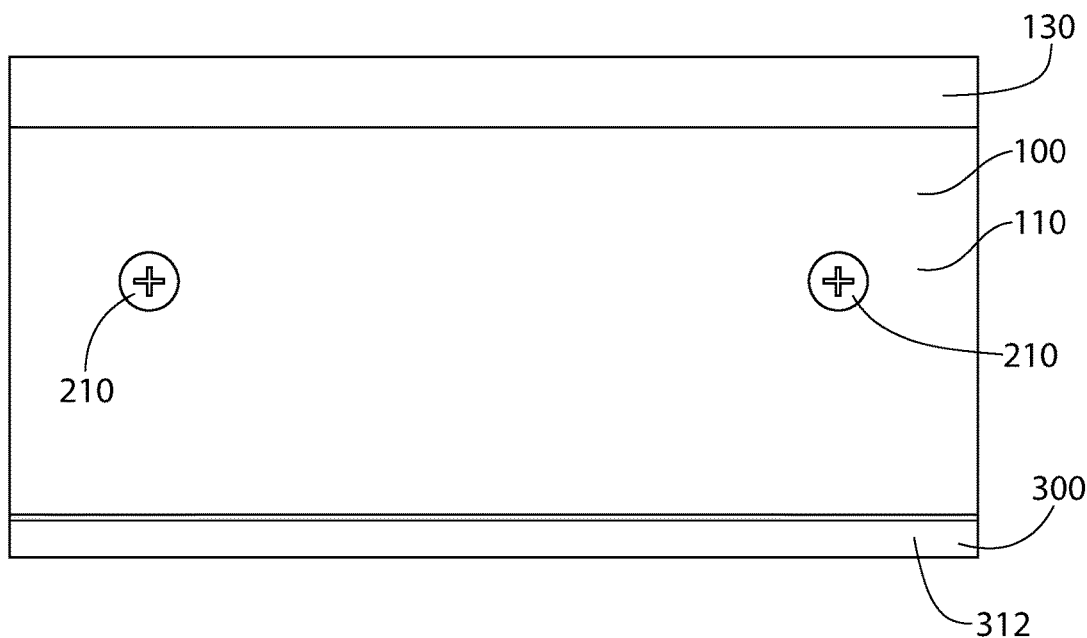
FIG. 5 is a front view of the mounting system of FIG. 1.

FIG. 5 is a front view of the embodiment shown in FIG. 1. In this example, fastener heads 210 are shown as Phillip's head bolts. However, any suitable head or engagement portion can be used, such as, for example, an external hex head, an internal hex head, or a slotted head. However, in some embodiments, a smooth, rounded fastener head is desirable in order to removably engage a slot in an accessory that is used with the system (discussed below).

Figure 6:
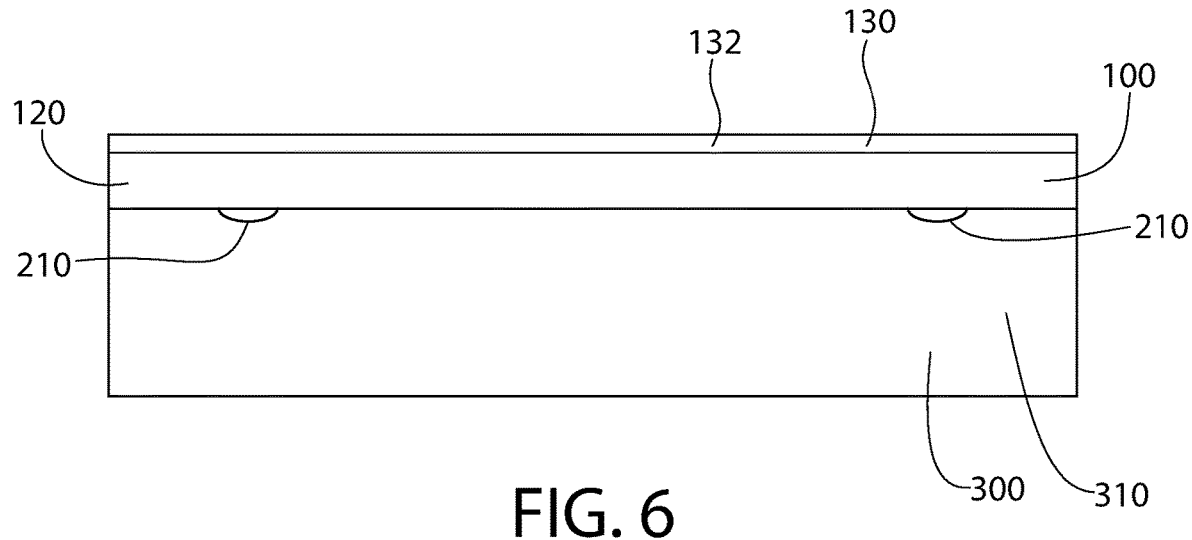
FIG. 6 is top view of the mounting system of FIG. 1.

FIG. 6 is a top view of the embodiment shown in FIG. 1. In this example fastener heads 210 are rounded in order to removably engage a slot in an accessory that is used with the system (discussed below).

Figure 7:
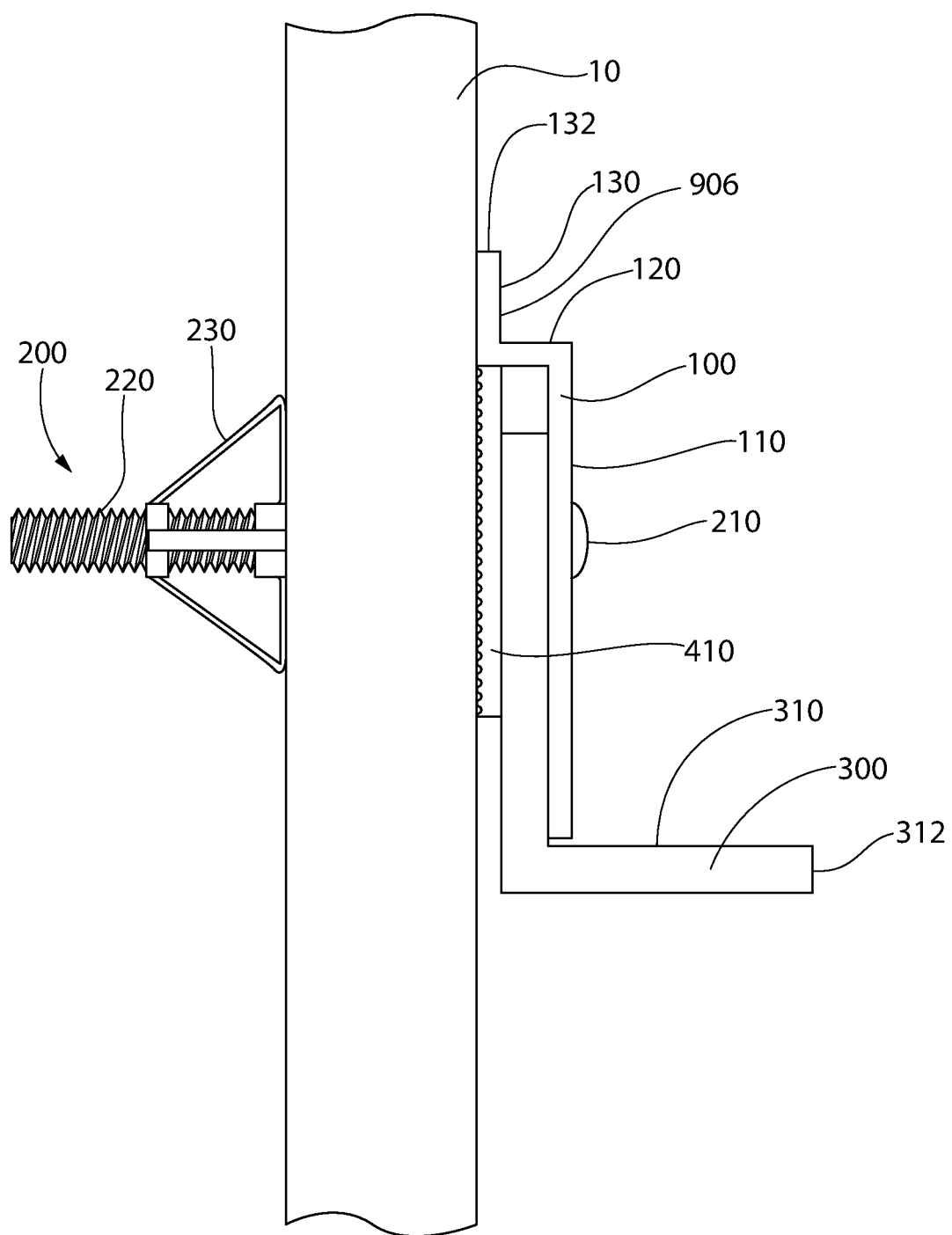
FIG. 7 is a side view of the mounting system of FIG. 1 in an installed state.
Figure 8:
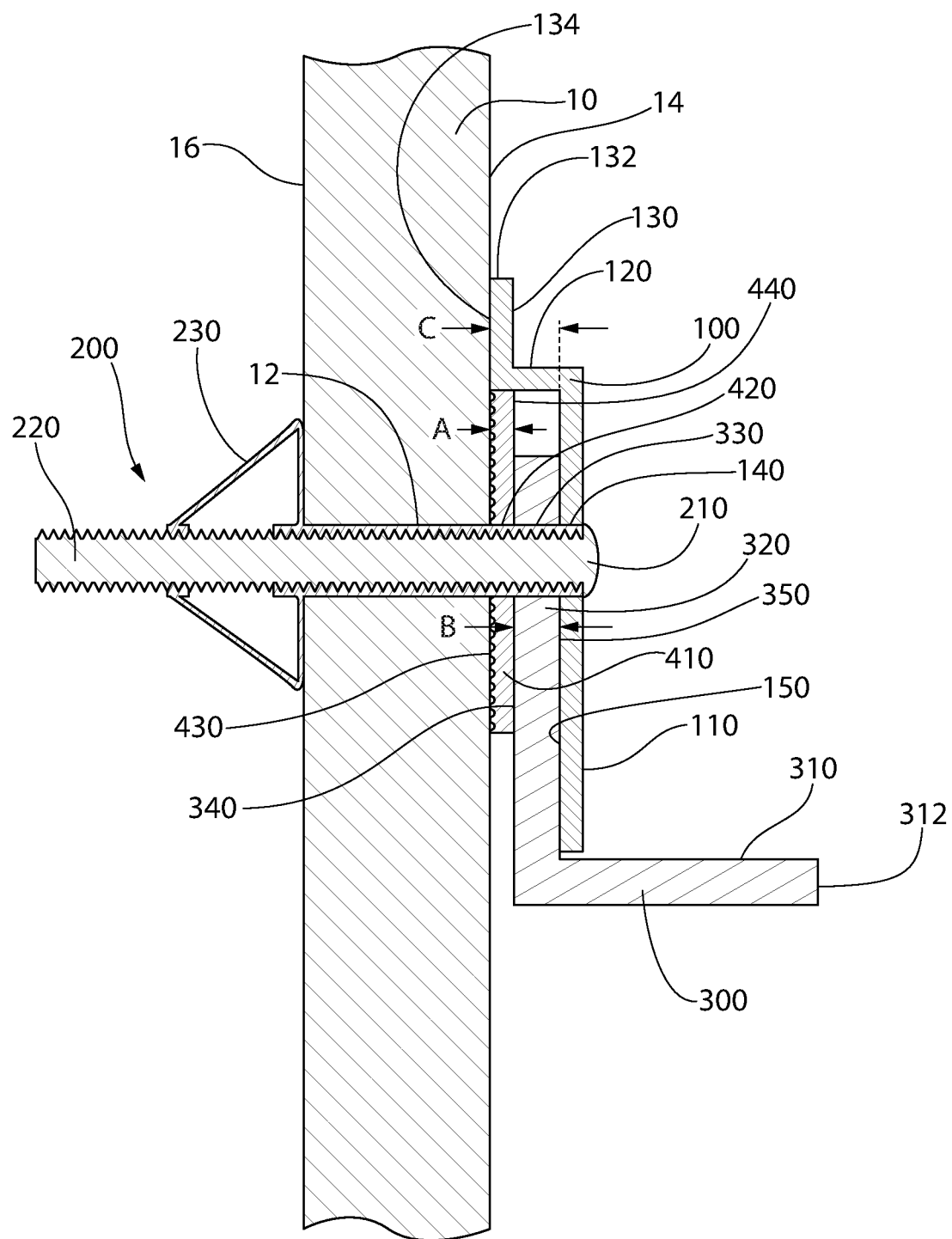
FIG. 8 is a side sectional view of the mounting system of FIG. 1 in an installed state.

In FIGS. 7 and 8 the example of FIG. 1 is shown mounted to wall 10. A method for fastening the item (e.g. shelf 300 or other) to the wall will now be briefly summarized. It bears noting the method and these figures also apply to the example shown in FIG. 2 using two force-distributing plates 410. In these figures, fastener 200 has a head 210, a threaded shaft 220 and an expansion element or part 230 (e.g. expansion anchor) for use with a hollow wall that generally comprises two or more deformable triangular shaped arms in one embodiment as shown. Such expansion parts 230 or anchors are coupled to the shaft of fastener 200, and are well known in the art and commercially available. Other types of expansion anchors/parts may be used and does not limit the invention.

Starting with expansion part 230 in an unexpanded state, threaded shaft 220 and expansion part 230 of fastener 200 are inserted (in order) through hole 140 in cover 100, hole 330 in shelf 300, a hole 420 in force-distributing plate 410, and a pre-drilled hole 12 in hollow wall 10; the holes being all concentrically aligned with each other. If the holes in the cover, shelf, and force-distributing plate are not large enough in diameter to pass the expansion part 230 therethrough, the threaded shaft 220 of fastener 200 may alone be passed through those three holes and the expansion part may be then threaded or inserted over the shaft before inserting the shaft and expansion part through the hole 10 pre-drilled in the hollow wall 10. Either assembly scenario is acceptable.

The diametrically enlarged head 210 of fastener 200 prevents fastener 200 from passing all the way through first section 110 of cover 100. Head 210 is engaged by a turning tool (e.g. manual screwdriver or electric drill/driver) and turned to rotate threaded shaft 220, which causes expansion part 230 to expand outward and press against an inner face 16 of wall 10 as the fastener is tightened and the shaft advances through the wall. This secures the shelf 300 assembly to the wall in rigid manner.

As can be seen from FIGS. 7 and 8, a planar rear surface or face 430 of force-distributing plate 410 is pressed against and abuttingly engages the planar outer surface or face 14 of wall 10 when the assembly is fastened to wall 10. A planar surface or rear face 340 of second section 320 of shelf 300 is pressed against a planar front surface or face 440 of force-distributing plate 410 in this assembled state. Also, a planar rear surface or face 150 of first section 110 of cover 100 is pressed against a planar front surface or face 350 of second section 320 of shelf 300 while a planar rear surface or face 134 of second section 130 of cover 100 is pressed against planar outer surface or face 14 of wall 10. The front surface or face 906 is exposed. As can be seen from FIGS. 7 and 8, in this example, the sum of a thicknesses A of force-distributing plate 410 and a thickness B of second portion 320 of shelf 300 equals a length C of ledge 120 so that rear face 134 of second section 130 of cover 100 and rear face 430 of force-distributing plate 410 are co-planar. This configuration results in the compressive fastening force being exerted on the outer surface of wall 10 via tightening fastener 200 by both the second section 130 and force-distributing plate 410, and that force being substantially equal. The force-distributing plate 410 and cover both advantageously distribute the force over a collectively larger surface area of the wall to prevent damaging the wall yet provide a secure mount.

In other embodiments, the dimensions of one or more parts can be altered so that rear face 134 of second section 130 and rear face 430 of force-distributing plate 410 are not co-planar. For example, it may be desirable for the sum of thicknesses A and B be slightly more than length C so that rear face 134 of second portion 130 barely rests against outer face 14 of wall 10 while rear face 430 of force-distributing plate 410 slightly depresses outer face 14 of wall 10. This can be desirable when the system is mounted to a particularly delicate wall surface so that no depression of the wall surface is visible when the system is in the installed state. In another example, it may be desirable for the sum of thicknesses A and B be slightly less than length C so that rear face 134 of second portion 130 depresses outer face 14 of wall 10 more than rear face 430 of force-distributing plate 410 depresses outer face 14 of wall 10. This can be desirable when it is particularly important that nothing can fall between upper ledge 132 and wall 10.

Figure 9:
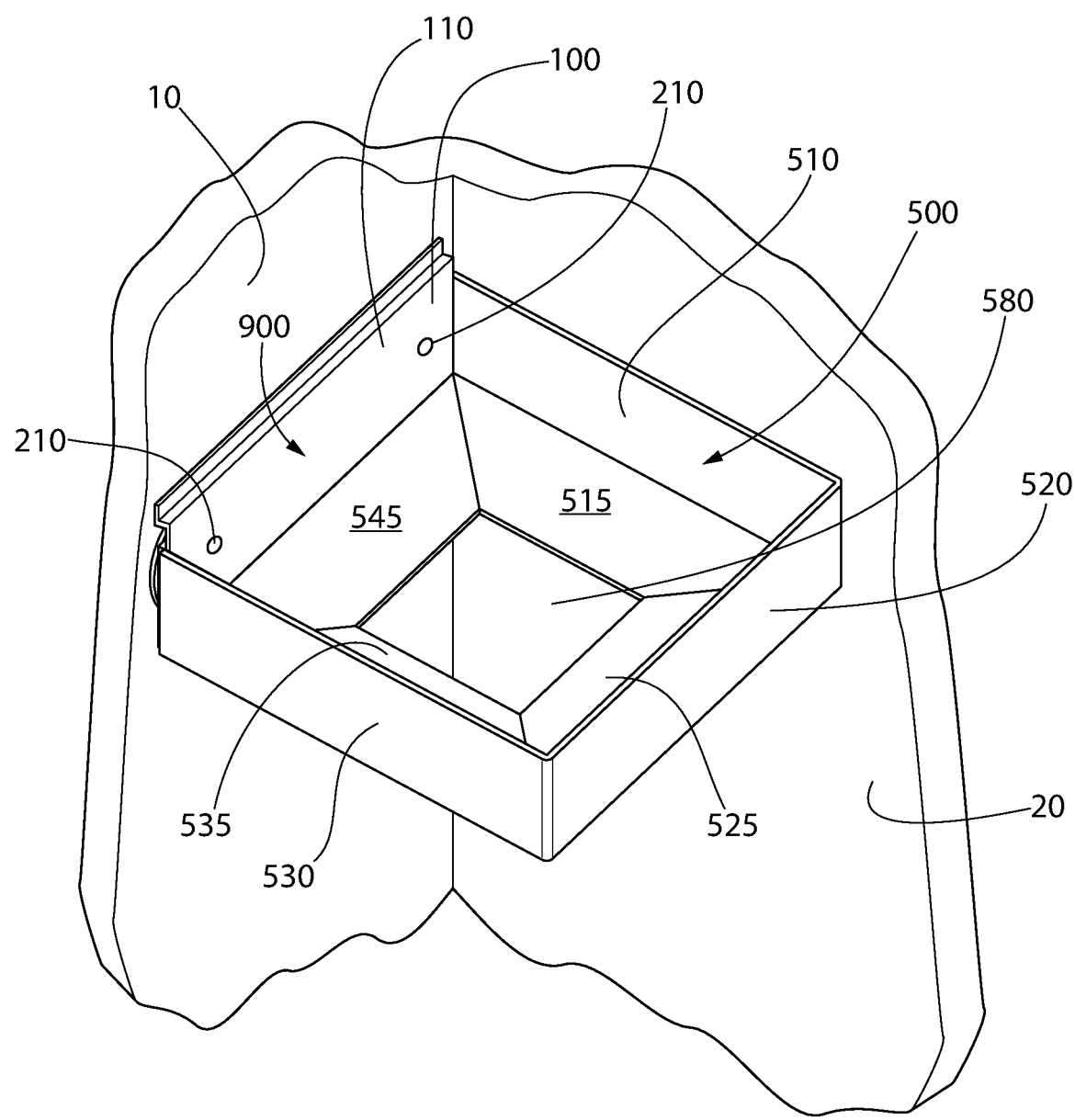
FIG. 9 is an upper perspective view of a mounting system with a perimeter frame support structure for supporting an accessory in accordance with exemplary embodiments of the invention.
Figure 10:
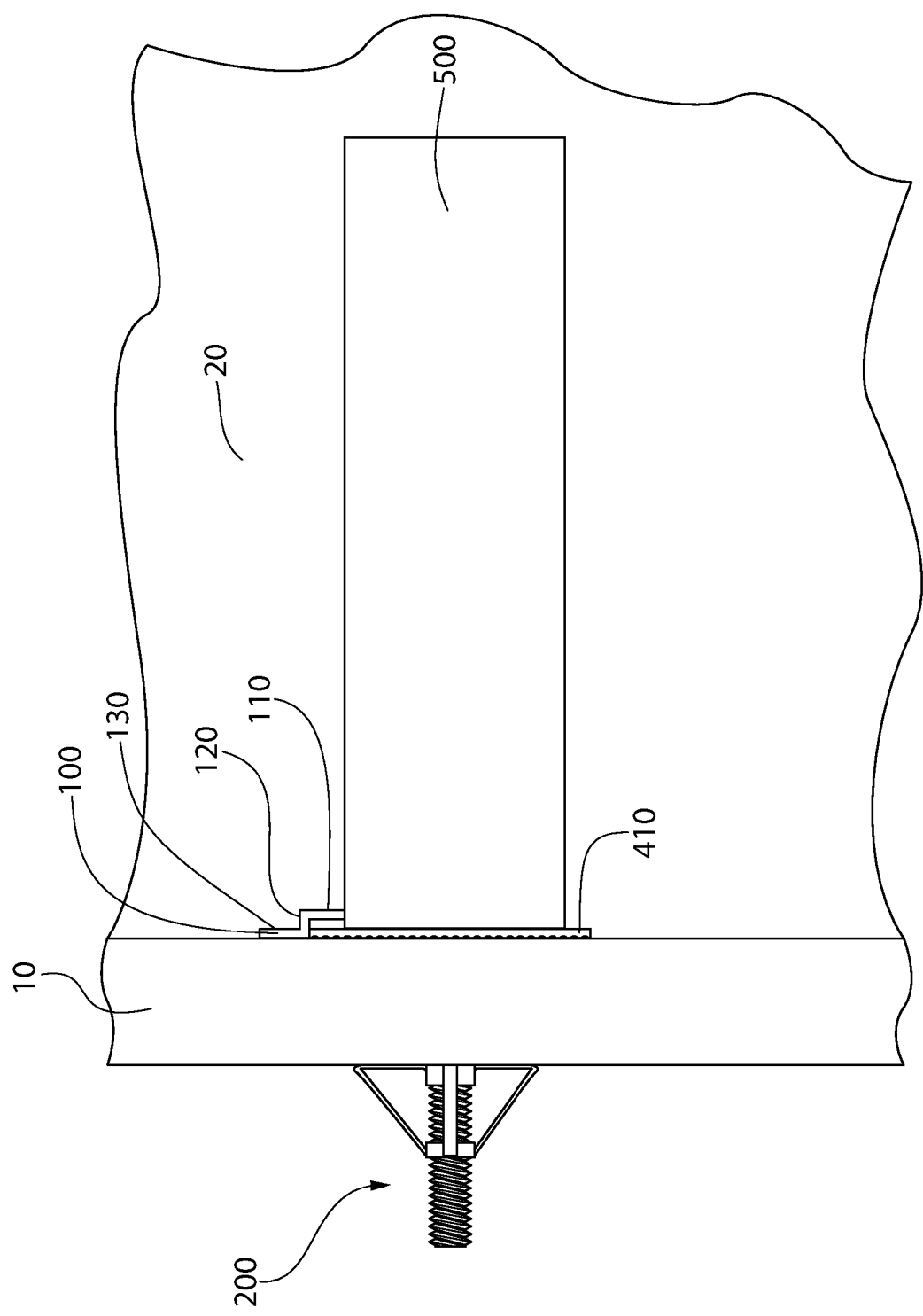
FIG. 10 is a side view of the mounting system and support of FIG. 9 in an installed state.
Figure 11:
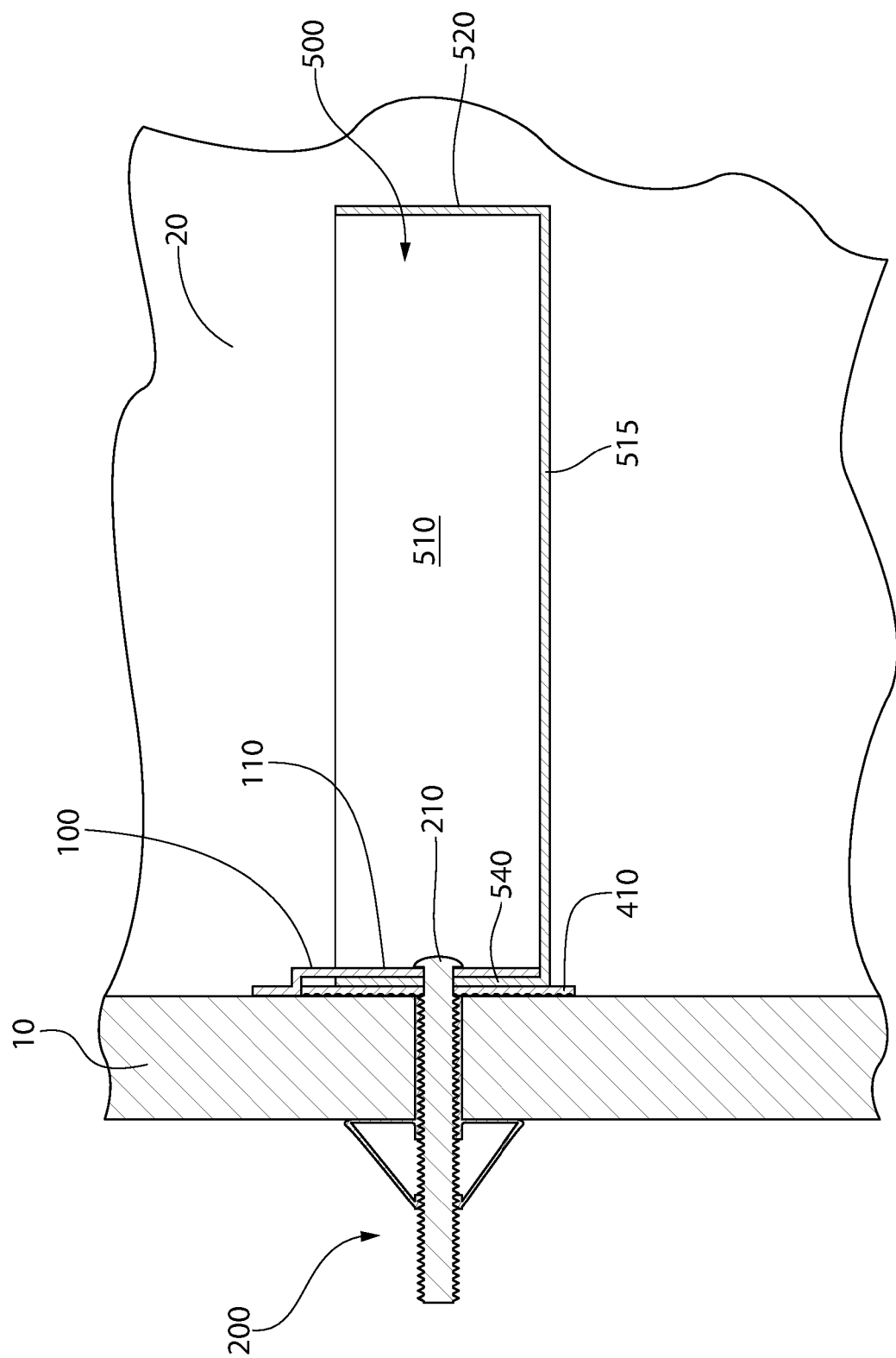
FIG. 11 is a side sectional view of the mounting system and support of FIG. 9 in an installed state.

FIGS. 9-11 show an embodiment of a fastening or mounting system comprising an accessory support structure 500 in the form of a perimeter frame with optionally open, partially open, or fully closed bottoms which can be fastened to wall 10. The perimeter frame support structure 500 may be mounted directly to the wall 10 with fasteners 200, or alternatively may utilize the wall mounting system assembly previously described herein with respect to FIGS. 1-8 including the force-distributing plate 410 and cover 100 to fasten the support structure 500 to wall 10 in a cantilevered manner. Support structure 500 may be used to support various interchangeable items or accessories such as, for example, shelves, soap dispensers, racks, light fixtures, or any other accessory in a cantilevered manner.

It bears noting that although the perimeter frame support structure 500 is shown as having a generally square shape in FIGS. 9-11, in other embodiments the perimeter frame may be elongated having a rectangular shape with two long front/rear sides and shorter lateral left/right sides. The support structure 500 may have any length and projection from the wall depending on the particular intended use of the support structure.

Perimeter 300, force-distributing plates 410, and cover 100 can be formed of the same or different suitable metals such as, for example, stainless steel, aluminum, titanium, or other. Non-metallic materials such as plastics or any other suitable material may be used for these components provided they have sufficient strength and rigidity.

In this example, support structure 500 has a rectilinear frame-like structure generally formed by four intersecting vertically-oriented side elements or members 510, 520, 530, 540 (also referred to herein as "sides" for brevity). Side 510 includes a horizontal portion 515 extending from side 510 toward a central opening 580 of support structure 500. Side 520 includes a horizontal portion 525 extending from side 520 toward opening 580. Side 530 includes a horizontal portion 535 extending from side 530 toward opening 580. Side 540 includes a horizontal portion 545 extending from side 540 toward opening 580. The horizontal portions thus define the opening 580. The vertical portions of sides 510-540 may be arranged to create the rectilinear perimeter frame configuration forming perpendicular corners between each pair of the intersecting and adjacent sides. In this example, the foregoing horizontal portions are intersecting such that the diagonal edges of the horizontal portions contact the diagonal edges of the adjacent horizontal portions to create continuous shelf around opening 580. The diagonal edges may be welded together in one embodiment. In other examples, the diagonal edges of the horizontal portions do not contact the diagonal edges of the adjacent horizontal portions. In yet other examples, the horizontal portions converge in the central area of support 500 such that no opening 580 exists.

In this example shown in FIGS. 9-12, side 510 of the perimeter frame contacts wall 20 but is not fastened to wall 20 which meets wall 10 at a corner. This represents a corner mounting situation of the support structure 500. In other examples, side 520 may be fastened to wall 20 in the same manner that side 540 is fastened to wall 10 using force-distributing plates 410 and covers 100. This provides two sides and places of support for the perimeter frame to hold the weight of heavy objects supported by the frame. In other examples, the perimeter frame may be attached to a section of wall 10 or 20 not adjacent a corner such that side 510 does not contact wall 20. In this situation, the perimeter frame is supported in an entirely cantilevered manner.

FIG. 11 shows in sectional view that support structure 500 is fastened to wall 10 in the same manner that shelf 300 is fastened to wall 10 in FIG. 8.

Figure 12:
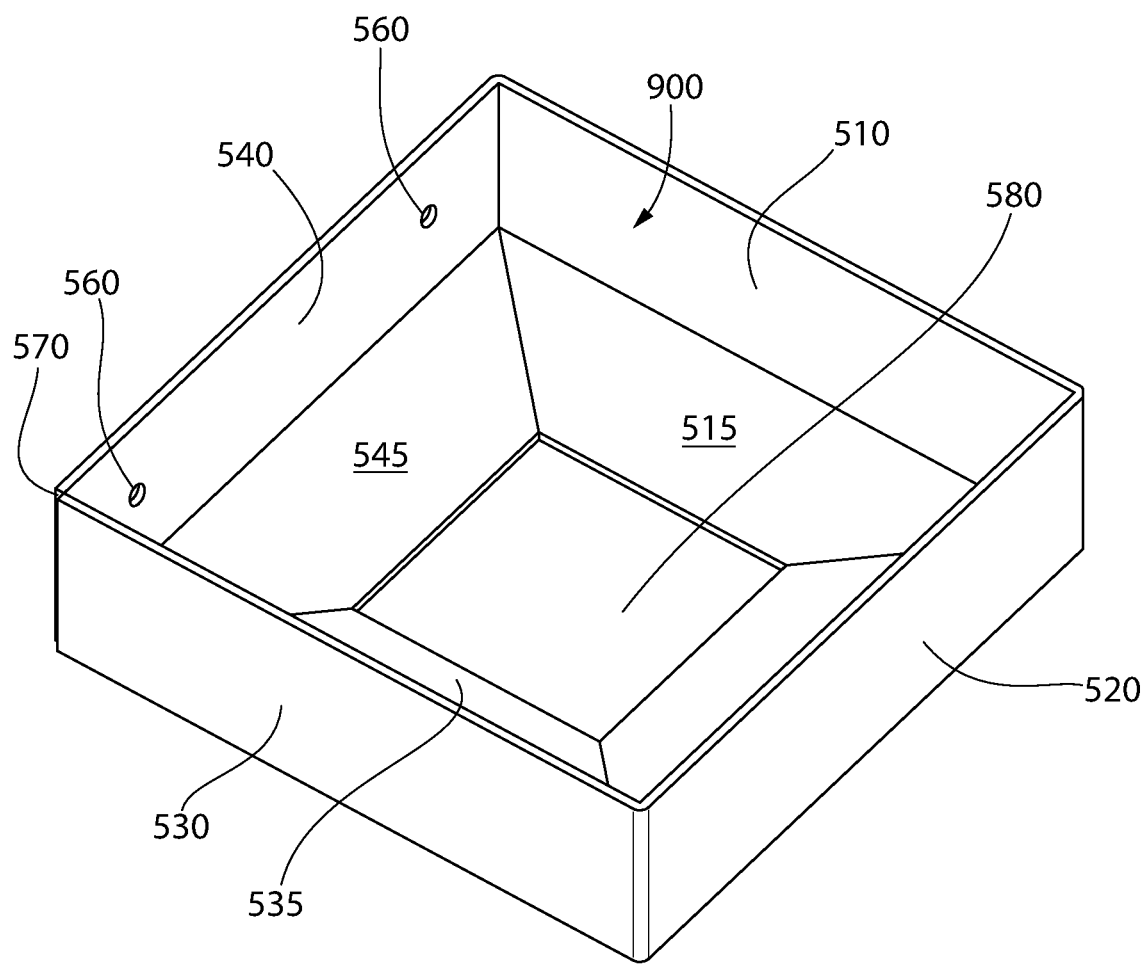
FIG. 12 is an upper perspective view of the support of FIG. 9.

FIG. 12 shows support structure 500 as having two holes 560 in side 540. Holes 560 serve the same purpose as holes 330 of shelf 300. Due to the fabrication method used in this example, a continuous corner exists between sides 540 and 510, between sides 510 and 520, and between sides 520 and 530. In contrast, a joint 570 exists between sides 530 and 540 (explained further below).

Figure 13:
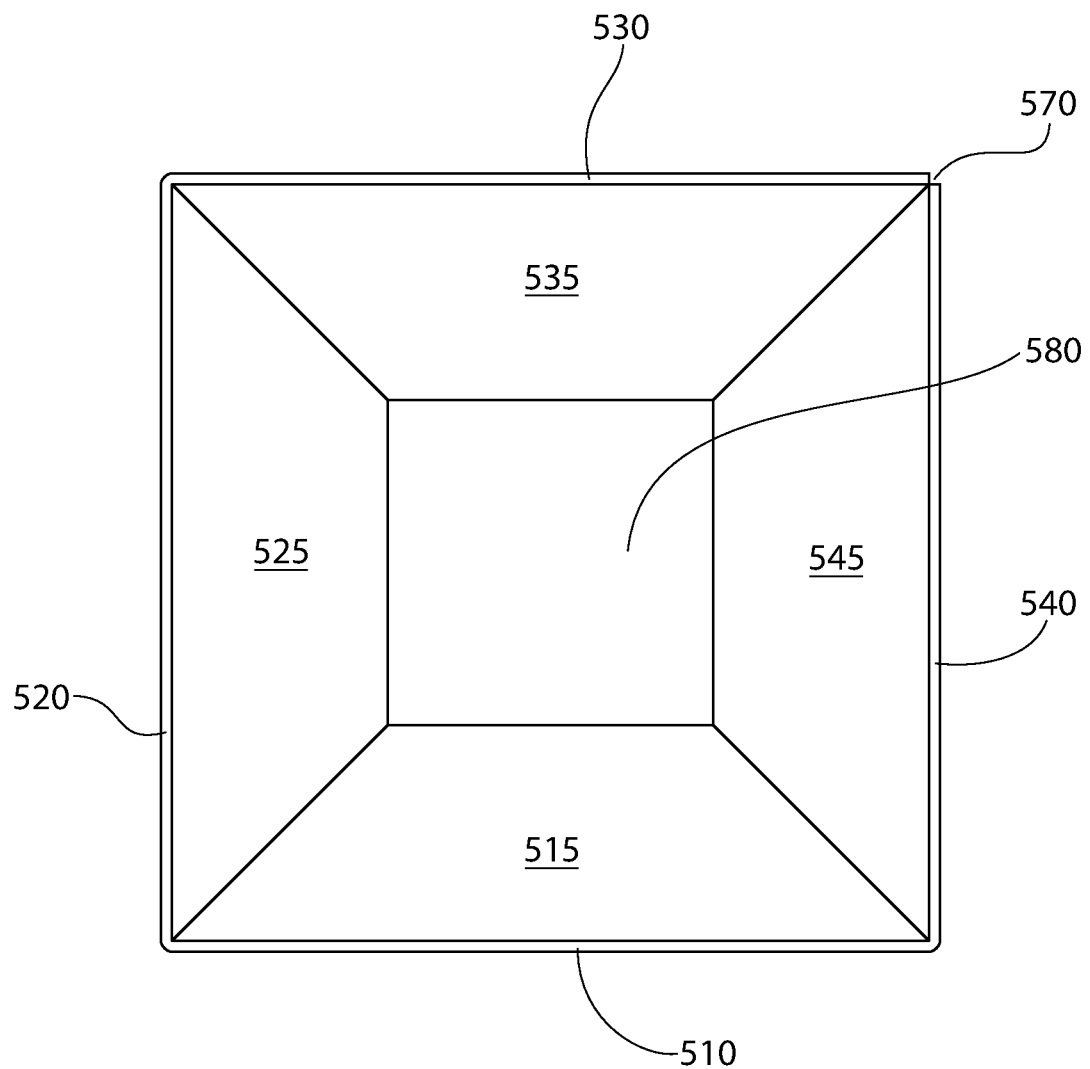
FIG. 13 is a top view of the support of FIG. 9.
Figure 14:
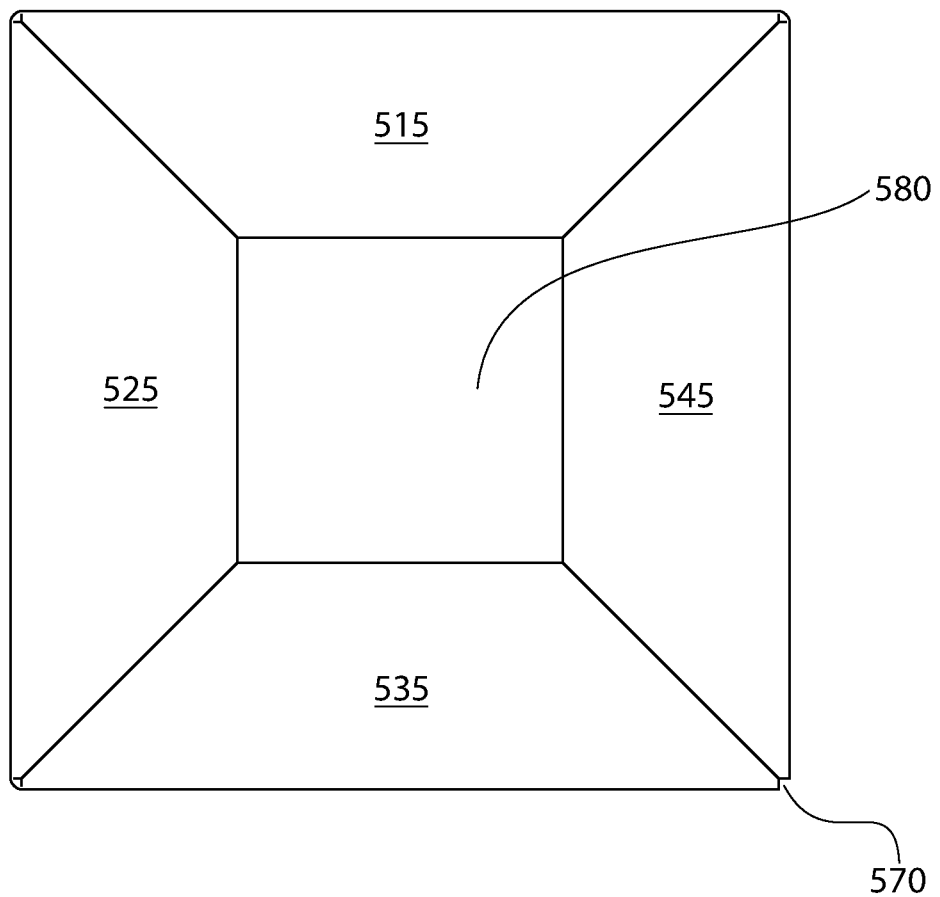
FIG. 14 is a bottom view of the support of FIG. 9.
Figure 15:
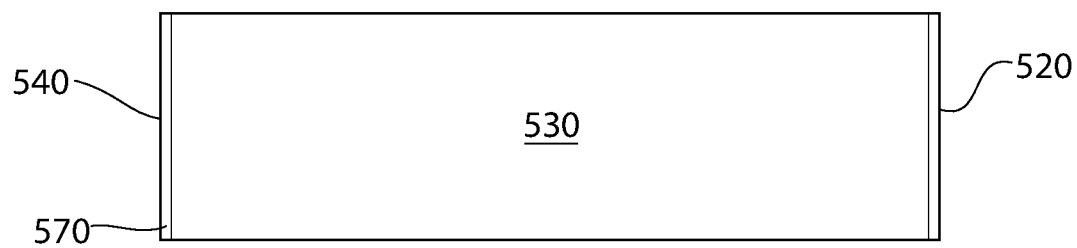
FIG. 15 is a side view of the support of FIG. 9.

FIG. 13 is a top view of support structure 500 and shows opening 580 and joint 570. FIG. 14 is a bottom view of support structure 500 and shows opening 580 and joint 570. FIG. 15 is a side view of support structure 500 and also shows joint 570.

Figure 16:
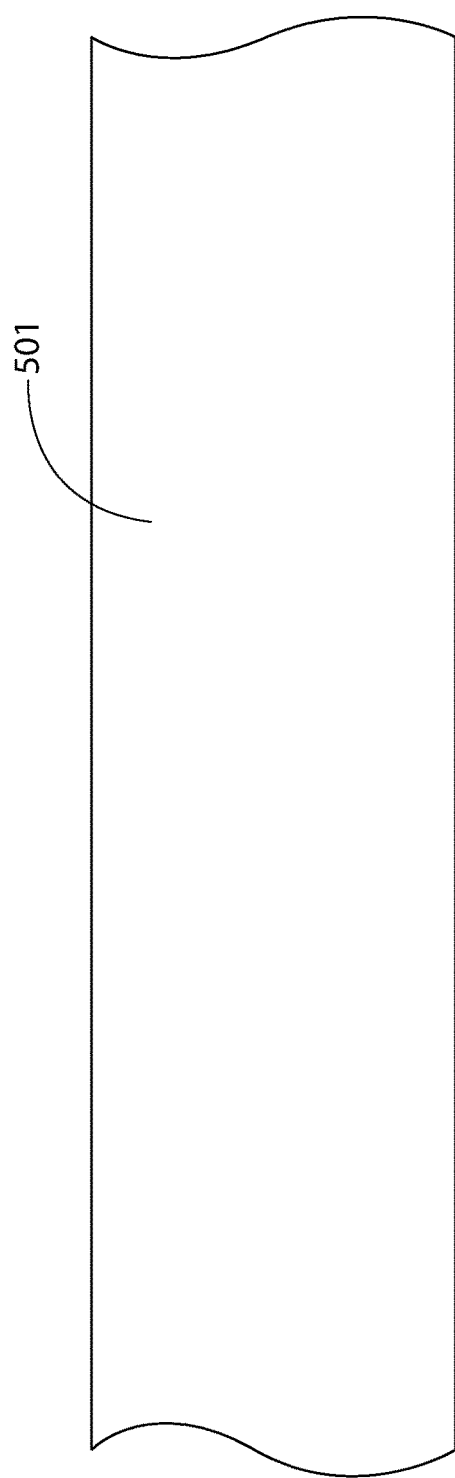
FIG. 16 is a production or workpiece blank used to fabricate the support of FIG. 9 prior to cutting.
Figure 17:
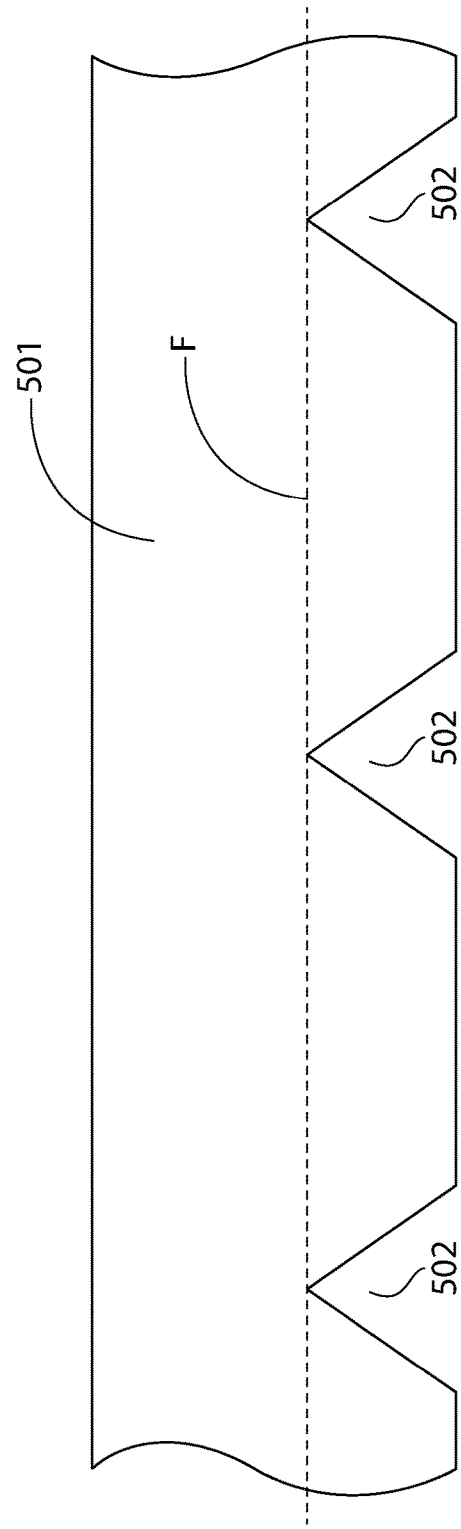
FIG. 17 is the production blank of FIG. 16 after being cut to shape to be used to fabricate the support of FIG. 9.

FIGS. 16 and 17 will be used to illustrate one fabrication method of support structure 500. In this method, a workpiece blank 501 can be a suitable metal such as, for example, stainless steel, aluminum, titanium, or other. Non-metallic materials such as plastics or any other suitable material may be used provided they have sufficient strength and rigidity. Blank 501 has sections cut out of it to form notches 502. The flaps resulting from the notches are folded, in this example, at a 90 degree angle along fold line F to form horizontal portions 515, 525, 535, 545. Ninety degree bends are than made along lines that are perpendicular to fold line F extending from the apex of each notch 502. These bends form the corners of support structure 500. The free ends of the resulting structure form joint 570. The edges along notches 502 (which now contact each other) can be welded together, joined in some other fashion, or simply left unjoined. Similarly, the free ends that come together as joint 570 can be welded together, joined in some other fashion, or simply left unjoined. In the case of unjoined edges or ends, the material from which support structure 500 is made can be sufficiently strong to not require joining.

Figure 18:
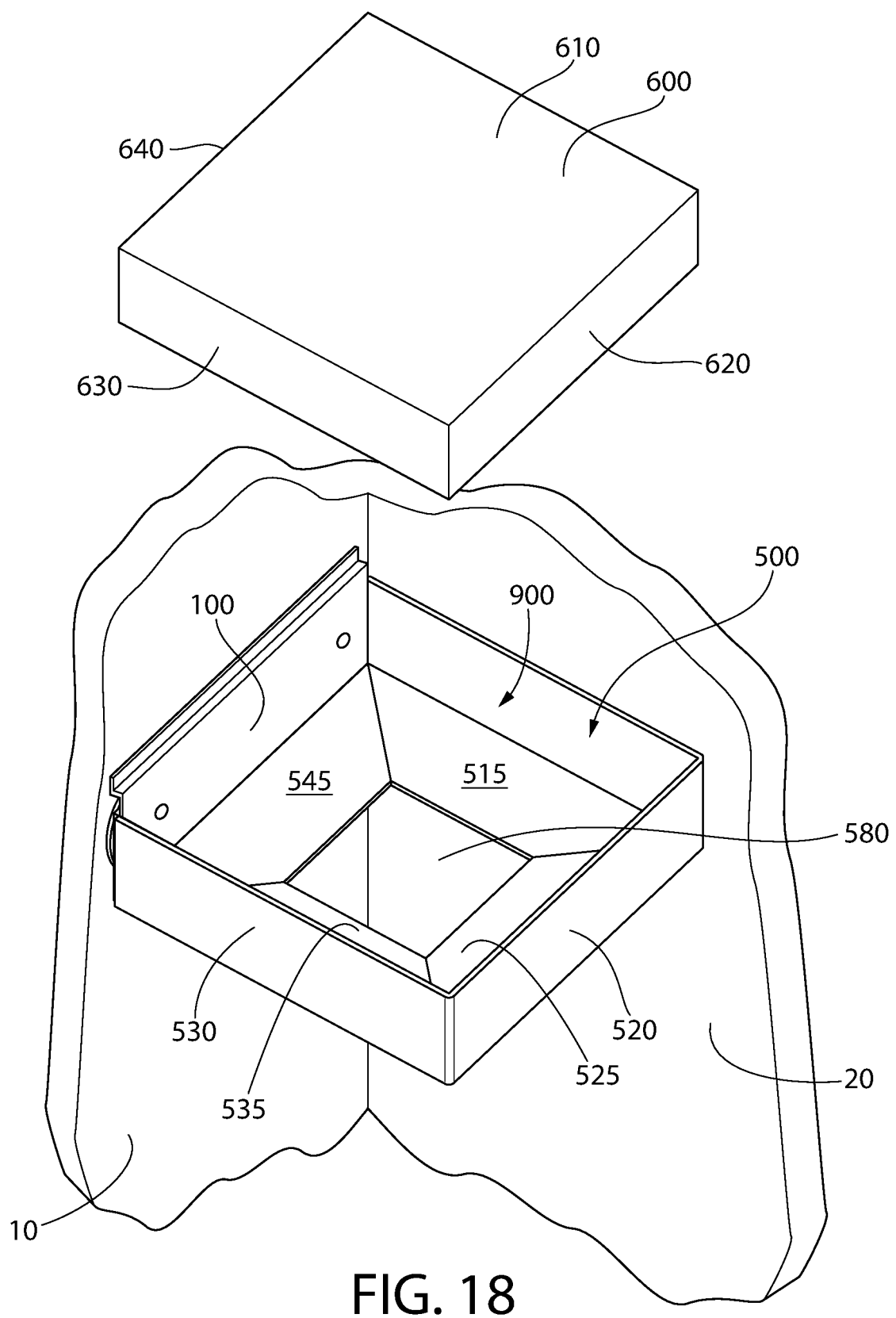
FIG. 18 is an exploded upper perspective view of a shelf unit and the mounting system and support of FIG. 9.
Figure 19:
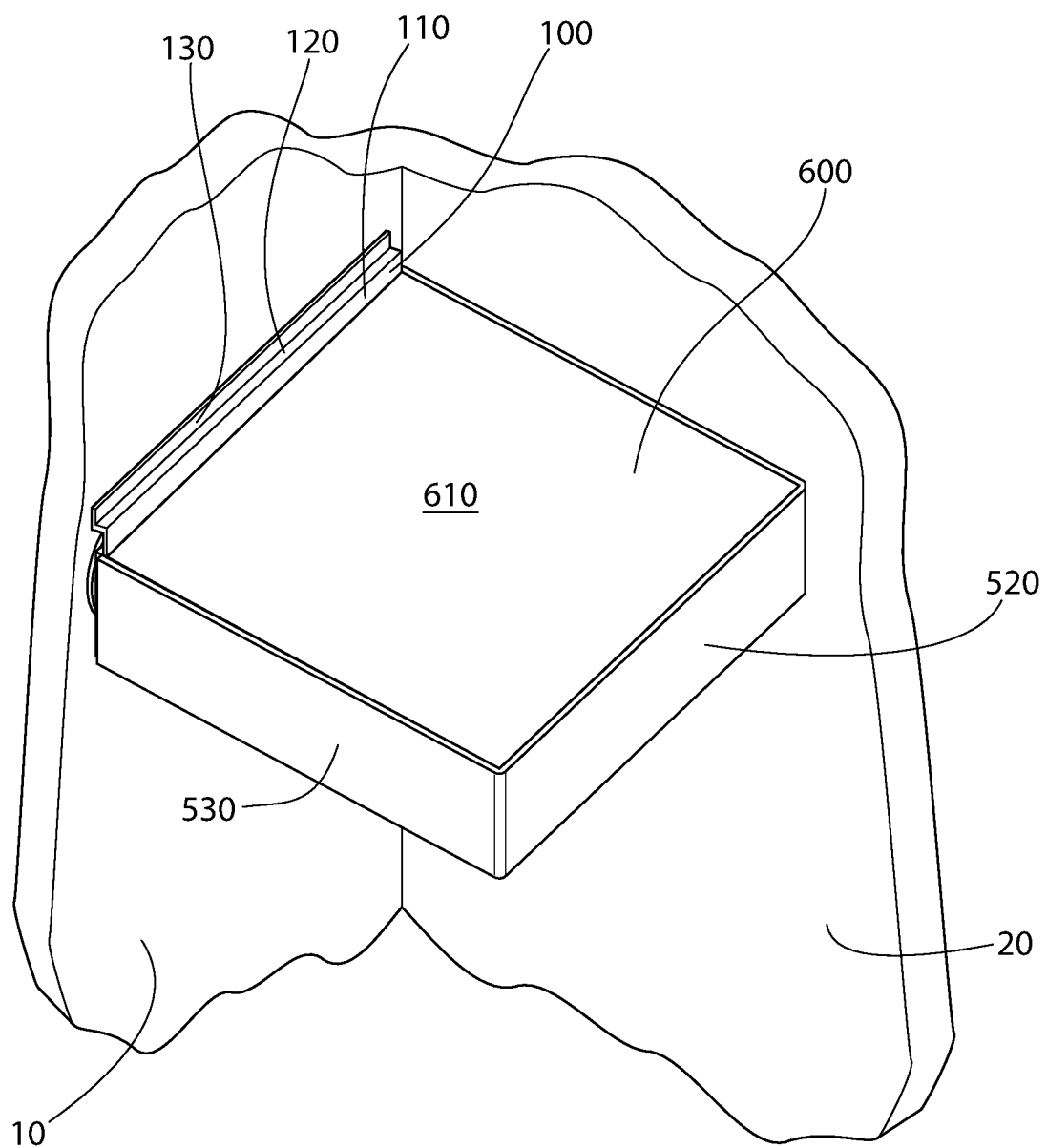
FIG. 19 is an upper perspective view of the shelf unit, mounting system, and support of FIG. 18 in an assembled state.

FIG. 18 shows a shelf insert 600 above support structure 500. FIG. 19 shows shelf insert 600 in an installed position in support structure 500. The perimeter frame support structure 500 defines an upwardly open receptacle 900 configured to receive at least a portion, or in some examples the entirety of shelf insert 600 therein (see also FIG. 9). Shelf insert 600 has a top surface 610, plurality of sides including opposing lateral right/left sides 620, and opposing front side 630 and rear side 640. In this example, shelf insert 600 slides into support structure 500 with a slight interference fit between its sides and sides 510, 520, 530, 540 until top surface 610 is substantially flush with the upper edges of sides 510, 520, 530, 540. In other embodiments, top surface 610 is above or below the upper edges of sides 510, 520, 530, 540.

Figure 20:
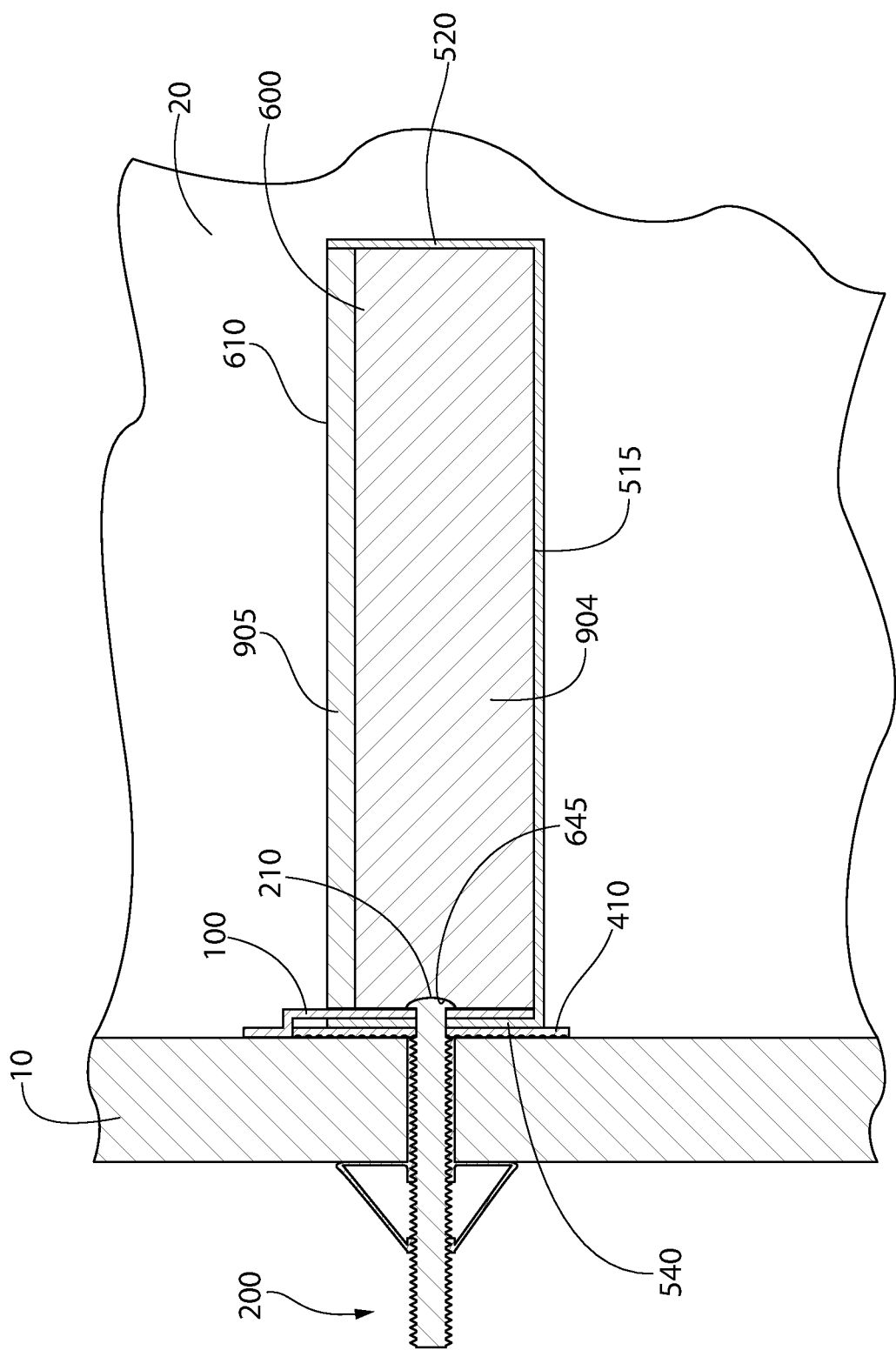
FIG. 20 is a side sectional view of the shelf unit and mounting system and support of FIG. 19.

FIG. 20 shows a side sectional view of shelf insert 600 in the installed position in support structure 500. In this example, shelf insert 600 has a groove 645 that runs horizontally along the side that contacts side 540 of support structure 500. Groove 645 is configured to accept heads 210 of fasteners 200 and can provide a locking feature that is not permanent. Shelf insert 600 is, in this example, pressed into support structure 500 until heads 210 engage groove 645, locking shelf insert 600 into place. Shelf insert 600 can then be removed by pushing it upward to disengage heads 210 from groove 645. Access to the bottom of shelf insert 600 is available through opening 580 (see FIG. 22). In other examples, individual indentations are provided for each head 210 instead of a single groove 645 that receives all heads 210.

Shelf insert 600 may be made of any suitable material, including for example without limitation wood, marble, plastics, synthetic materials, glass, or others. In some embodiments, shelf insert may have a composite construction formed of two or more materials laminated or adhesively glued together as shown in FIG. 20. The shelf insert depicted includes a veneered decorative top portion layer 905 of suitable thickness and a bottom core portion or layer 904 which formed of a different material than the veneer layer. Top layer 905 is substantially thinner in thickness than the core layer 904 which supported the decorative layer. Advantageously, this construction allows a less expensive but strong core layer 904 to be used for supporting objects placed on the shelf insert 600 which may not be so aesthetically pleasing (e.g. plywood, MDF, particle board, etc.), whereas the decorative top layer 905, which is exposed and visible to room occupants, can be esthetically pleasing (e.g. hardwood veneers, stone or marble veneers, synthetic veneers with decorative patterns, etc.). This construction is possible in the present embodiment because the core layer 904 is fully inserted inside the perimeter frame support structure 500 and not visible to the occupants. The cost of the shelf insert 600 using the foregoing composite construction can be significantly reduced.

As shown in FIG. 20, the top surface 610 defined by veneered decorative top layer 905 may be substantially flush with the top edges of the perimeter frame (i.e. side members 510-540). Only the top surface 610 is thus visible after assembling the shelf insert 600 into the perimeter frame. In other variations, an upper side portion of the top layer 905 may extend above the top edges of the perimeter frame such that the top surface 610 is raised above the top edges of the perimeter frame.

Figure 21:
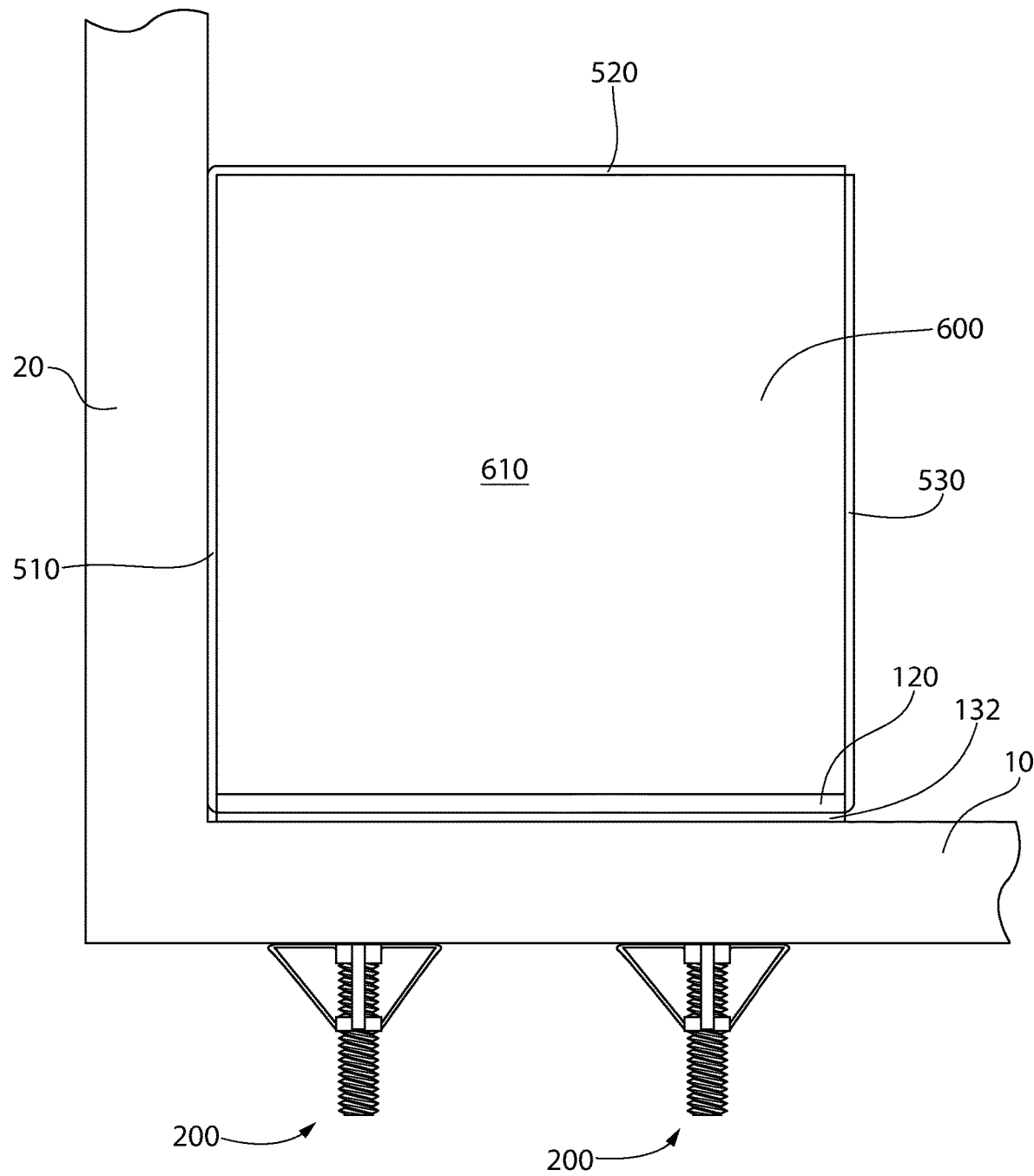
FIG. 21 is a top view of a shelf unit and the mounting system and support of FIG. 9 in an assembled state.
Figure 22:
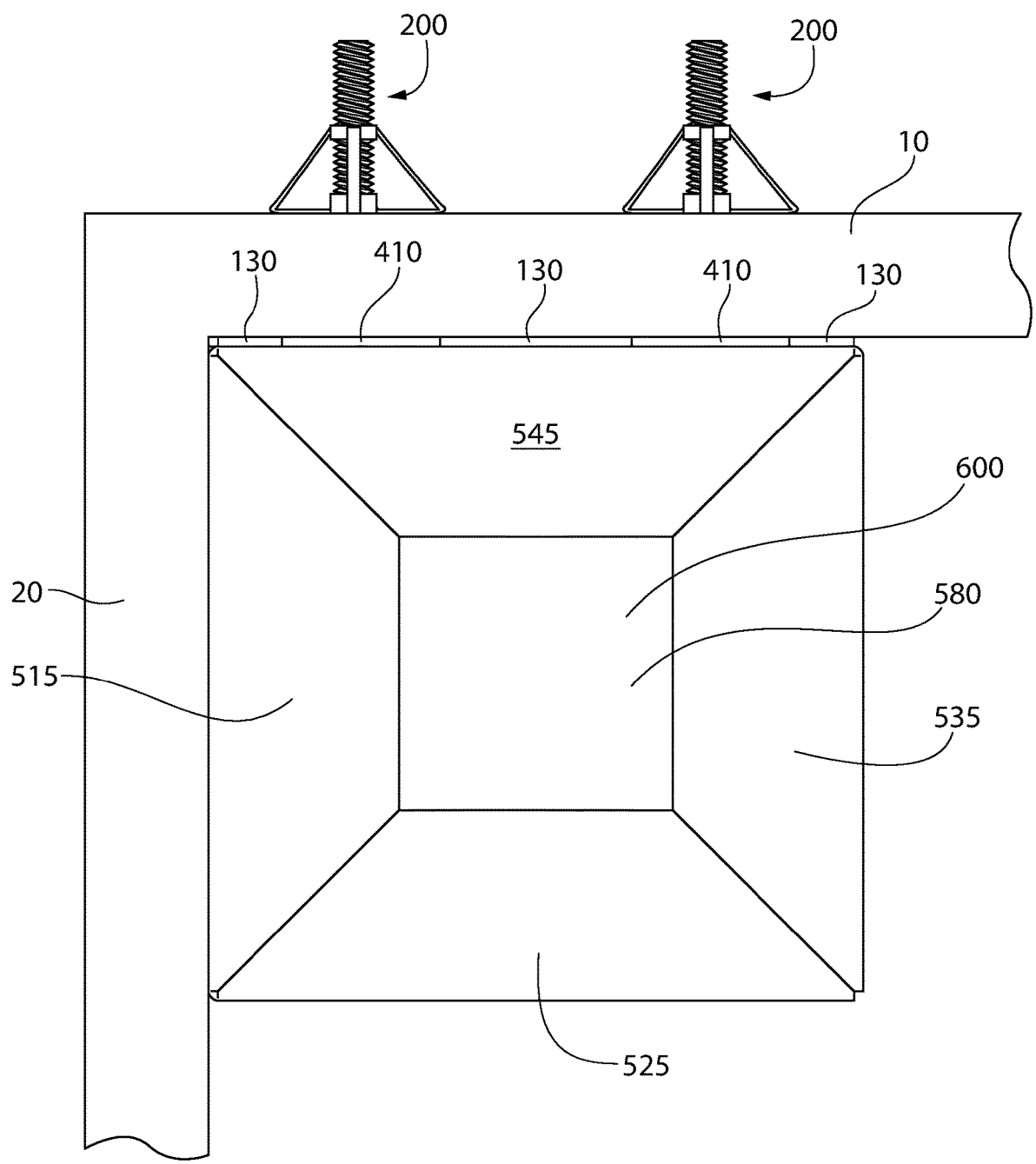
FIG. 22 is a bottom view of a shelf unit and the mounting system and support of FIG. 9 in an assembled state.
Figure 23:
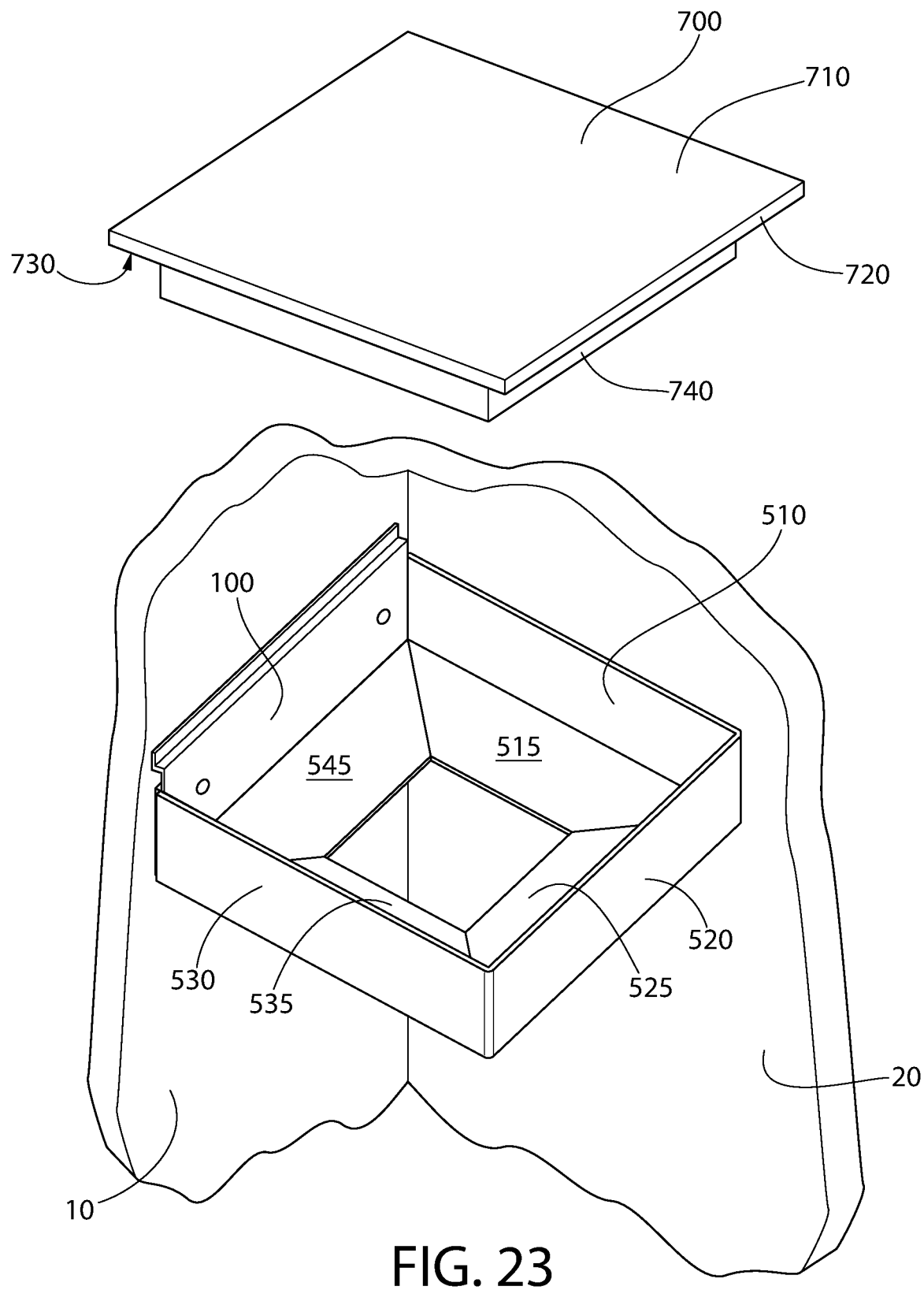
FIG. 23 is an exploded upper perspective view of a second embodiment of a shelf unit and the mounting system and support of FIG. 9.

FIG. 21 is a top view of shelf insert 600 in the installed position. FIG. 22 is a bottom view of shelf insert 600 in the installed position. The bottom of shelf insert 600 can be seen through opening 580 in FIG. 22.

FIGS. 23-27 show another example of a shelf insert 700 that can be used with support structure 500. Insert 700 comprises an upper portion 709 defining an exposed top surface 710 of the shelf and a lower insert portion 740 configured for insertion into open receptacle 900 of the perimeter frame support structure 500. Upper portion 709 has greater lateral dimensions (e.g. width and depth) measured across top surface 710 than the lower insertion portion 740. In this example, shelf insert 700 has a top surface 710 that extends beyond the perimeter frame and the downwardly projecting insert portion 740 forming cantilevered overhangs 711 such that an edge 720 of shelf insert 700 is visible. This is in contrast to shelf insert 600 previously described herein which has a top that does not extend beyond its sides and the perimeter frame (see, e.g. FIGS. 19 and 20).

Figure 25:
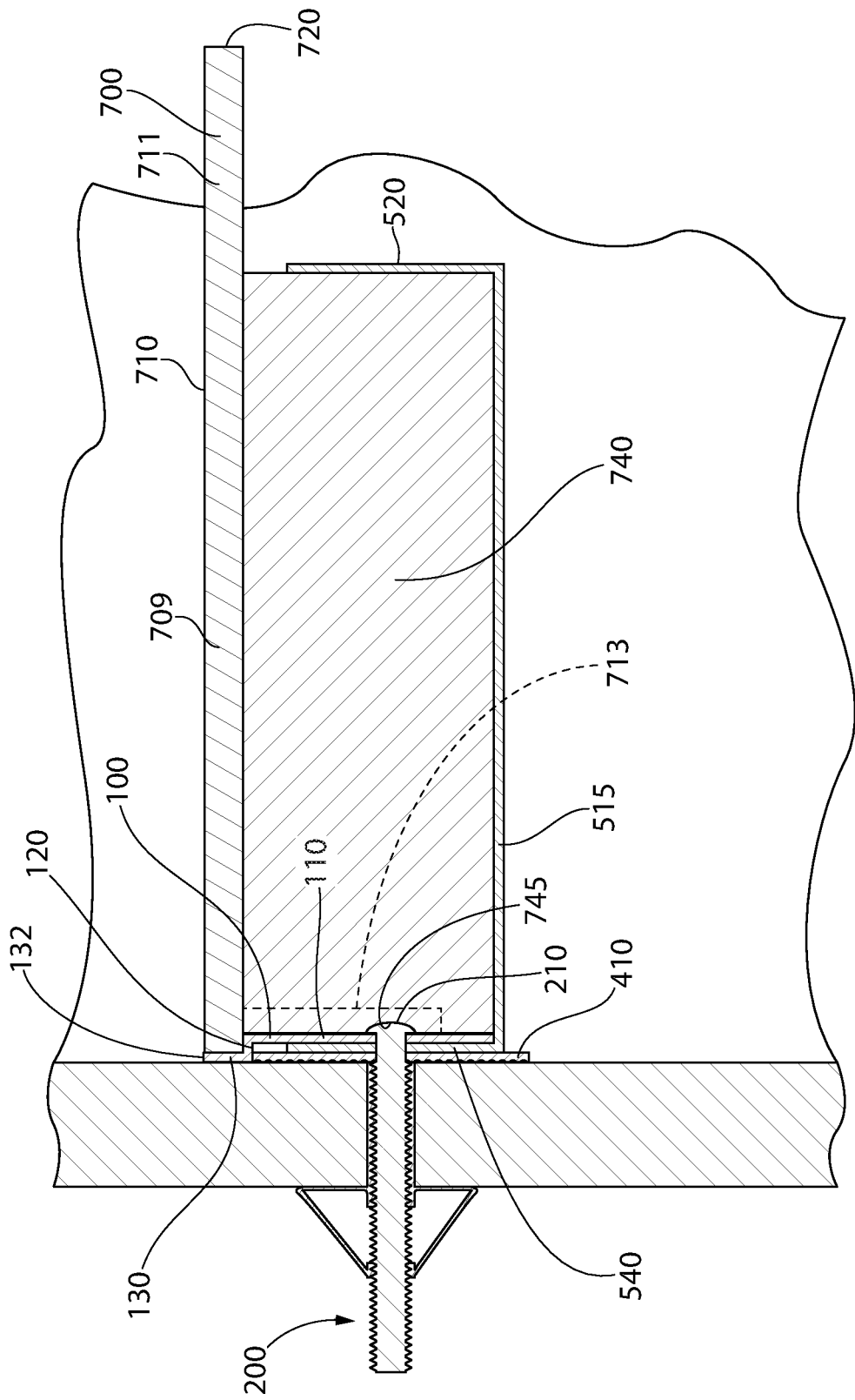
FIG. 25 is a side sectional view of the shelf unit and mounting system and support of FIG. 23.

Shelf insert 700 can be dimensioned so that when it is lowered into the perimeter frame support structure 500, the insert's bottom surface contacts and rests on horizontal portions 515, 525, 535, 545 of the support structure (see FIG. 25). In this position, shelf insert 700 rests on ledge 120 of cover 100 and top surface 710 is flush with upper edge 132 of cover 100. The cantilevered overhangs 711 formed by the upper portion 709 that extend perimetrically around the upper portion 709 and which are located above the upper edges of sides 520 and 530 of support structure 500 extend further from insert portion 740 than does the overhang 711 that is located above the upper edge of side 510 of support structure 500. This is because, in this example, wall 20 prevents the overhang that is located above the upper edge of side 510 from extending more than the thickness of side 510. In other examples where support structure 500 is not corner mounted and in contact with a wall perpendicular to wall 10 such as wall 20, the overhangs of shelf insert 700 can extend beyond all four the sides of perimeter frame support structure 500.

As shown in FIG. 25, the upper portion 709 of the shelf insert 600 does not contact sides 510-540 and is spaced vertically apart from perimeter frame support structure 500. In other possible embodiments, the shelf insert 600 and perimeter frame support structure 500 may be configured so that the overhangs 711 of the upper portion 709 may rest on the top edges of the lateral sides 510, 530 and front side 520 of the perimeter frame.

Figure 24:
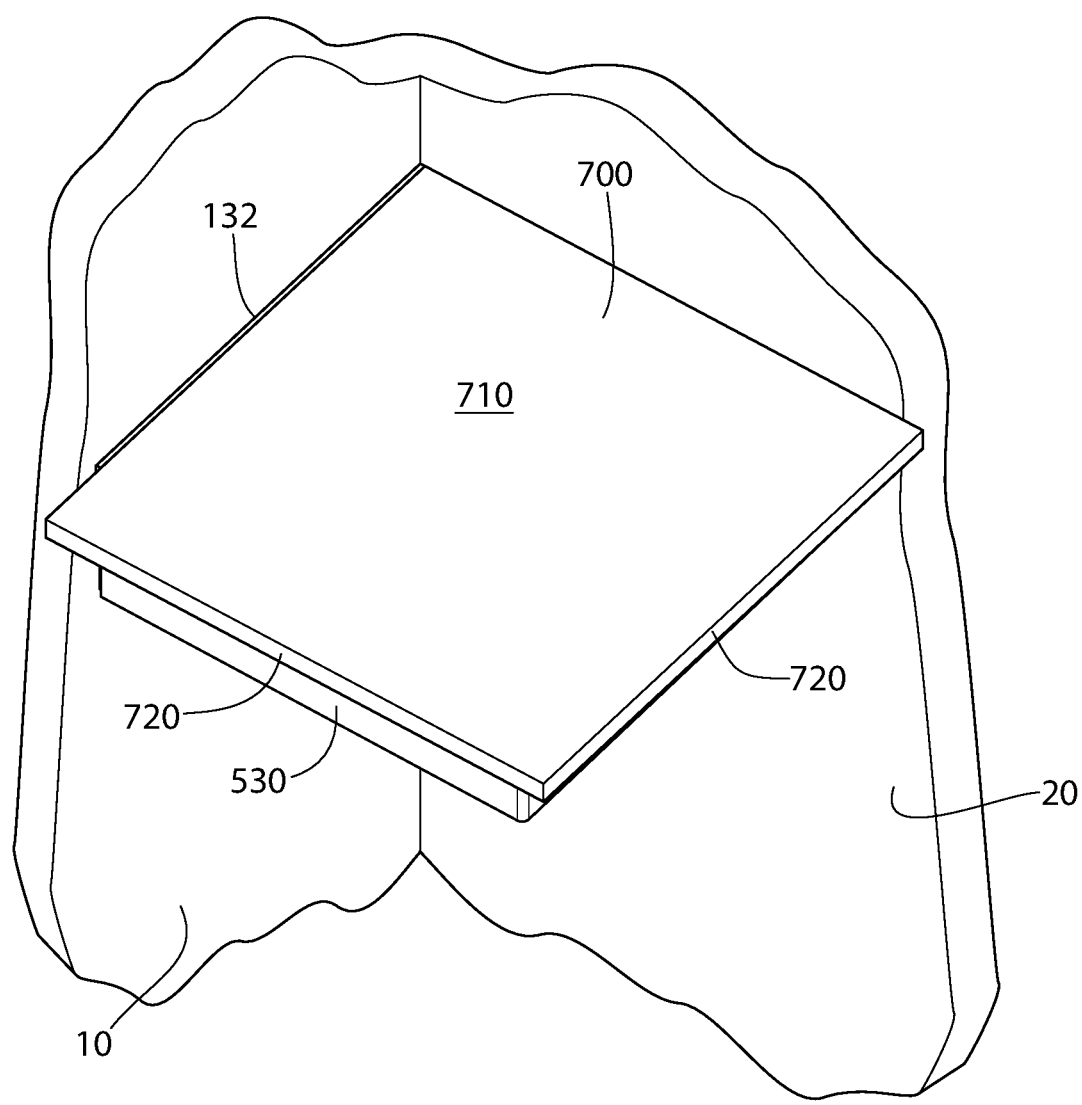
FIG. 24 is an upper perspective view of the shelf unit and mounting system and support of FIG. 23 in an assembled state.

FIG. 24 shows shelf insert 700 installed in support structure 500. In this view, upper edge 132 of cover 100 is visible. In some embodiments, upper edge 132 is flush with top surface 710 of shelf insert 700. In other embodiments, upper edge 132 extends above top surface 710. In other embodiments, upper edge 132 and ledge 120 of cover 100 extend above top surface 710. In some embodiments where upper edge 132 and ledge 120 extend above top surface 710, an underside 730 of top surface 710 rests on the upper edges of sides 510, 520, 530 instead of, or in addition to, the bottom of shelf insert 700 contacting horizontal portions 515, 525, 535, 545 of support structure 500.

FIG. 25 is a side sectional view of shelf insert 700 installed in support structure 500. In this example, shelf insert 700 has a groove 745 that runs horizontally along the side that contacts side 540 of support structure 500. Groove 745 is configured to accept the protruding heads 210 of fasteners 200 and can provide a locking feature that is not permanent. Shelf insert 700 is, in this example, pressed into support structure 500 until heads 210 engage groove 745, thereby locking shelf insert 700 into place. Shelf insert 700 can then be removed by pushing it upward to disengage heads 210 from groove 745. Access to the bottom of shelf insert 700 is available through opening 580 (see FIG. 27). In other examples, individual indentations are provided for each head 210 instead of a single groove 745 that receives all heads 210. In other possible constructions, a non-locking shelf insert 600 may be provided which includes a large single rear facing cavity 713 (represented by dashed lines) formed in lower insert portion 740 of the shelf insert for receiving the fastener heads 210. Alternatively, two individual smaller individual cavities 713 (i.e. one for each fastener head) may instead be provided. In yet other constructions, flat head fasteners 200 may be used and the mounting holes 560 in rear side 540 of the support structure may be countersunk to eliminate the need for the rear cavities or groove where a self-locking shelf insert 600 is not required.

Figure 26:
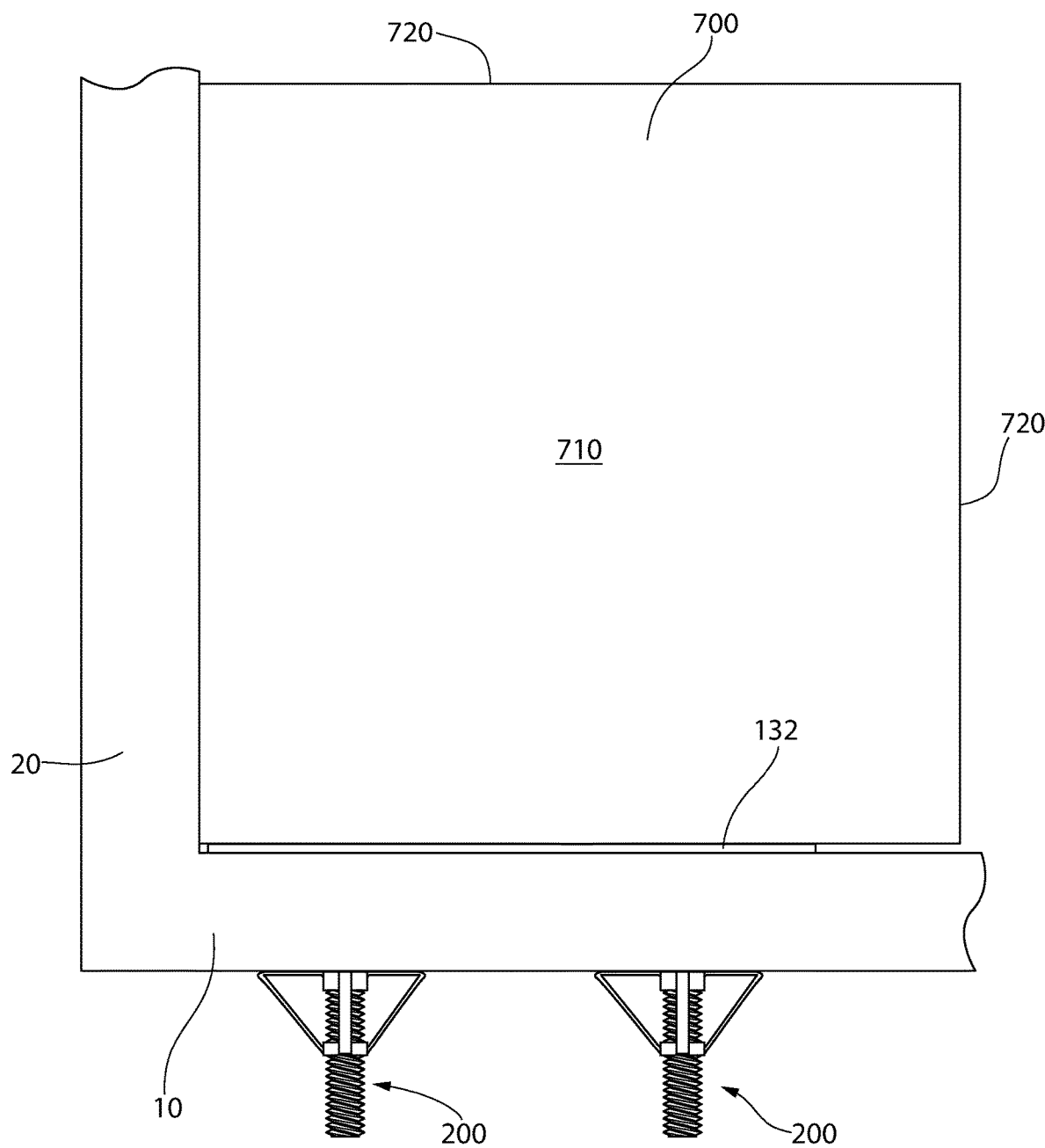
FIG. 26 is a top view of the shelf unit and mounting system and support of FIG. 23.
Figure 27:
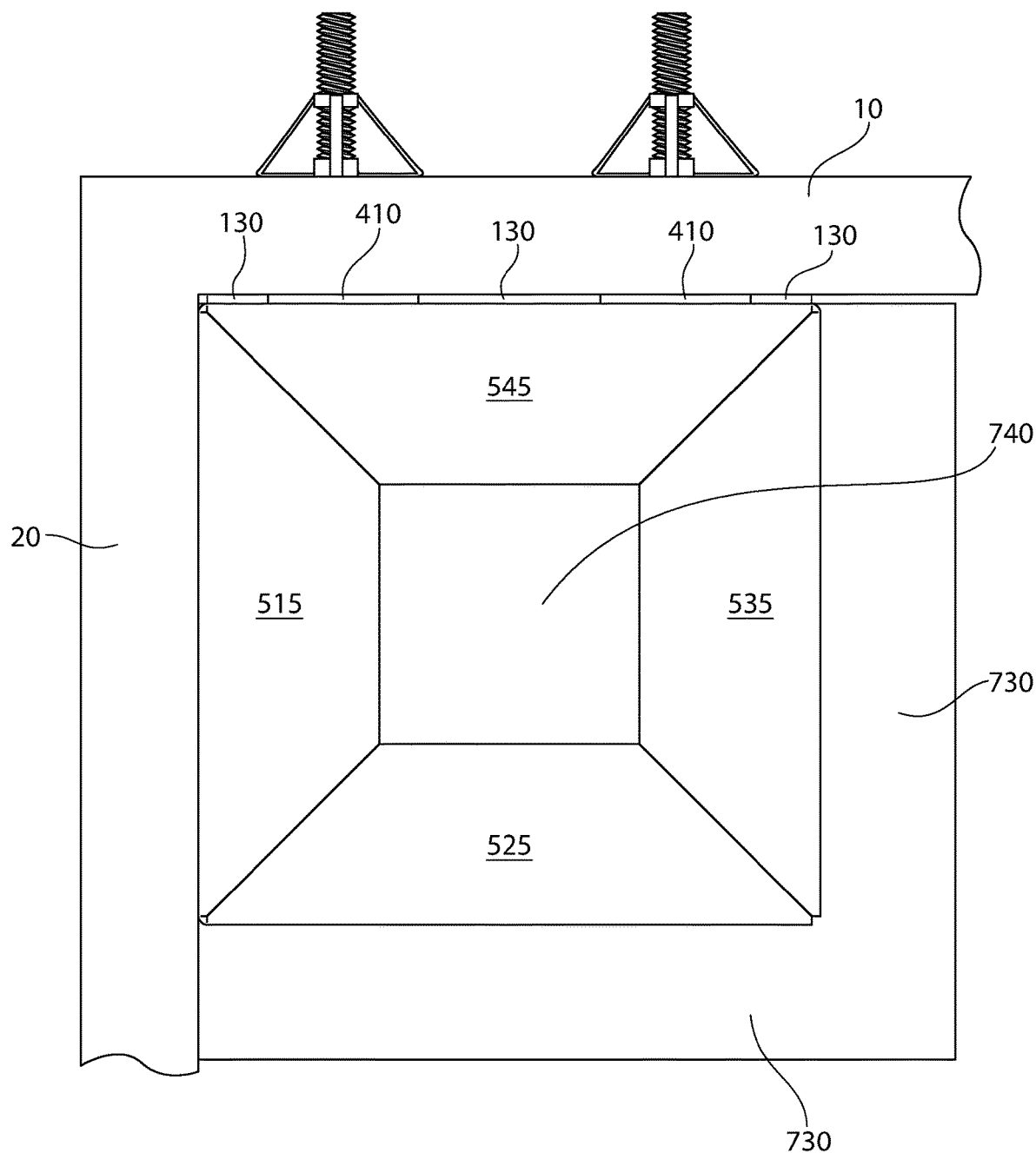
FIG. 27 is a bottom view of the shelf unit and mounting system and support of FIG. 23.

FIG. 26 is a top view of shelf insert 700 in the installed position. FIG. 27 is a bottom view of shelf insert 700 in the installed position. In FIG. 27, the bottom of shelf insert 700 can be seen through opening 580 and the underside 730 of top surface 710 can be seen extending beyond sides 520 and 530 of support structure 500.

It bears noting that the lower insert portion 740 may be formed of a stronger core material which is not esthetically pleasing while the visible upper portion 709 is made of a different more esthetically pleasing material in appearance. In other embodiments, the upper and lower portions may be parts of a monolithic unitary structure formed of a single material.

Figure 28:
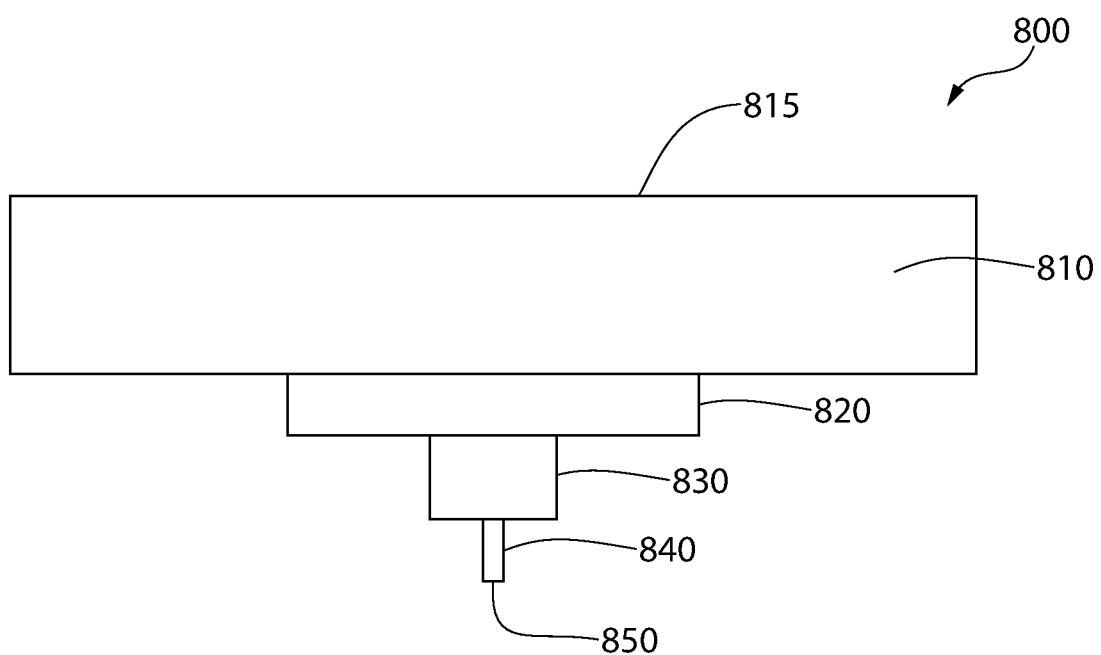
FIG. 28 is side view of a soap dispenser in accordance with embodiments of the invention.
Figure 29:
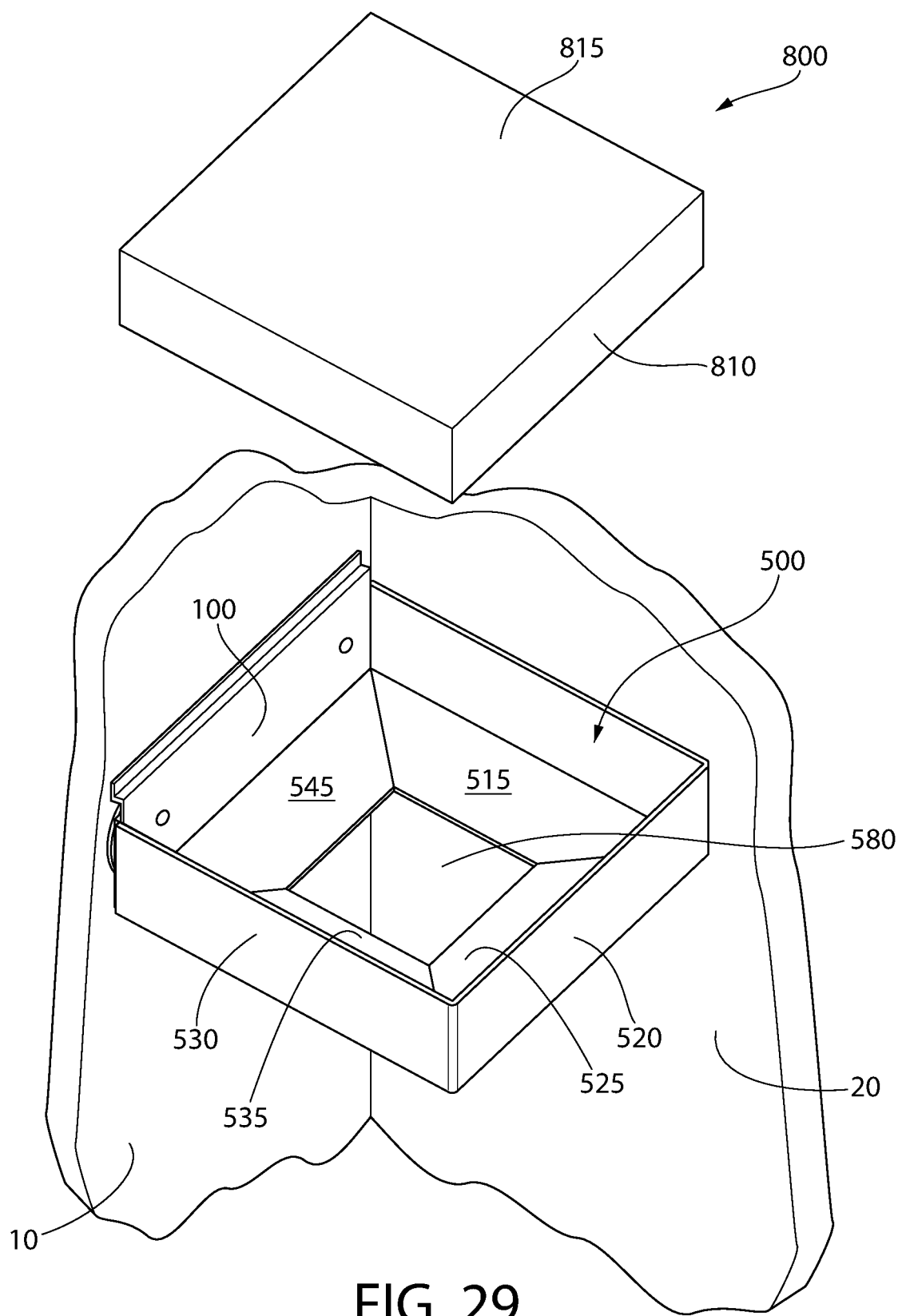
FIG. 29 is an exploded upper perspective view of the soap dispenser of FIG. 28 and the mounting system and support of FIG. 9.
Figure 30:
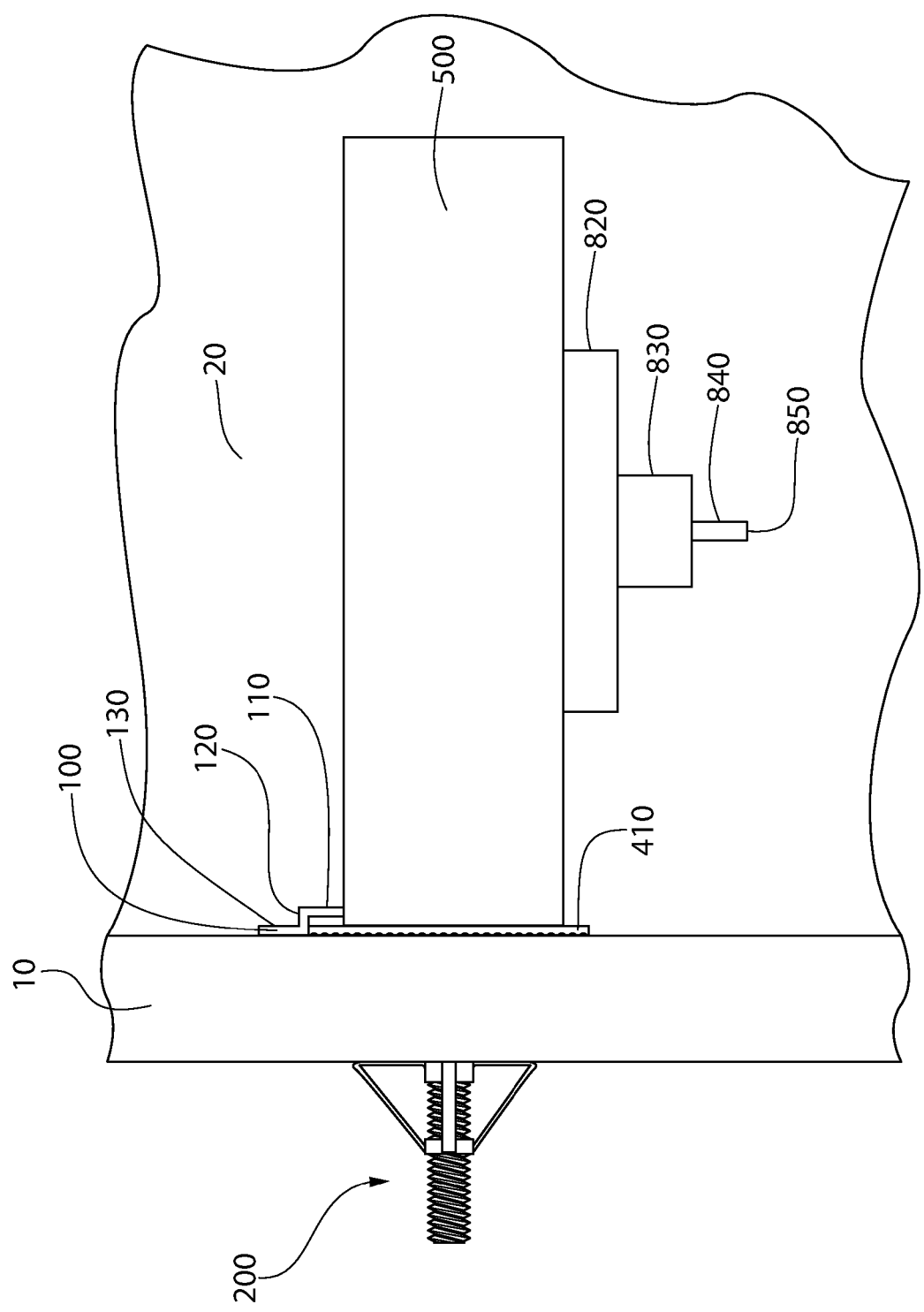
FIG. 30 is a side view of the soap dispenser and mounting system and support of FIG. 29 in an assembled state.
Figure 31:
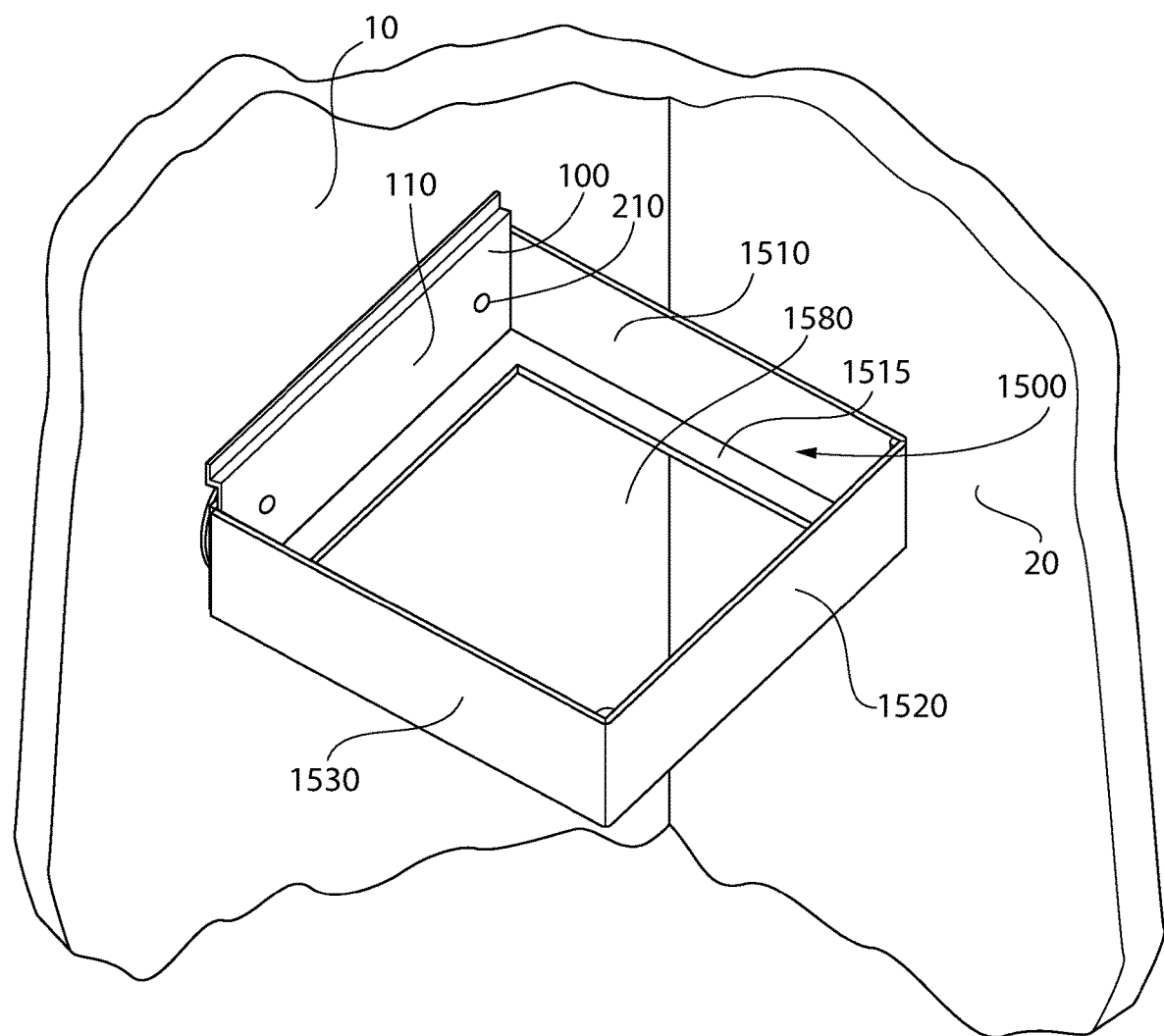
FIG. 31 is an upper perspective view of a mounting system and support in accordance with exemplary embodiments of the invention.

FIGS. 28-30 show an example of an accessory other than a shelf that can be install in support structure 500. This example shows a soap dispenser 800, but any accessory that can be supported by support structure 500 can be substituted for soap dispenser 800.

FIG. 28 shows soap dispenser 800 having a reservoir 810 that holds soap to be dispensed by soap dispenser 800. In this example, reservoir 810 fits completely inside of support structure 500 such that an upper surface 815 is flush with the upper edges of the sides of support structure 500. A first extension 820 extends down from reservoir 810 and, when installed in support structure 500, extends through opening 580 (see FIG. 30). A second extension 830 extends down from first extension 820 and can house a pump that expels soap from soap from soap dispenser 800. A distributing tube 840 extends down from second extension 830 and terminates with a nozzle opening 850 through which soap is dispensed.

FIG. 30 shows soap dispenser 800 in an installed position with first extension 820, second extension 830, and distributing tube 840 extending out of opening 580 and below support structure 500.

FIGS. 31-34 show an example of an alternate embodiment of the invention. In this example, support structure 1500 has four side elements or members 1510, 1520, 1530, 1540 (also referred to as "sides" for brevity). Unlike other examples that have four horizontal portions, this example has a single horizontal portion 1515 extending from all four sides 1510, 1520, 1530, 1540 toward a central opening 1580 of support structure 1500. In other examples, the four horizontal portions could have their adjacent edges attached to each by welding or some other means. In this example, the vertical edges between the adjacent ones of sides 1510, 1520, 1530, 1540 are attached to each other by welding or some other means. In other examples, the vertical edges of sides 1510, 1520, 1530, 1540 contact the vertical edges of the adjacent sides, but are not attached to those adjacent vertical edges. In other examples, the vertical edges of sides 1510, 1520, 1530, 1540 do not contact the vertical edges of the adjacent sides. In some examples, horizontal portion 1515 is solid such that no opening 1580 exists. In this example, side 1510 does not contact wall 20. In other examples, side 1510 contacts wall 20 but is not fastened to wall 20. In other examples, side 1520 is fastened to wall 20 in the same manner that side 1540 is fastened to wall 10.

Figure 32:
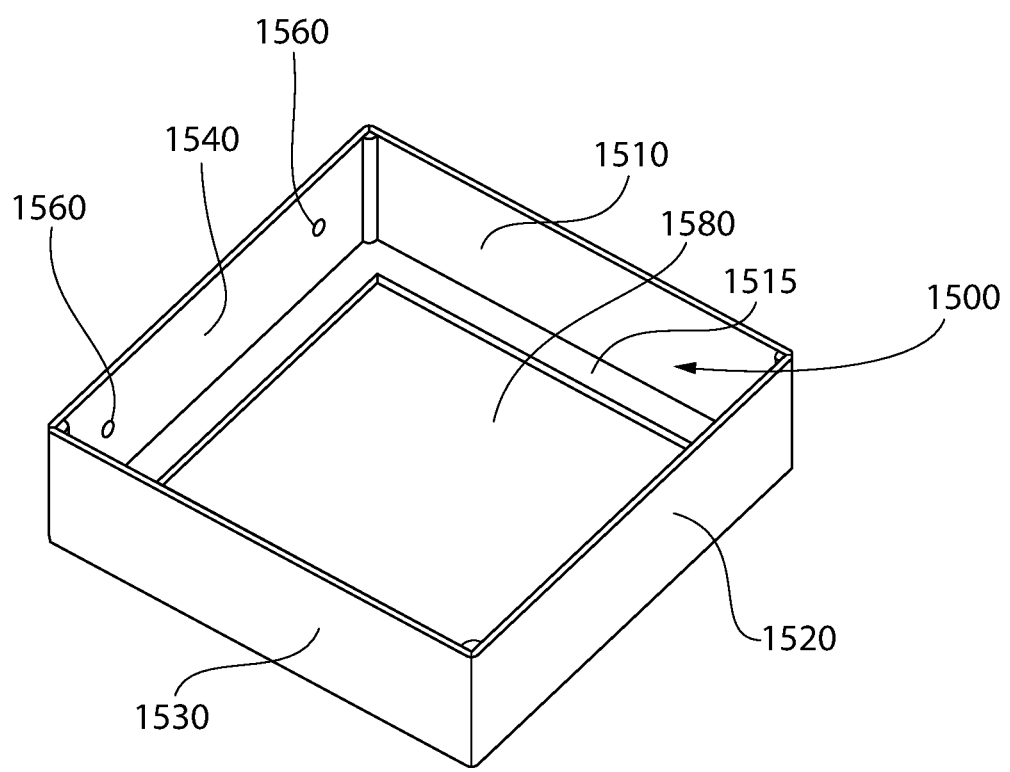
FIG. 32 is an upper perspective view of the support of FIG. 31.

FIG. 32 shows support structure 1500 as having two holes 1560 in side 1540. Holes 1560 serve the same purpose as holes 330 of shelf 300 (FIG. 4). Due to the fabrication method used in this example, a continuous corner exists between side 1510 and horizontal portion 1515, between side 1520 and horizontal portion 1515, between side 1530 and horizontal portion 1515, and between side 1540 and horizontal portion 1515. In contrast, a joint exists between each of the adjacent edges of sides 1510, 1520, 1530, 1540 (explained further below).

Figure 33:
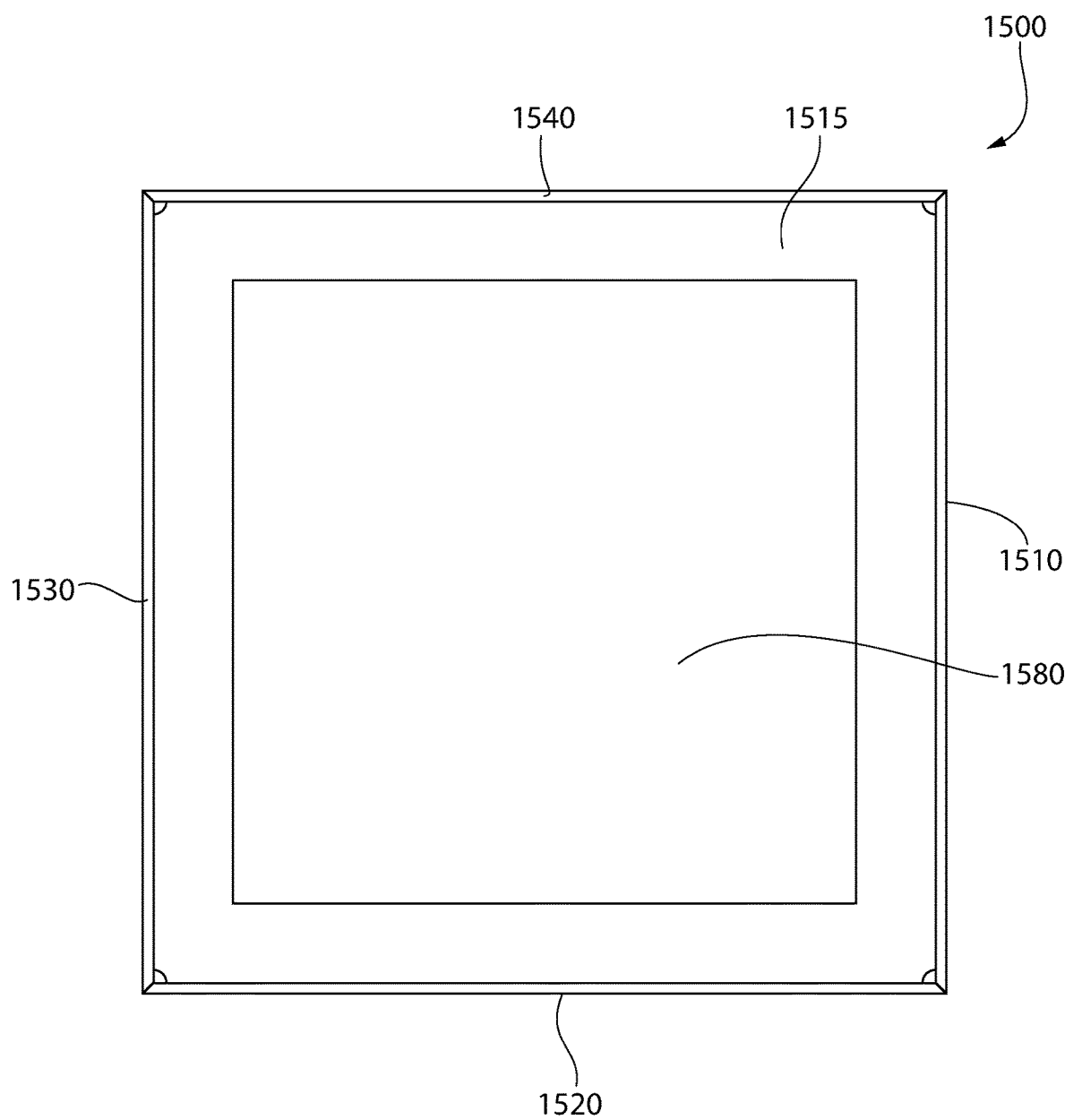
FIG. 33 is a top view of the support of FIG. 31.

FIG. 33 is a top view of support structure 1500 and shows opening 1580 and the joints at each of the corners between sides 1510, 1520, 1530, 1540.

Figure 34:
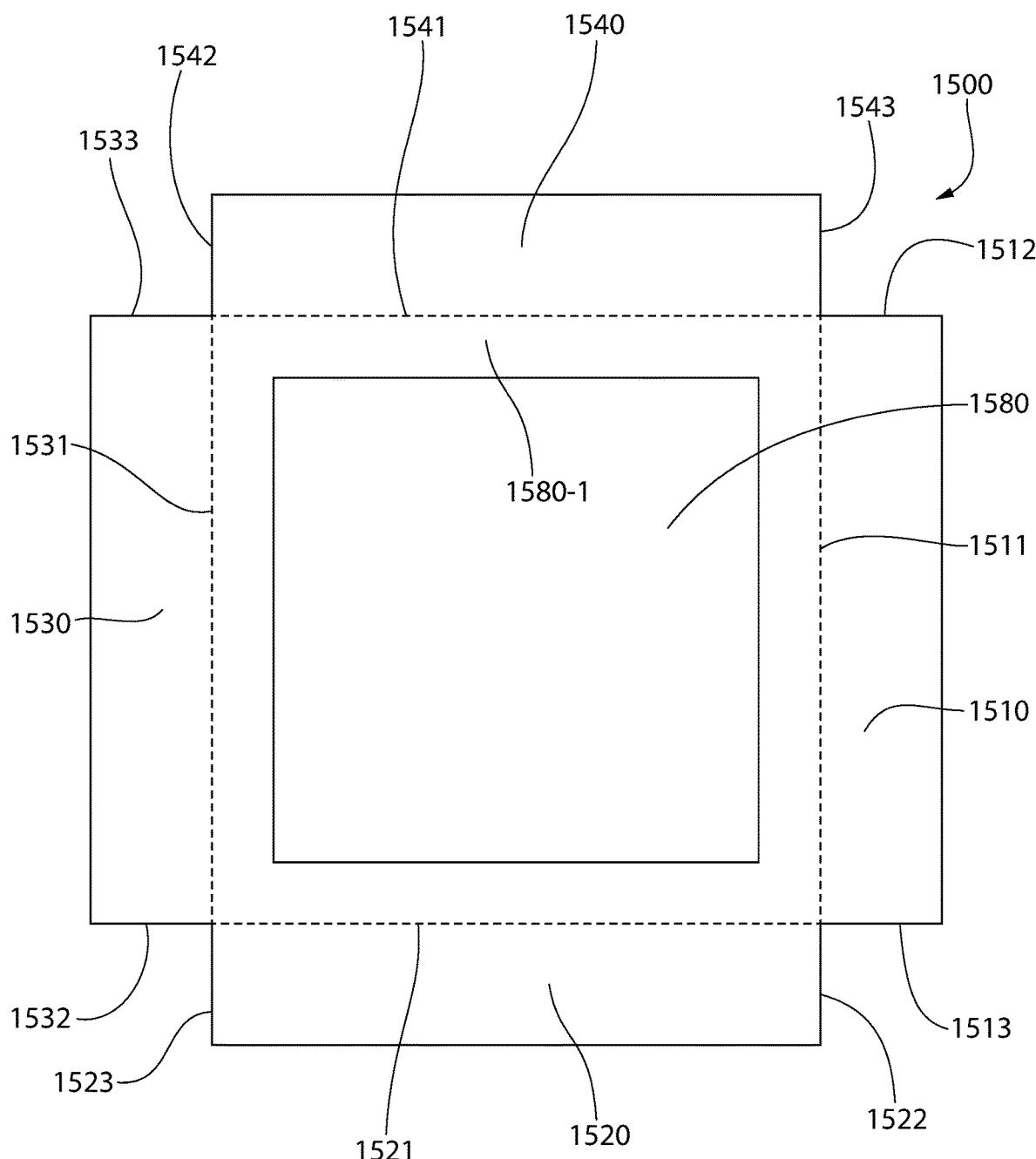
FIG. 34 is a top view of the support of FIG. 31 showing a workpiece blank in an unassembled state prior to being bent to shape.

FIG. 34 is a plan view of the perimeter frame support structure 1500 prior to assembly. This view shows a flat piece of workpiece material or blank after being cut to shape, but before being folded/bent and, in some examples, welded. In this view, horizontal portion 1515 is shown surrounding central opening 1580 as is the case after assembly. However, sides 1510, 1520, 1530, 1540 are shown in the same plane as horizontal portion 1515 prior to bending. Side 1510 is bent at, in this example, 90 degrees along line 1511. Side 1520 is bent at, in this example, 90 degrees along line 1521. After sides 1510 and 1520 are bent into position, edge 1513 of side 1510 and edge 1522 of side 1520 come into contact with each other and, in this example, are welded together. Side 1530 is bent at, in this example, 90 degrees along line 1531. After sides 1520 and 1530 are bent into position, edge 1523 of side 1520 and edge 1532 of side 1530 come into contact with each other and, in this example, are welded together. Side 1540 is bent at, in this example, 90 degrees along line 1541. After sides 1530 and 1540 are bent into position, edge 1533 of side 1530 and edge 1542 of side 1540 come into contact with each other and, in this example, are welded together. After sides 1540 and 1510 are bent into position, edge 1543 of side 1540 and edge 1512 of side 1510 come into contact with each other and, in this example, are welded together. This assembly procedure results in the box-shaped support structure 1500 shown in FIG. 32. While welding is used in this example, other examples can use other joining methods. Still other examples do not join the edges of the sides, but instead rely on the strength of the material alone to maintain the desired shape. For example, a stainless steel or other materials of sufficient thickness can be used without welding the edges and still provide the required rigidity and strength. It bears noting that using the present workpiece to fabricate the perimeter frame may be more expedient and cost effective than the workpiece blank shown in FIGS. 16-17. For example, the rectilinear annular bottom horizontal portion 1580-1 of perimeter frame 1500 has a contiguous and continuous structure. This contrasts to the perimeter frame 500 seen for example in FIG. 12 in which the horizontal portions is formed by multiple segments each associated with a vertical side portion of side elements 510-540 which create diagonal seams/joints between the horizontal portion, which are then optionally welded together alone the joints for rigidity.

Figure 35:
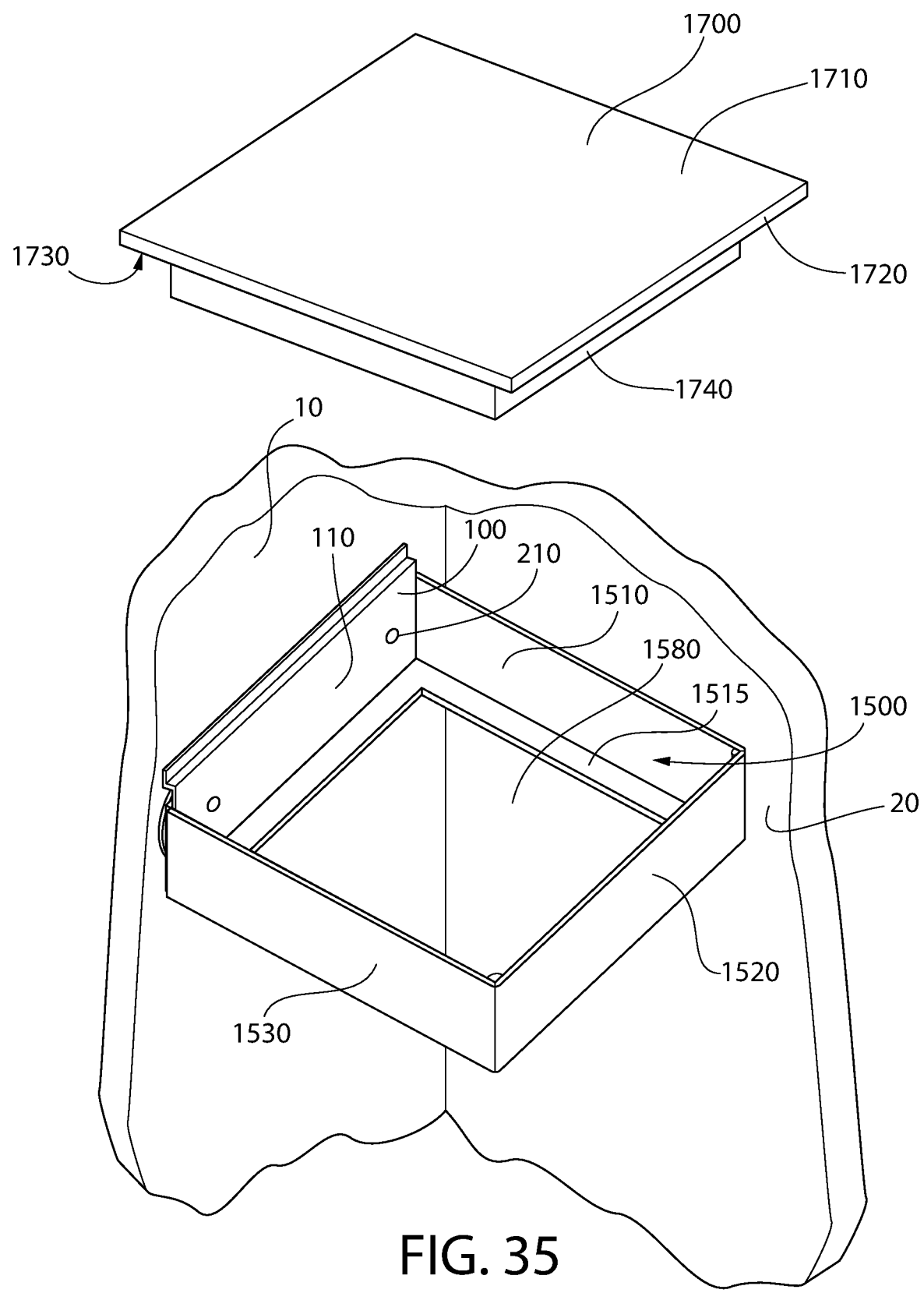
FIG. 35 is an exploded upper perspective view of a shelf unit and the mounting system and support of FIG. 31.
Figure 36:
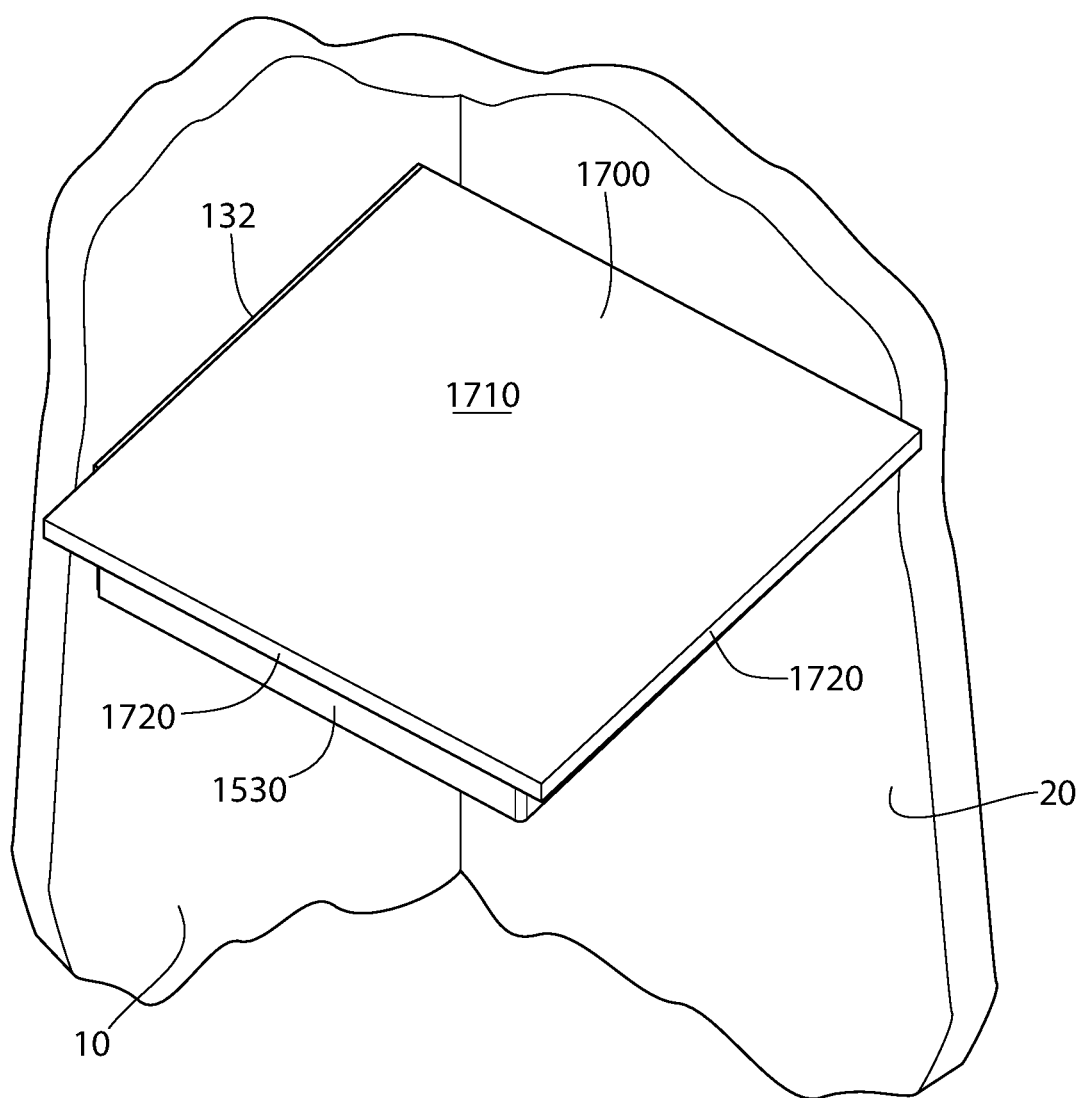
FIG. 36 is an upper perspective view of the shelf unit, mounting system, and support of FIG. 35 in an assembled state.

FIGS. 35 and 36 show an example of a shelf insert 1700 that can be used with support structure 1500. In this example, shelf insert 1700 has a top surface 1710 that extends beyond an insert portion 1740 such that an edge 1720 of shelf insert 1700 is visible. This is in contrast to shelf inserts which have a top that does not extend beyond its sides. Shelf insert 1700 is lowered into support structure 1500 until an under side 1730 of shelf insert 1700 contacts the upper edges of sides 1510, 5120, 1530, 1540. In some embodiments, this coincides with a bottom surface of insert portion 1740 contacting horizontal portion 1515 of support structure 1500. In some embodiments, only the bottom surface of insert portion 1740 contacts horizontal portion 1515 of support structure 1500, and underside 1730 does not contact the upper edges of sides 1510, 5120, 1530, 1540. In this position, in some embodiments, shelf insert 1700 rests on ledge 120 of cover 100 and top surface 1710 is flush with upper edge 132 of cover 100. The overhangs that are located above the upper edges of sides 1510, 1520, 1530 of support structure 1500 extend further from insert portion 740 than does the overhang that is located above the upper edge of side 1540 of support structure 1500. This is because of cover 100 preventing the overhang located above side 1540 from extending beyond a certain amount. In other examples, wall 20 prevents the overhang that is located above the upper edge of side 1510 from extending more than the thickness of side 1510.

FIG. 36 shows shelf insert 1700 installed in support structure 1500. In this view, upper edge 132 of cover 100 is visible. In some embodiments, upper edge 132 is flush with top surface 1710 of shelf insert 1700. In other embodiments, upper edge 132 extends above top surface 1710. In other embodiments, upper edge 132 and ledge 120 of cover 100 extend above top surface 1710. In some embodiments where upper edge 132 and ledge 120 extend above top surface 1710, underside 1730 of top surface 1710 rests on the upper edges of sides 1510, 1520, 1530 instead of, or in addition to, the bottom of shelf insert 1700 contacting horizontal portion 1515 of support structure 1500.

Figure 37:
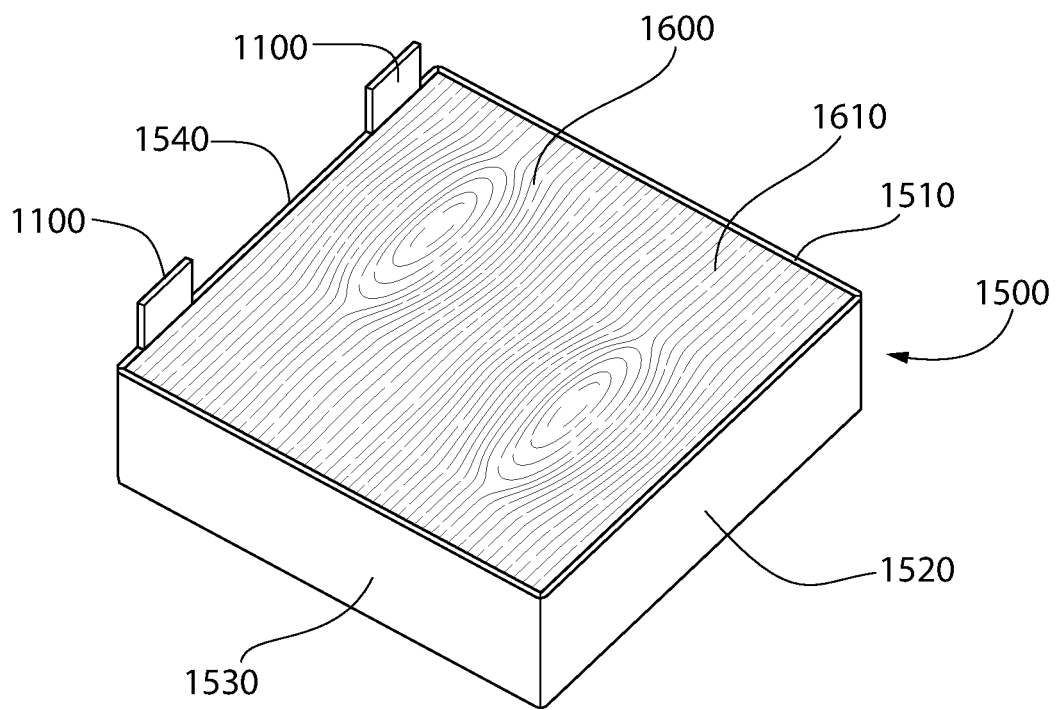
FIG. 37 is an upper perspective view of a shelf unit, mounting system, and support in accordance with exemplary embodiments of the invention in an assembled state.
Figure 38:
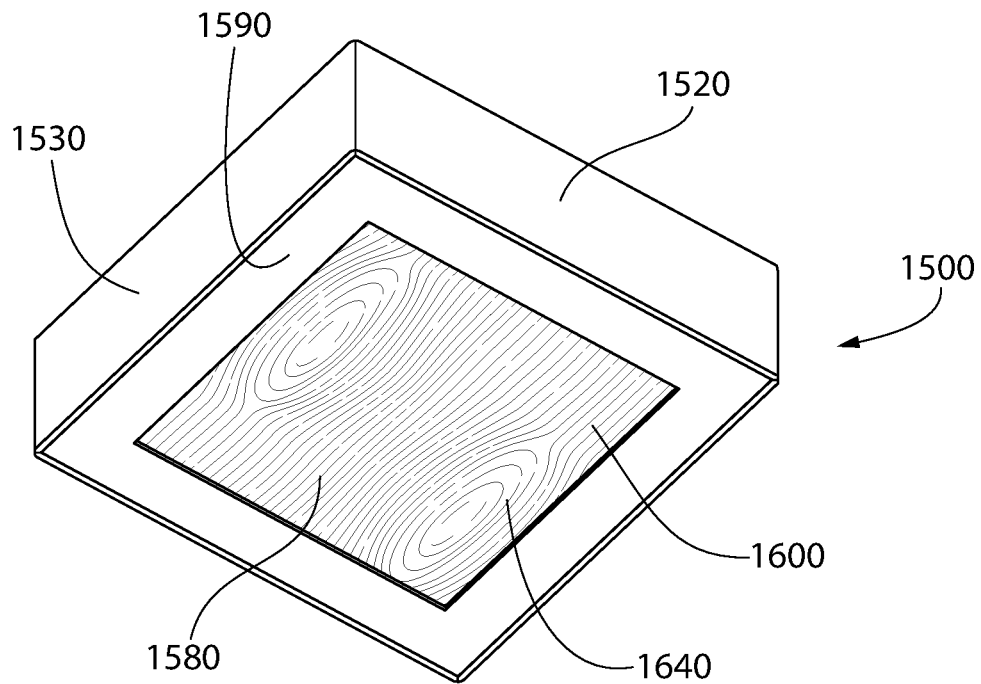
FIG. 38 is a lower perspective view of the assembly of FIG. 37.

FIG. 37 shows shelf insert 1600 in an installed position in support structure 1500. Shelf insert 1600 has a top surface 1610. In this example, shelf insert 1600 slides into support structure 1500 with a slight interference fit between its sides and sides 1510, 1520, 1530, 1540 until top surface 1610 is flush with the upper edges of sides 1510, 1520, 1530, 1540. In other embodiments, top surface 1610 is above or below the upper edges of sides 1510, 1520, 1530, 1540. In some embodiments, shelf insert 1600 slides into support structure 1500 with no interference between its sides and sides 1510, 1520, 1530, 1540. FIG. 38 shows a bottom view of shelf insert 1600 and support structure 1500. In this view the bottom surface 1640 of shelf insert 1600 is visible through central opening 1580 of support structure 1500. In this example, bottom surface 1640 of shelf insert 1600 rests on horizontal portion 1515 and top surface 1610 is even with the upper edges of sides 1510, 1520, 1530, 1540. In the example shown in FIGS. 37 and 38 shelf insert 1600 is made of wood. In other examples, shelf inserts can be made of metal, plastic, composites, or any other appropriate material.

Figure 39:
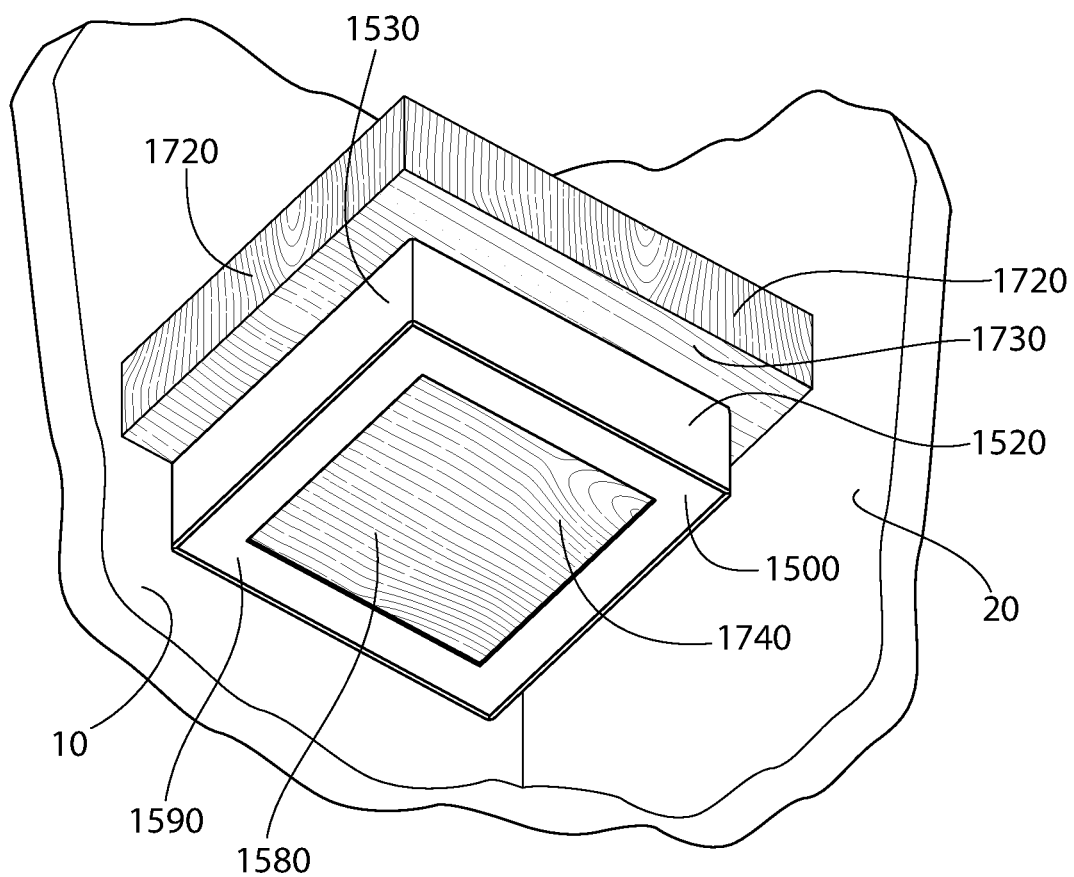
FIG. 39 is a lower perspective view of a shelf unit, mounting system, and support in accordance with exemplary embodiments of the invention in an assembled state.
Figure 40:
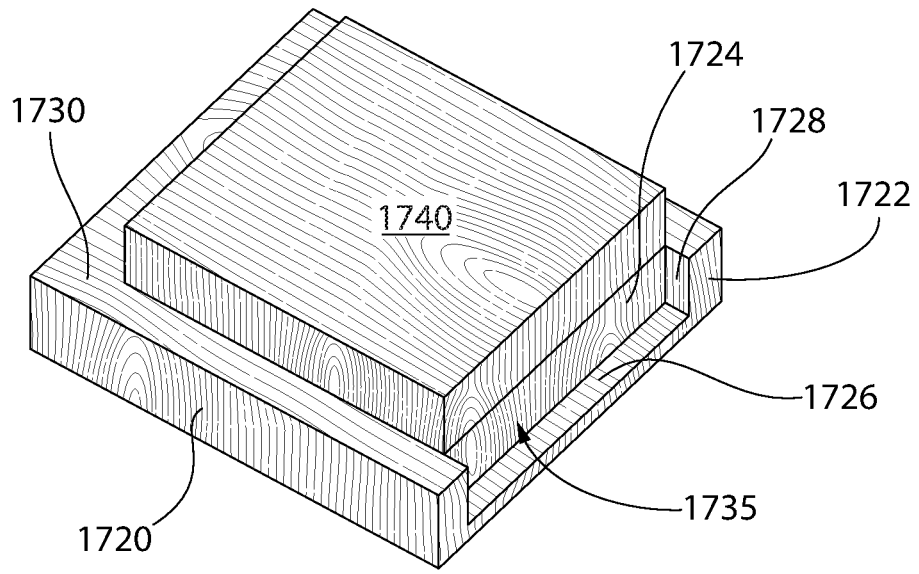
FIG. 40 is an upper perspective view of the underside of the shelf unit of FIG. 39.

FIG. 39 shows shelf insert 1700 in an installed position in support structure 1500. Shelf insert 1700 has a bottom surface 1740. In this example, shelf insert 1700 slides into support structure 1500 with a slight interference fit between its sides and sides 1510, 1520, 1530, 1540 until bottom surface 1740 contacts and rests on horizontal portion 1515 of support structure 1500 and/or underside 1730 rests on the upper edges of sides 1510, 1520, 1530, 1540. In some embodiments, shelf insert 1700 slides into support structure 1500 with no interference between its sides and sides 1510, 1520, 1530, 1540. FIG. 40 shows a bottom view of shelf insert 1700 and support structure 1500. In this view the bottom surface 1740 of shelf insert 1700 is visible through central opening 1580 of support structure 1500. In the example shown in FIGS. 39 and 40 shelf insert 1700 is made of wood. In other examples, shelf inserts can be made of metal, plastic, composites, or any other appropriate material.

The example shown in FIGS. 39 and 40 has a recess 1735 in the rear side of shelf insert 1700 that is adjacent to, in this case, wall 10. The following can also be applied to multiple sides of shelf insert 1700 if support structure 1500 is attached to multiple walls. Recess 1735 is provided to allow shelf insert 1700 to fit above and cover the attachment hardware used to attach support structure 1500 to the wall. This attachment hardware can include, for example, one or more covers 100, fasteners 200, and force-distributing plates 410. In this example, recess 1735 is bounded by rear facing surface 1724, and opposing inward lateral surfaces 1726 and 1728. Surface 1724 of recess 1735 is coplanar with the adjacent side of the portion of shelf insert 1700 that sits inside of support structure 1500. In other embodiments, surface 1724 of recess 1735 is on a different plane than the adjacent side of the portion of shelf insert 1700 that sits inside of support structure 1500. The edge 1720 of shelf insert 1700 that is adjacent to the wall when installed is reduced in area by recess 1735 to a smaller surface 1722. In the example shown in FIGS. 39 and 40, shelf insert 1700 is shown as two parts. However, in other embodiments shelf insert 1700 is one piece, or more than two pieces. The dimensions of recess 1735 can be dictated by the size of the hardware that is used and needs to be covered.

Figure 41:
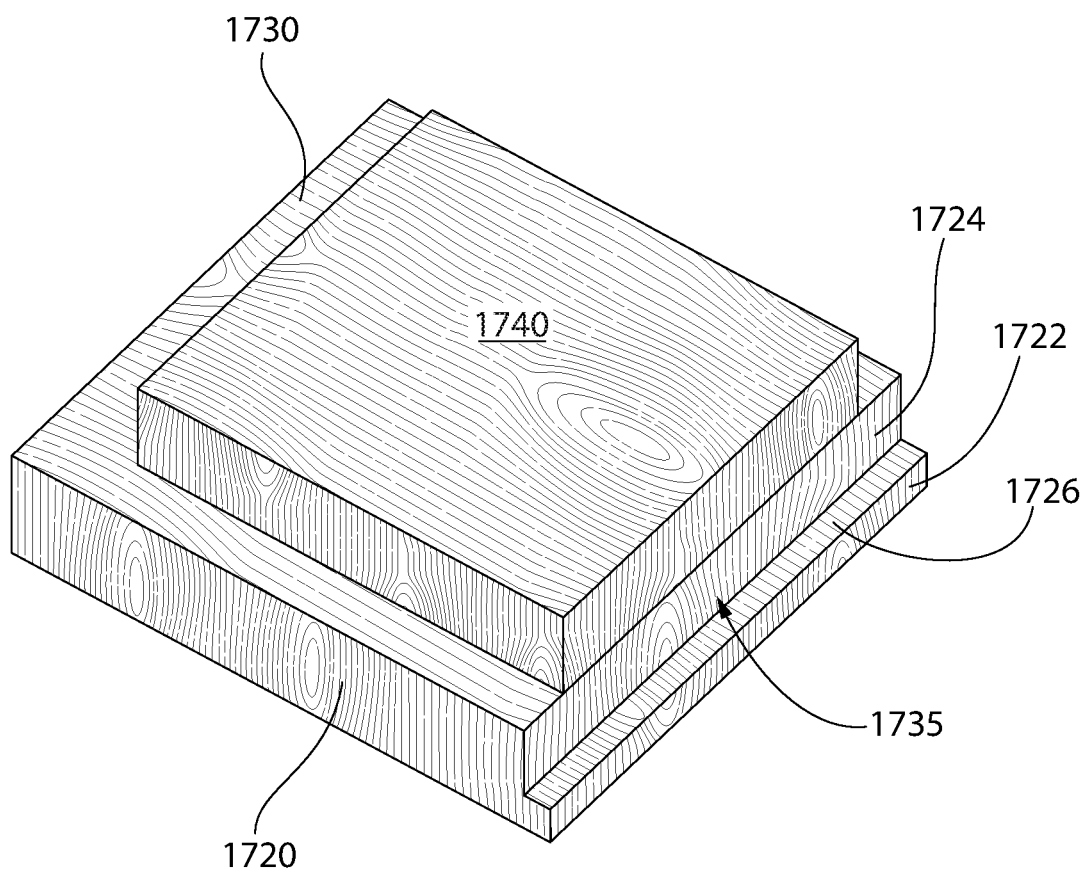
FIG. 41 is an upper perspective view of the underside of a shelf unit in accordance with exemplary embodiments of the invention.

A slightly different embodiment of shelf insert 1700 is shown in FIG. 41. In this example, recess 1735 extends the entire width of shelf insert 1700. This embodiment might be easier to manufacture and does not contact the wall along the entire height of shelf insert 1700. This embodiment can be more universal due to its ability to fit over attachment hardware having a greater width than can the example shown in FIGS. 39 and 40. Surface 1724 of recess 1735 is coplanar with the adjacent side of the portion of shelf insert 1700 that sits inside of support structure 1500. In other embodiments, surface 1724 of recess 1735 is on a different plane than the adjacent side of the portion of shelf insert 1700 that sits inside of support structure 1500. The edge 1720 of shelf insert 1700 that is adjacent to the wall when installed is reduced in area by recess 1735 to a smaller surface 1722. In this example, shelf insert 1700 is shown as two parts. However, in other embodiments shelf insert 1700 is one piece, or more than two pieces. The dimensions of recess 1735 can be dictated by the size of the hardware that is used and needs to be covered.

Figure 42:
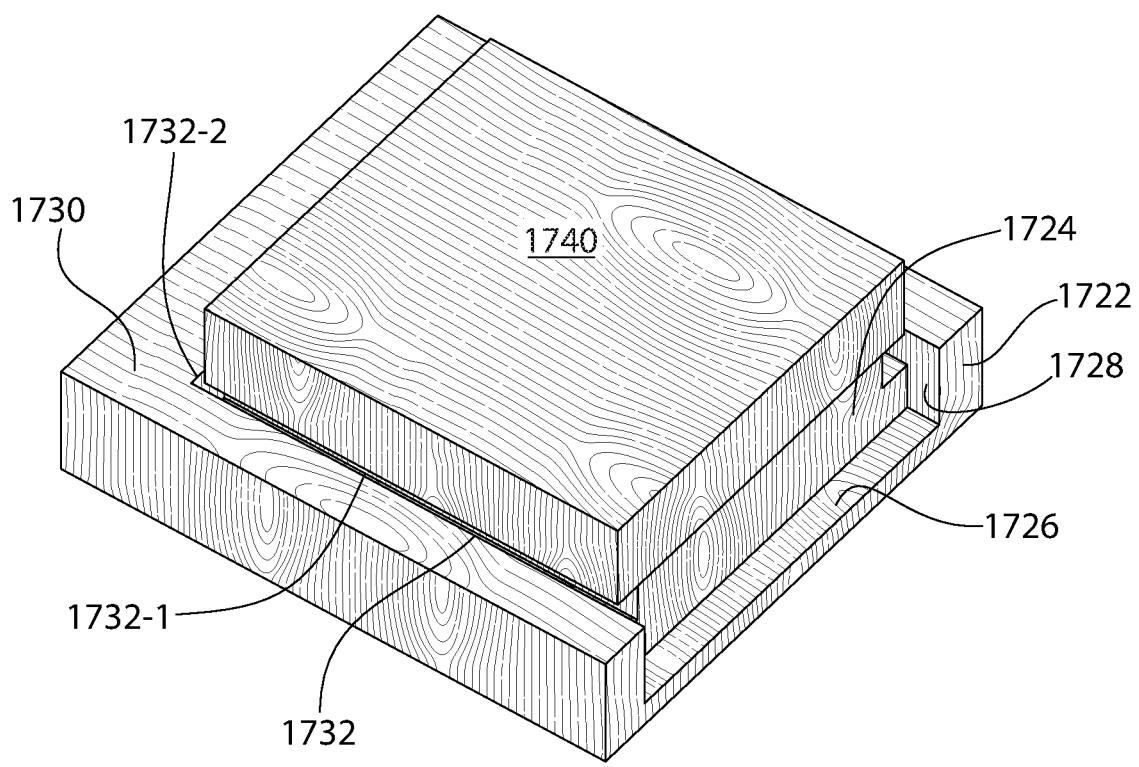
FIG. 42 is an upper perspective view of the underside of a shelf unit in accordance with exemplary embodiments of the invention.

FIG. 42 shows an example of shelf insert 1700 that is similar to the example shown in FIG. 40. However, the example shown in FIG. 42 has a rectilinear groove 1732 formed in underside 1730 of shelf insert 1700 and extends around the portion of shelf insert 1700 that sits inside of perimeter frame support structure 1500. The groove 1732 is U-shaped including two parallel groove sections 1732-1 that extend front to back and perpendicularly to the rear side of shelf insert 1700 (and wall 10 when the insert is mounted), and a transverse groove section 1732-2 extending right to left between the front ends of the groove sections 1732-1. The rear ends of groove sections 1732-1 may be open. Groove 1732 has a width just slightly larger than the thickness of the side elements 1510-1540 of the perimeter frame. Groove 1732 allows the top edges of side elements 1510, 1520, 1530 of support structure 1500 to extend upwards beyond underside 1730 and into groove 1732 so that the top edges of side elements 1510, 1520, 1530 of the perimeter frame cannot be seen. The lower portions of the perimeter frame (side elements 1510-1530) remain exposed and are visible. This can provide a different and cleaner look than other embodiments disclosed herein having the bottom edges of sides 1510, 1520, 1530 simply abut underside 1730 of the shelf insert 1700. This also can advantageously result in shelf insert 1700 being more positionally constrained by support structure 1500. Groove 1732 has a depth (measured between the top and bottom surfaces of shelf insert 1700) which is less than the height of the side elements 1510-1530 of the perimeter frame (support structure 1500).

Figure 43:
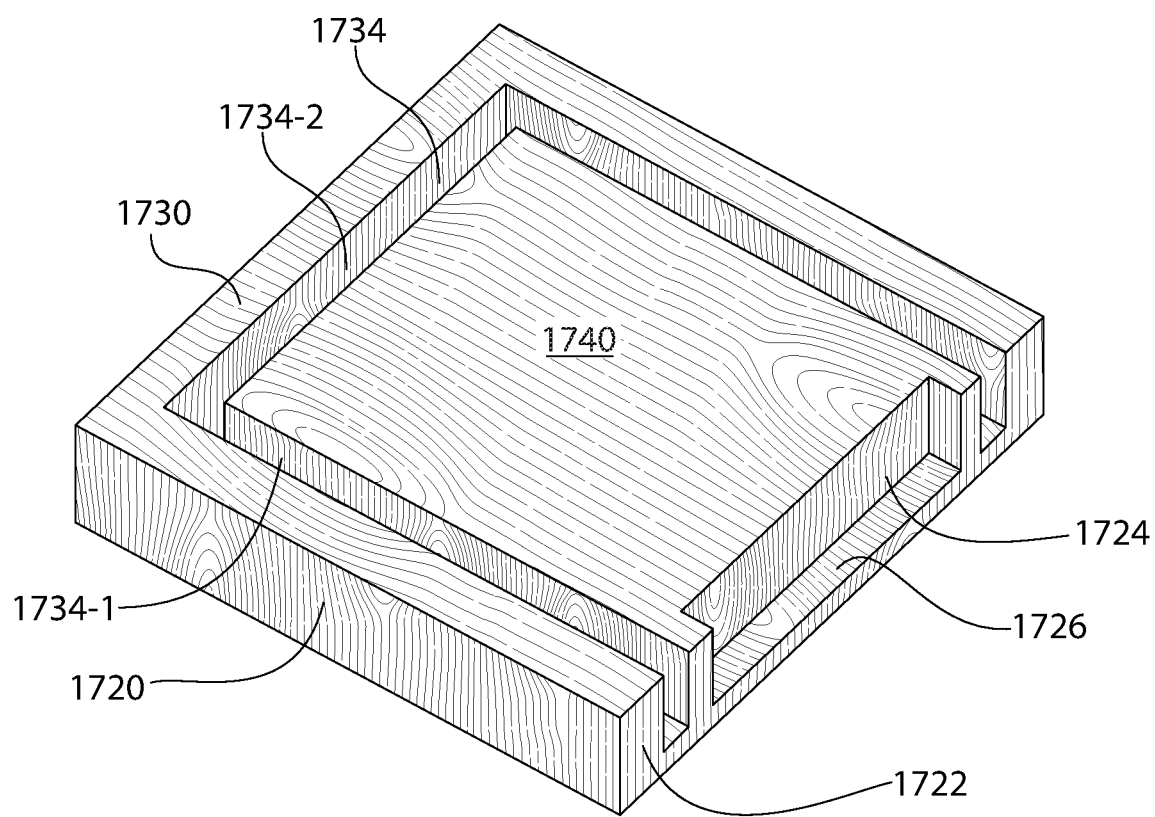
FIG. 43 is an upper perspective view of the underside of a shelf unit in accordance with exemplary embodiments of the invention.
Figure 44:
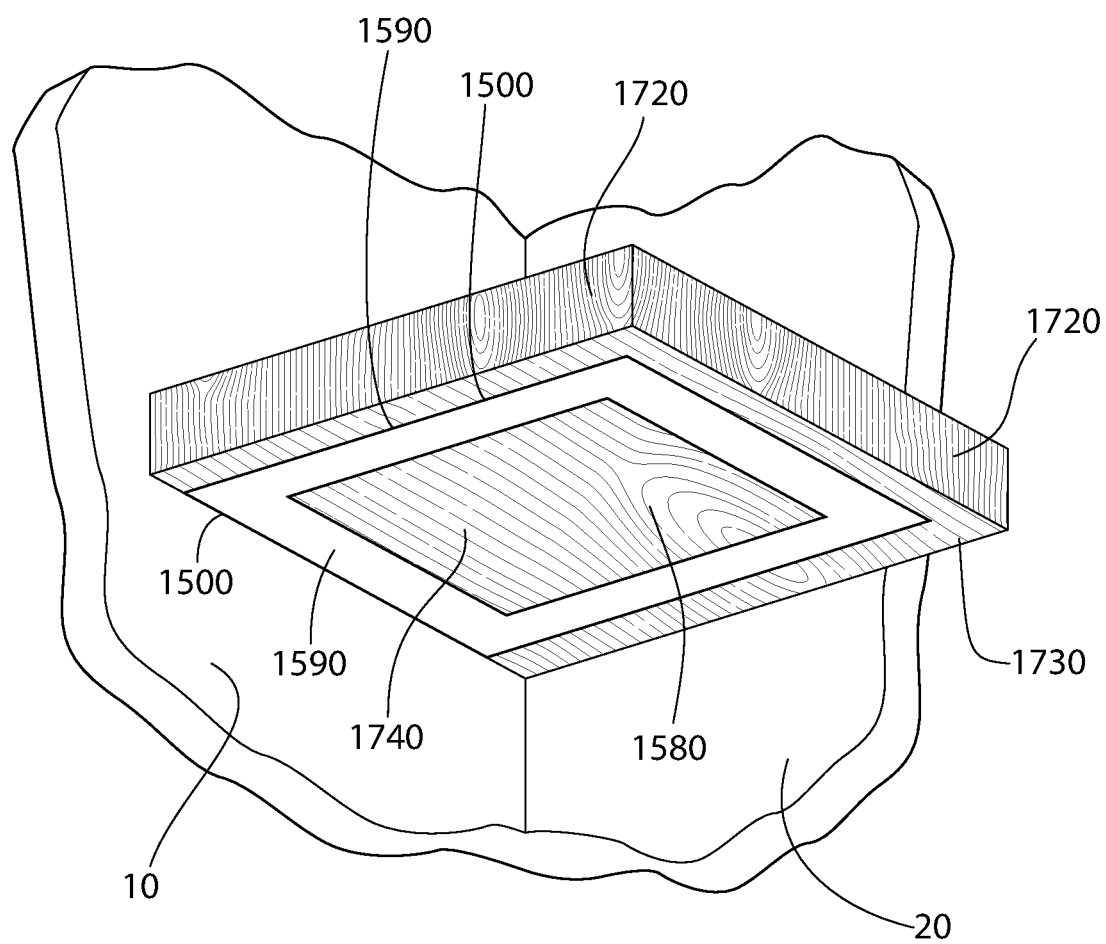
FIG. 44 is a lower perspective view of a shelf unit of FIG. 43, a mounting system, and a support in accordance with exemplary embodiments of the invention in an assembled state.

FIG. 43 shows an example of shelf insert 1700 that has a rectilinear channel 1734 formed in underside 1730 of shelf insert 1700. The channel 1734 is U-shaped including two parallel channel sections 1734-1 that extend front to back and perpendicularly to the rear side of shelf insert 1700 (and wall 10 when the insert is mounted), and a transverse channel section 1734-2 extending right to left between the front ends of the channels sections 1734-1. The rear ends of groove sections 1732-1 may be open. In contrast to groove 1732 above, channel 1734 may have a width substantially larger than the thickness of the side elements 1510-1540 of the perimeter frame (e.g. 2 times or more). Channel 1734 has a depth (measured between the top and bottom surfaces of shelf insert 1700) which is at least coextensive with the height of the side elements 1510-1530 of the perimeter frame (support structure 500) which are completely inserted into the channel to fully conceal the sides of the frame from view. Channel 1734 allows the top edges of side elements 1510, 1520, 1530 of support structure 1500 to extend beyond underside 1730 and upwards into channel 1734 so that side elements 1510, 1520, 1530 are completely concealed. This can provide a shelf that shows the material of shelf insert 1700 on all three of sides 1720, and also completely hides the otherwise exposed sides 1510, 1520, 1530 of perimeter frame support structure 1500 which are fully inserted into the channel. FIG. 44 shows this embodiment from underneath. Advantageously, because the sides 1510-1530 of the perimeter frame support structure 500 are not visible, all side elements 1510-1540 can be formed of unfinished metal which reduces material and fabrication costs. In embodiments where the side elements of the perimeter frame may be visible (see, e.g. side elements 410, 420, and 430 of support structure 500 not mounted to wall 10 seen in FIGS. 19 and 24, and side elements 1510, 1520, and 1530 seen in FIGS. 37-38), the side elements preferably have an external finished and esthetically pleasing appearance (e.g. polished/anodized metal, painted metal, etc.).

With either use of the groove 1732 or channel 1734 previously described herein in shelf insert 1700, the horizontal portions of the perimeter frame support structure 1500 will engage the underside of the central portion of the shelf insert circumscribed by the groove or channel to advantageously provide additional stability to the mount. In any of the embodiments with or without grooves/channels disclosed herein, threaded fasteners (e.g. screws) may be driven upwards through the horizontal portions of the perimeter frame support structures 500 or 1500 (not visible to room occupants) into the underside of shelf inserts 600, 700, or 1700 for more semi-permanent fixation and stability. Any suitable type of screws may be used for this purpose. The horizontal portions of the perimeter frames may include fastener holes to facilitate this semi-permanent fixation of the shelf inserts to the frames.

It is noted that features of certain embodiments can be combined with other embodiments to create embodiments not specifically shown in any of the drawings. As a non-exclusive example, recess 1735 can be included in the embodiments shown in any of the drawings.

Figure 45:
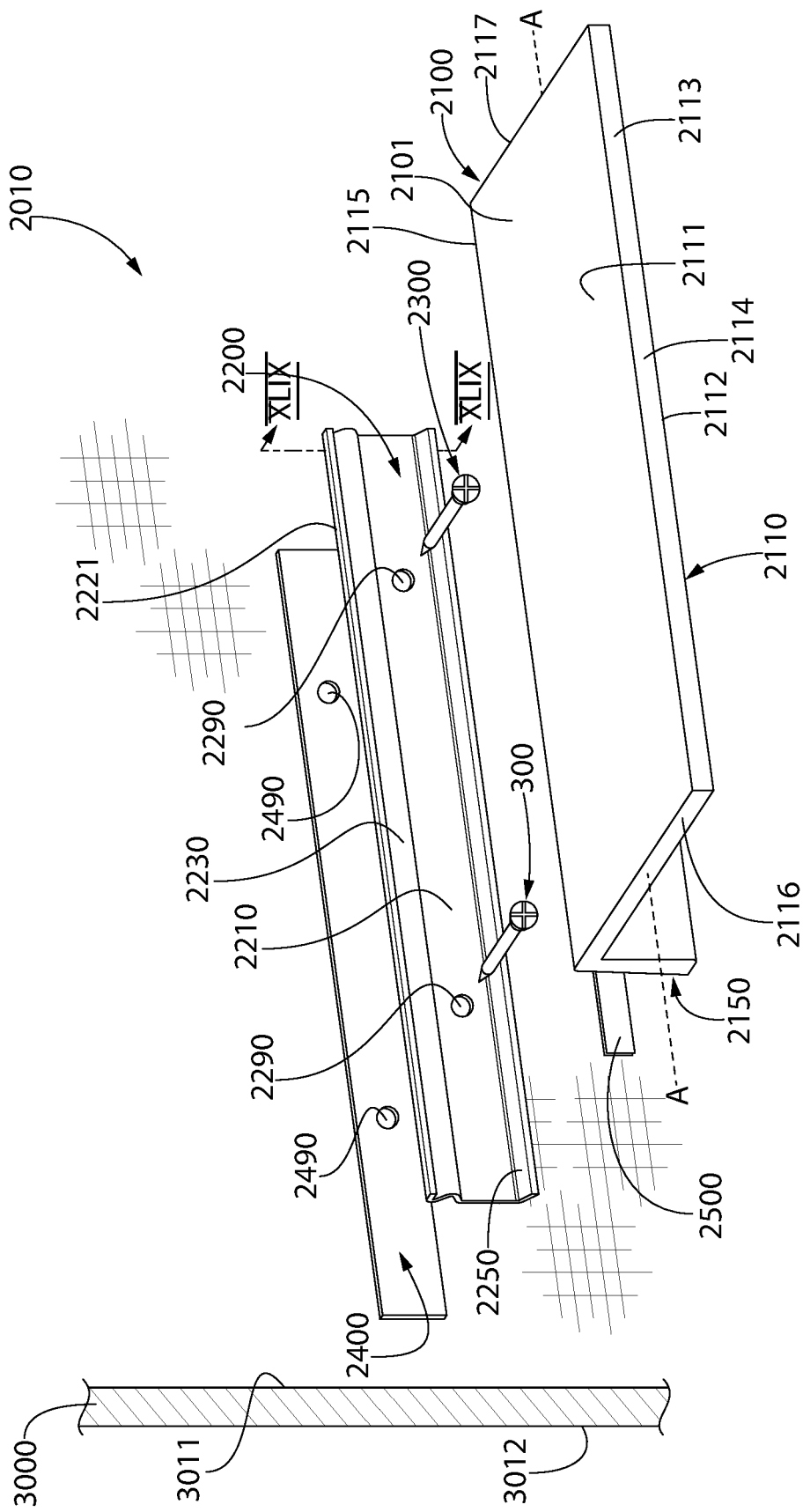
FIG. 45 is an exploded perspective view of a floating shelf apparatus in accordance with an embodiment of the present invention.
Figure 46:
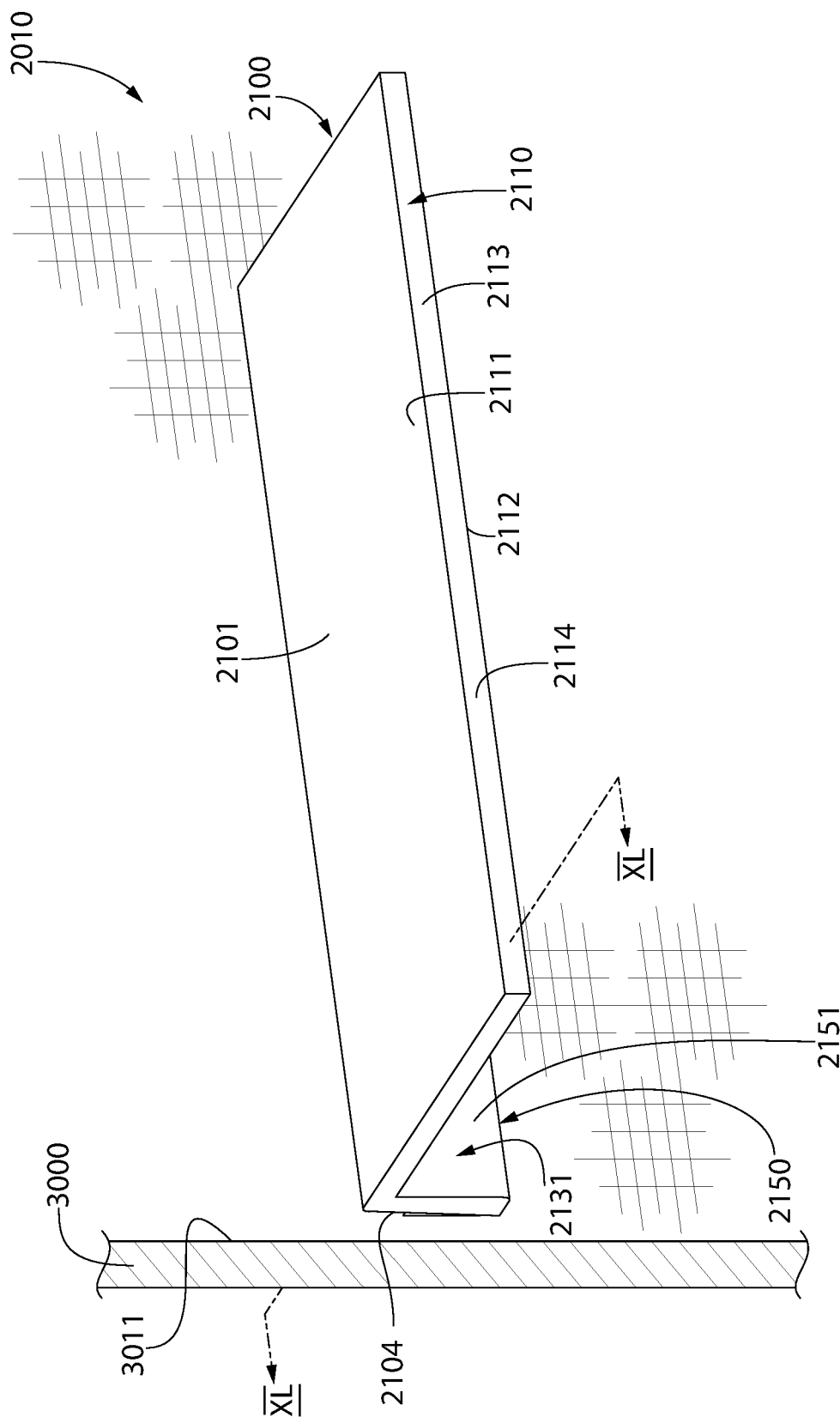
FIG. 46 is perspective view of the floating shelf apparatus of FIG. 45 in an assembled state.
Figure 47:
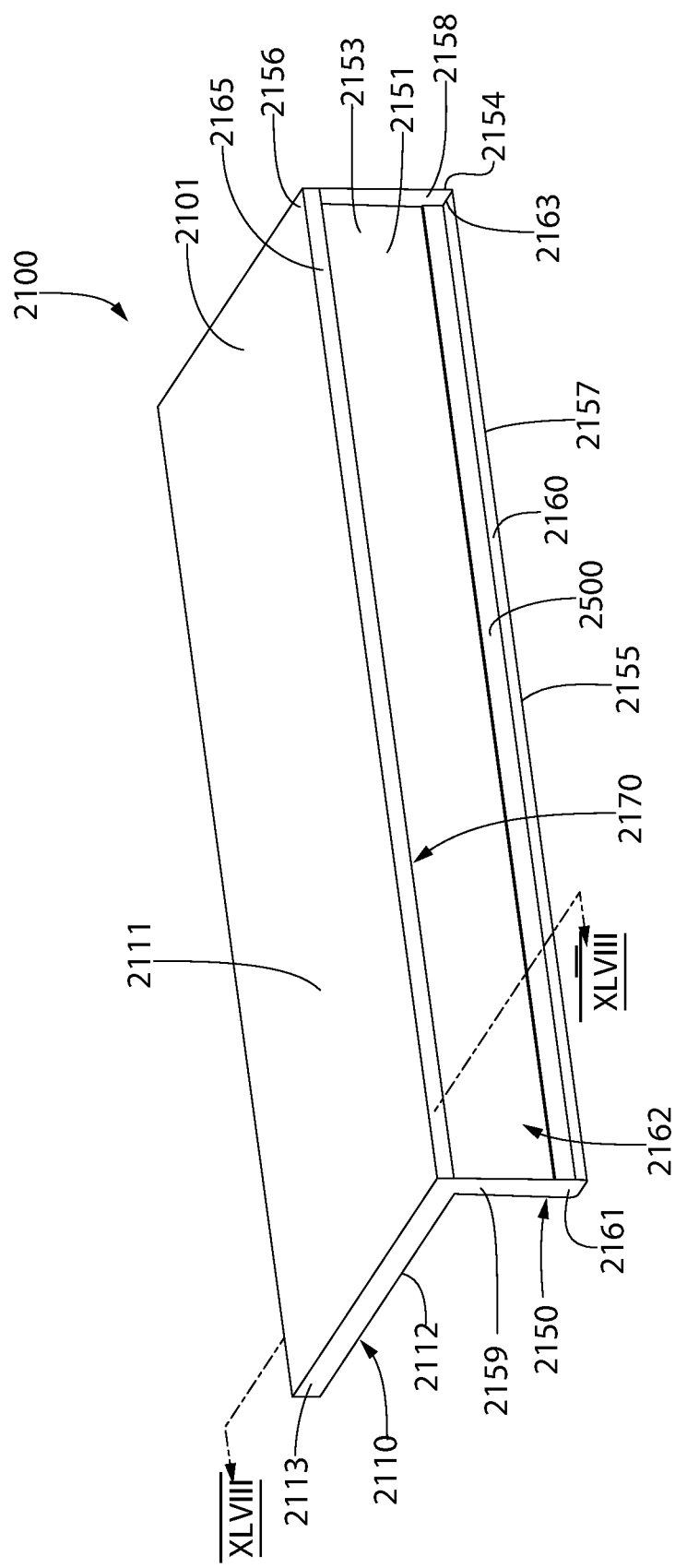
FIG. 47 is a rear perspective view of a shelf of the floating shelf apparatus of FIG. 45.
Figure 48:
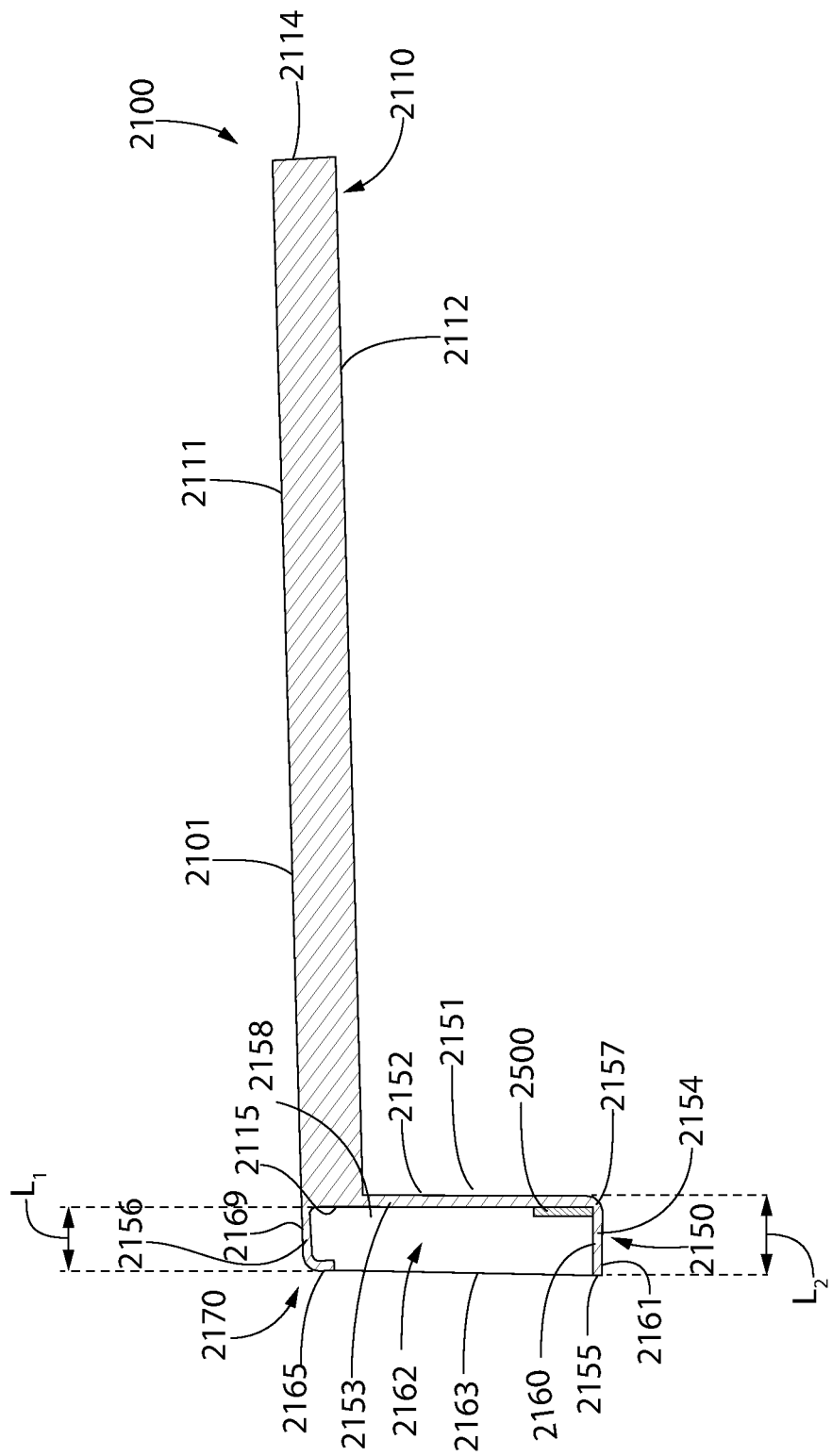
FIG. 48 is a cross-sectional view taken along line XLVIII-XLVIII of FIG. 47.

Referring now to FIG. 45, the present invention is directed to a floating shelf apparatus 2010 that comprises a shelf 2100 and a mounting bracket 2200. In some embodiments, the invention may be directed to the shelf 2100 and its structure, in other embodiments the invention may be directed to the mounting bracket 2200 and its structure, and in still other embodiments the invention may be directed to the floating shelf apparatus 2010 in its entirety, which includes the shelf 2100, the mounting bracket 2200, and possibly some additional components as described herein.

The floating shelf apparatus 2010 may also comprise one or more fasteners 2300 and/or a first adhesive component 2400 for coupling the mounting bracket 2200 to a support surface such as a wall 3000. In some embodiments the one or more fasteners 2300 may be used without the first adhesive component 2400, in other embodiments the first adhesive component 2400 may be used without the one or more fasteners 2300, and in still other embodiments both the fasteners 2300 and the first adhesive component 2400 may be used. As used herein, the terms "support surface" and "wall" may refer to any interior wall-like surface whether it be formed from drywall, gypsum board, plasterboard, or the like. Furthermore, the "support surface" or "wall" may include tile or other decorative features thereon and the floating shelf apparatus 2010 may be coupled thereto without having to remove the tile or decorative elements. In some embodiments, the support surface or wall is a vertical surface, although this is not required in all embodiments. The support surface or wall may be a wall surrounding a shower or bathtub or another wall located within a bathroom. However, the invention is not to be limited to the location at which the floating shelf apparatus is hung; rather, the above are merely provided for example only.

Thus, the floating shelf apparatus 2010 may be attached to a wall 3000, whether the wall 3000 is bare, covered with paint, covered with tile, covered with other decorative features, or the like. The wall 3000 may comprise a first surface 3011 and a second surface 3012 opposite the first surface 3011. The first surface 3011 is the surface of the wall 3000 that is exposed and to which the mounting bracket 2200 is directly coupled. The second surface 3012 is generally hidden from view. The first and second surfaces 3011, 3012 may be planar and they may be vertical (i.e., perpendicular to the horizon), although this is not required in all embodiments.

In the exemplified embodiment, the first adhesive component 2400 is located between the first surface 3011 of the wall 3000 and the mounting bracket 2200. This may serve two purposes: (1) to provide for an offset between the mounting bracket 2200 and the wall 3000 so that the shelf 2100 can more easily mount to the mounting bracket 2200; and (2) to waterproof the installation. In the exemplified embodiment, there is an offset between a portion of the mounting bracket 2200 and the wall 3000 even when the first adhesive component 2400 is not used, as will be discussed in more detail below.

The first adhesive component 2400 may be a double-sided adhesive tape such as, for example without limitation, 3M™ VHB™ tape. Of course, any other type of double-sided adhesive tape may alternatively be used. Furthermore, the first adhesive component 2400 may be a glue rather than a tape. Moreover, in other embodiments the first adhesive component 2400 may be omitted and not used in the floating shelf apparatus 2010 as it may not be needed for acceptable operation and use of the floating shelf apparatus 2010.

Referring to FIGS. 45-48, the shelf 2100 of the floating shelf apparatus 2010 will be further described. In some embodiments, the shelf 2100 may be formed entirely from metal, such as for example without limitation stainless steel, aluminum, or the like. Of course, the invention is not to be so limited and in other embodiments the shelf 2100 could be made from wood, plastic, plastic coated with a metal such as stainless steel, or other materials. Furthermore, although in some embodiments the shelf 2100 may be solid, in other embodiments it may be hollow. The shelf 2100 generally comprises a ledge portion 2110 and a mounting portion 2150. The mounting portion 2150 is configured to couple the shelf 2100 to the mounting bracket 2200 and the ledge portion 2110 is configured to hold items thereon for display or any other reason. As will be described herein, based on the interaction between the mounting bracket 2200 and the mounting portion 2150 of the shelf 2100, the ledge portion 2110 may be oriented perpendicular to the wall 3000 or it may be oriented at a slight upward angle (i.e., 1-5°, or more specifically 1-3° off from perpendicular) so that a front edge of the ledge portion 2110 is slightly higher than a rear edge of the ledge portion 2110. The purpose of upwardly angling the ledge portion 2110 is to prevent items from falling off the shelf 2100 when the shelf 2100 is used in a wet environment such as a bathtub or shower.

The ledge portion 2110 comprises a top surface 2111, a bottom surface 2112 opposite the top surface 2111, and a sidewall surface 2113 extending between the top and bottom surfaces 2111, 2112. The top and bottom surfaces 2111, 2112 are generally planar and parallel to one another, although it may only be necessary for the top surface 2111 and not also the bottom surface 2112 to be planar in alternative embodiments because the top surface 2111 of the ledge portion 2110 forms at least a portion of a support surface 2101 of the shelf 2100. In still other embodiments the top surface 2111 may have a texture or be wavy or the like so that it is also not exactly planar. The sidewall surface 2113 includes a front or distal portion 2114, a rear or proximal portion 2115, and side portions 2116, 2117 that extend between the front and rear portions 2114, 2115.

In the exemplified embodiment, the shelf 2100 is elongated along a longitudinal axis A-A that extends from one of the side portions 2116 of the sidewall surface 2113 to the other of the side portions 2117 of the sidewall surface 2113. When mounted to the mounting bracket 2200 and hanging from the wall 3000, the rear portion 2115 of the sidewall surface 2113 is adjacent to and faces the wall 3000 and the front portion 2114 is the distal-most portion furthest from the wall. Furthermore, the top surface 2111 of the ledge portion 2110 of the shelf 2100 may extend generally perpendicularly from the wall 3000 so that items stored thereon will not slide off, even in a wet environment. In some embodiments, the top surface 2111 of the ledge portion 2110 of the shelf 2100 may be oriented at a slight angle Θ2 (see FIG. 50C) relative to the wall 3000, such as being angled upwardly thereby forming an acute angle of between 80° and 89°, more specifically between 85° and 89°, and still more specifically between 87° and 89° relative to the front surface 3011 of the wall 3000. This will enhance the ability of the shelf 2100 to maintain items thereon without sliding off even under wet conditions (such as when the shelf 2100 is hung from a wall in a shower or bath or near a sink).

As noted above, the mounting portion 2150 of the shelf 2100 is the portion that facilitates the mounting of the shelf 2100 to the mounting bracket 200, the details of which will be described below. The mounting portion 2150 of the shelf 2100 extends from the rear portion 2115 of the sidewall surface 2113 of the ledge portion 2110 of the shelf 2100.

The mounting portion 2150 of the shelf 2100 comprises a vertical wall 2151 that extends from the rear portion 2115 of the sidewall surface 2113 of the ledge portion 2110 of the shelf 2100. In the exemplified embodiment, the vertical wall 2151 extends downwardly from the bottom surface 2112 of the ledge portion 2110 but does not also extend upwardly beyond the top surface 2111 of the ledge portion 2110. In other embodiments, an example of which is provided in FIG. 53 which will be described briefly below, the vertical wall 2151 may extend upwardly from the top surface 2111 of the ledge portion 2110 instead of downwardly from the bottom surface 2112 of the ledge portion 2110. This modification will not affect the operability and function of the floating shelf apparatus 2010. The vertical wall 2151 has a front surface 2152 and a rear surface 2153 that is opposite to the front surface 2152. The front surface 2152 of the vertical wall 2151 faces away from the mounting bracket 2200 and the wall 3000 and the rear surface 2153 of the vertical wall 2151 faces the mounting bracket 2200 and the wall 3000. The ledge portion 2110 of the shelf 2100 extends from the front surface 2152 of the vertical wall 2151. In the exemplified embodiment, the ledge portion 2110 extends perpendicularly from the front surface 2152 of the vertical wall 2151, but it may be oriented at a slight angle in other embodiments.

The mounting portion 2150 of the shelf 2100 also comprises a sidewall 2154 extending from the rear surface 2153 of the vertical wall 2151 to a distal end 2155. The sidewall 2154 comprises an inner surface 2160 and an outer surface 2161. Furthermore, the sidewall 2154 comprises an upper portion 2156, a lower portion 2157, a first side portion 2158, and a second side portion 2159. In the exemplified embodiment, the upper portion 2156 of the sidewall 2154 is parallel to the top surface 2111 of the ledge 2110. Although described herein with each of the portions 2156-2159 of the sidewall 2154 extending from the vertical wall 2151, in some embodiments the upper portion 2156 may extend directly from the rear portion 2115 of the sidewall surface 2113 of the ledge portion 2110 of the shelf 2100. Specifically, the vertical wall 2151 may merely extend from the bottom surface 2112 of the ledge portion 2110 and the upper portion 2156 may not be coupled directly to the vertical wall 2151. However, for purposes of this application, the vertical wall 2151 is considered to extend all the way to the top surface 2111 of the ledge portion 2110 and the upper portion 2156 of the sidewall 2154 is considered to extend from the vertical wall 2151. Thus, the vertical wall 2151 may include the rearmost portion of the ledge portion 2110 of the shelf 2100.

In some embodiments, the support surface 2101 of the shelf 2100 is formed collectively by an outer surface 2169 of the upper portion 2156 of the sidewall 2154 and the top surface 2111 of the ledge 2110. In such embodiments, the outer surface 2169 of the upper portion 2156 of the sidewall 2154 and the top surface 2111 of the ledge 2110 may be flush with one another. Thus, the outer surface 2169 of the upper portion 2156 of the sidewall 2154 and the top surface 2111 of the ledge 2110 form a continuous and unbroken surface upon which items can be held. The inner surface 2160 of the sidewall 2154 and the rear surface 2153 of the vertical wall 2151 collectively define a mounting cavity 2162 of the mounting portion 2150 of the shelf 2100. Thus, the rear surface 2153 of the vertical wall 2151 forms a floor of the mounting cavity 2162 and the sidewall 2154 forms a boundary wall that surrounds the mounting cavity 2162. The mounting cavity 2162 has an open rear end 2163 located at the distal end 2155 of the sidewall 2154.

The upper portion 2156 of the sidewall 2154 may have a first length L1 measured from the vertical wall 2151 to the distal end 2155 and the lower portion 2157 of the sidewall 2154 may have a second length L2 measured from the vertical wall 2151 to the distal end 2155. In some embodiments, the second length L2 may be greater than the first length L1. In some embodiments, the difference between the second length L2 and the first length L1 may be between 0.1 mm and 3 mm, more specifically between 0.5 mm and 2.5 mm, and still more specifically between 1 mm and 2 mm.

The mounting portion 2150 of the shelf 2100 also comprises a mounting element 2170 that is configured to interact with a portion of the mounting bracket 2200 to mount the shelf 2100 to the mounting bracket 2200 and thereby hang the shelf 2100 from a wall to which the mounting bracket 2200 is coupled. In the exemplified embodiment, the mounting element 2170 comprises the upper portion 2156 of the sidewall 2154 and a flange portion 2165 that extends from the distal end 2155 of the upper portion 2156 of the sidewall 2154 in a direction into the mounting cavity 2162. The flange portion 2165 may extend generally perpendicularly from the upper portion 2156 of the sidewall 2154, although the transition between the upper portion 2156 of the sidewall 2154 and the flange portion 2165 may be formed by a curved surface. Thus, the first mounting element 2170 may be generally L-shaped, although there may be some curvature between the linear sections (i.e., the upper portion 2156 of the sidewall 2154 and the flange portion 2165) of the "L."

In the exemplified embodiment, there is a second adhesive component 2500 coupled to the rear surface 2153 of the vertical wall 2151 of the mounting portion 2150 of the shelf 2100. The shelf 2100 may be sold to consumers with the second adhesive component 2500 pre-applied thereon with a release liner covering its outer surface Of course, in other embodiments the second adhesive component 2500 may be coupled to the shelf 2100 after purchase by a consumer.

The second adhesive component 2500 may be, similarly to the first adhesive component 2400, a double-sided adhesive tape such as, for example without limitation, 3M™ VHB™ tape. Of course, any other type of double-sided adhesive tape or other adhesives may alternatively be used. This includes foam-based double-sided adhesive tape, plastic sheet-based double-sided adhesive tape, glue dots, or the like. Furthermore, the first adhesive component 2400 may be a glue rather than a tape in still other embodiments. In the exemplified embodiment, the second adhesive component 2500 is located along a lower-most portion of the rear surface 2153 of the vertical wall 2151 such that a bottom edge of the second adhesive component 2500 is in contact with the lower portion 2157 of the sidewall 2154. Of course, in other embodiments the second adhesive component 2500 may be spaced slightly apart from the lower portion 2157 of the sidewall 2154. However, the second adhesive component 2500 should be positioned along a lower portion of the rear surface 2153 of the vertical wall 2151 to ensure that it is aligned with a portion of the mounting bracket 2200, as described in more detail below. Thus, at least a portion of the second adhesive component 2500 should be located at a position that is between 1/16 inch and 1/4 inch, and more specifically between 1/16 inch and 1/8 inch from the bottom portion 2157 of the sidewall 2154.

The second adhesive component 2500 may extend along an entirety of a length of the vertical wall 2151 (in a direction of the longitudinal axis A-A), although this is not required in all embodiments and it could be formed by a plurality of spaced apart adhesive portions, sections, dots, linear segments, or the like. In some embodiments, the second adhesive component 2500 may extend from the bottom corner of the mounting cavity 2162 (i.e., adjacent to the lower portion 2157 of the sidewall 2154) to a height of about 1/4 inch, although the exact size and dimensions of the second adhesive component 2500 are not to be limiting of the present invention in all embodiments. As will be better appreciated from the description below with specific reference to FIGS. 50A-50C, the second adhesive component 2500 may prevent accidental disassembly of the shelf 2100 from the mounting bracket 2200 by forming an adhesive bond therebetween.

Figure 49:
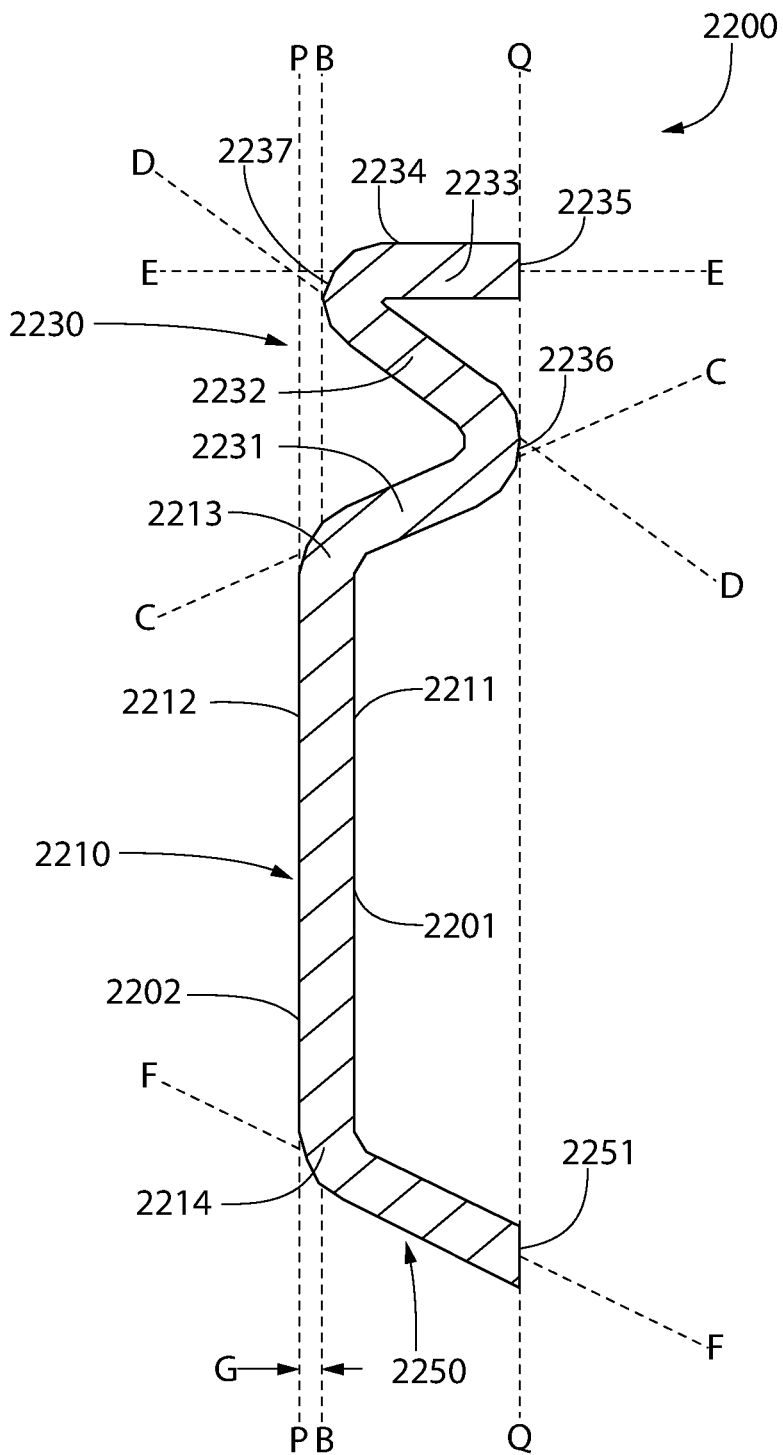
FIG. 49 is a cross-sectional view of a mounting bracket of the floating shelf apparatus taken along line XLIX-XLIX of FIG. 45.

Referring now to FIGS. 45 and 49, the mounting bracket 2200 will be described in greater detail. The mounting bracket 2200 has a front surface 2201 and a rear surface 2202 opposite the front surface 2201, the rear surface 2202 being the surface that faces the wall 3000 when the mounting bracket 2200 is coupled to the wall 3000. The mounting bracket 2200 comprises a first portion 2210, a second portion 2230, and a third portion 2250. The first portion 2210 is the portion that is coupled directly to the wall 3000 (or indirectly via the first adhesive component 2400) and the second and/or third portions 2230, 2250 assist in the mounting of the shelf 2100 to the mounting bracket 2200. The second and third portions 2230, 2250 therefore have a very specific structure that aids in the mounting of the shelf 2100 to the mounting bracket 2200.

The first portion 2210 of the mounting bracket 2200 comprises a front surface 2211 and a rear surface 2212 opposite the front surface 2211. The front surface 2211 of the first portion 2210 forms a part of the front surface 2201 of the mounting bracket 2200 and the rear surface 2212 of the first portion 2210 forms a part of the rear surface 2202 of the mounting bracket 2200. In the exemplified embodiment, the front and rear surfaces 2211, 2212 of the first portion of the mounting bracket 2200 are planar and parallel to one another. In other embodiments, the rear surface 2212 of the first portion 2210 of the mounting bracket 2200 may be planar but the front surface 2211 may be non-planar. The rear surface 2212 of the mounting bracket 2200 is the surface that faces the wall 3000 when the mounting bracket 2200 is coupled to the wall 3000. Therefore, forming the rear surface 2212 to be planar may be desirable to ensure that the first portion 2210 of the mounting bracket 2200 can be abutted directly against the front surface 3011 of the wall 3000 (or the first adhesive component 2400 thereon). The rear surface 2212 of the mounting bracket 2200 may be in direct contact with the first surface 3011 of the wall 3000 if the first adhesive component 2400 is omitted, but if the first adhesive component 2400 is included than the rear surface 2212 of the mounting bracket 2200 is in direct contact with the first adhesive component 2400. In the exemplified embodiment, the rear surface 2212 of the first portion 2210 of the mounting bracket 2200 lies in a plane P-P. When the mounting bracket 2200 is coupled to the wall 3000, the plane P-P is parallel to the front surface 3011 of the wall 3000.

Furthermore, the first portion 2210 of the mounting bracket 2200 extends from a first end 2213 to a second end 2214 along a longitudinal axis B-B. In the exemplified embodiment, the mounting bracket 2200 is a monolithic, integral structure formed from metal, although plastic or the like may be used in alternative embodiments. Thus, the first, second, and third portions 2210, 2230, 2250 of the mounting bracket 2200 are merely portions of a monolithic structure and the mounting bracket 2200 is a unitary structure rather than being formed from separate structures that are coupled together. Of course, the bracket 2200 could be comprised of separate structures that are coupled together in alternative embodiments. The mounting bracket 2200 should have sufficient strength and rigidity to support the shelf 2100 and any items stored thereon without the mounting bracket 2200 detaching from the wall 3000 and without the mounting bracket 2200 bending or otherwise causing the shelf 2100 coupled thereto to bend downwardly under the force of the items stored thereon.

As shown in FIG. 45, the first portion 2210 of the mounting bracket 2200 may include one or more mounting holes 2290 that extend from the front surface 2211 to the rear surface 2212. Each mounting hole 2290 is configured to receive one of the fasteners 2300 so that the mounting bracket 2200 can be coupled to the wall 3000, thereby attaching the mounting bracket 2200 to the first surface 3011 of the wall 3000. In the exemplified embodiment, the fasteners 2300 are depicted as nails, however, they could be screws or other items of hardware in other embodiments. Moreover, the fasteners 2300 could be omitted if the first adhesive component 2400 has sufficient bonding strength to support the weight of the mounting bracket 2200, the shelf 2100, and any items stored on the shelf 2100.

The second portion 2230 of the mounting bracket 2200 is a generally S-shaped portion that extends upwardly from the first end 2213 of the first portion 2210 of the mounting bracket 2200. Thus, the second portion 2230 of the mounting bracket 2200 comprises three legs that form the S-shape. Specifically, the second portion 2230 of the mounting bracket 2200 comprises a first leg 2231 that extends upwardly from the first end 2213 of the first portion 2210 of the mounting bracket 2200 in a direction away from the plane P-P, a second leg 2232 that extends upwardly from the first leg 2231 in a direction towards the plane P-P, and a third leg 2233 that extends from the second leg 2232 in a direction away from the plane P-P. In the exemplified embodiment, the third leg 233 does not extend upwardly, but instead extends horizontally.

More specifically, the first leg 2231 extends at an oblique angle relative to the plane P-P in a direction away from the plane P-P. Thus, the first leg 2231 extends along an axis C-C that is oblique to the plane P-P. In some embodiments, the angle formed between the plane P-P and the axis C-C may be between 35° and 55°, and more specifically between 40° and 50°, and more specifically approximately 45°, although other ranges are possible. The second leg 2232 extends from the first leg 2231 back towards the plane P-P and the second leg 2232 is also oblique to the plane P-P. Thus, the second leg 2232 extends along an axis D-D that is oblique to the plane P-P. In some embodiments, the angle formed between the plane P-P and the axis C-C may be between 35° and 55°, and more specifically between 40° and 50°, and still more specifically approximately 45°, although other ranges are possible. Furthermore, an angle formed between the axis C-C and the axis D-D may be between 85° and 95°, and more specifically approximately 90°. The third leg 2233 extends from the second leg 2232 in a direction away from the plane P-P and is generally perpendicular to the plane P-P. Thus, the third leg 2233 extends along an axis E-E that is generally perpendicular to the plane P-P. An angle formed between the axis E-E and the axis D-D may be between 40° and 50° in some embodiments.

The third leg 2233 has a top surface 2234 that forms a top surface of the second portion 2230 of the mounting bracket 2200, which is also a top surface of the mounting bracket 2200. In the exemplified embodiment, the top surface 2234 of the third leg 2233 is planar and is perpendicular to the plane P-P. The third leg 2233 terminates at a distal end 2235. In the exemplified embodiment, the distal end 2235 forms a surface that is parallel to the plane P-P.

The second portion 2230 of the mounting bracket 2200 does not have pointed corners at the junctions of the first, second, and third legs 2231, 2232, 2233. Rather, the second portion 2230 of the mounting bracket 2200 has a first bent portion (or curved portion) 2236 as the junction of the first and second legs 2231, 2232 and a second bent portion (or curved portion) 2237 at the junction of the second and third legs 2232, 2233. The first bent portion 2236 is a convex portion of the front surface 2201 of the mounting bracket 2200 and the second bent portion 2237 is a convex portion of the rear surface 2202 of the mounting bracket 2200. In the exemplified embodiment, the first bent portion 2236 and the distal end 2235 of the third leg 2233 lie in a common plane Q-Q. However, in other embodiments the first bent portion 2236 could be recessed relative to the plane Q-Q without affecting the function of the floating shelf apparatus 10.

The second bent portion 2237 faces the plane P-P in which the rear surface 2212 of the first portion 2210 of the mounting bracket 2200 lies. Thus, when the mounting bracket 2200 is coupled to the wall 3000, the second bent portion 2237 faces the wall 3000. However, the second bent portion 2237 (and specifically an apex thereof) is spaced apart from the plane P-P (and hence also the wall 3000) by a gap G. The apex of the second bent portion 2237 may be aligned with the axis B-B of the first portion 2210 of the mounting bracket 2200 in some embodiments, although this is certainly not required in all embodiments so long as the apex of the second bent portion 2237 is offset or otherwise spaced apart from the plane P-P.

In the exemplified embodiment, the third portion 2250 of the mounting bracket 2200 is a linear portion that extends downwardly from the second end 2214 of the first portion 2210 in a direction away from the plane P-P. The third portion 2250 extends along an axis F-F that is oblique to the plane P-P. The third portion 2250 terminates at a distal end 2251. In the exemplified embodiment, the distal end 2251 forms a surface that is parallel to the plane P-P and that lies in the plane Q-Q, although this is not required in all embodiments and it is possible that the distal end 2251 may extend beyond or be recessed relative to the plane Q-Q in other embodiments, one example of which will be described below with reference to FIG. 52.

The axis F-F along which the third portion 2250 extends and the axis C-C along which the first leg 2231 of the second portion 2230 extends diverge with increasing distance from the plane P-P as those axes C-C, F-F extend in a direction away from the plane P-P towards the bent portion 2236 and the distal end 2251, respectively. Thus, while the first leg 2231 of the second portion 2230 extends upwardly from the first end 2213 of the first portion 2210, the third portion 2250 extends downwardly from the second end 2214 of the first portion 2210.

Figure 50A:
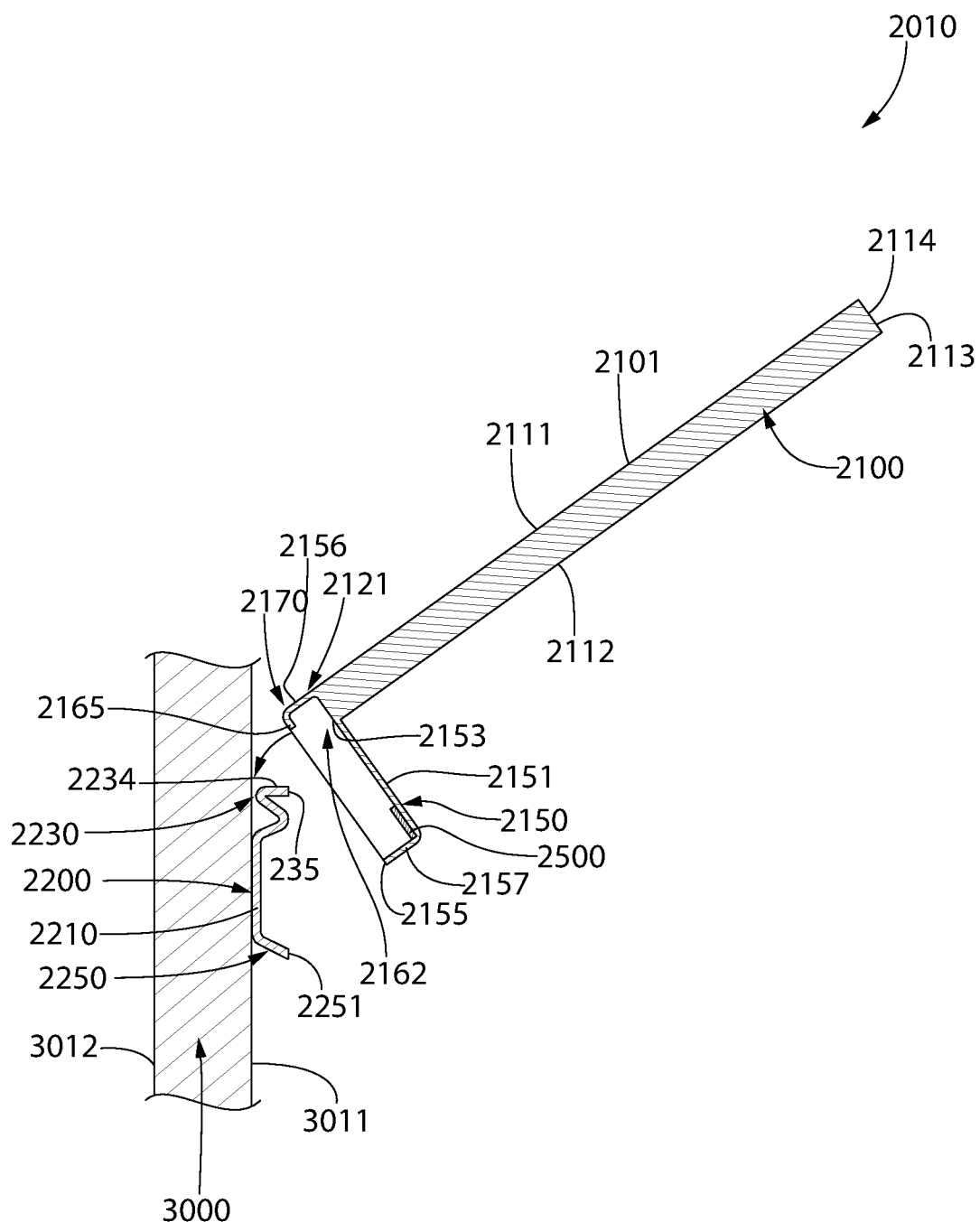
FIGS. 50A-50C are schematic cross-sectional views taken along line L-L of FIG. 46 illustrating the manner in which the shelf of FIG. 47 is mounted to the mounting bracket of FIG. 49.
Figure 50B:
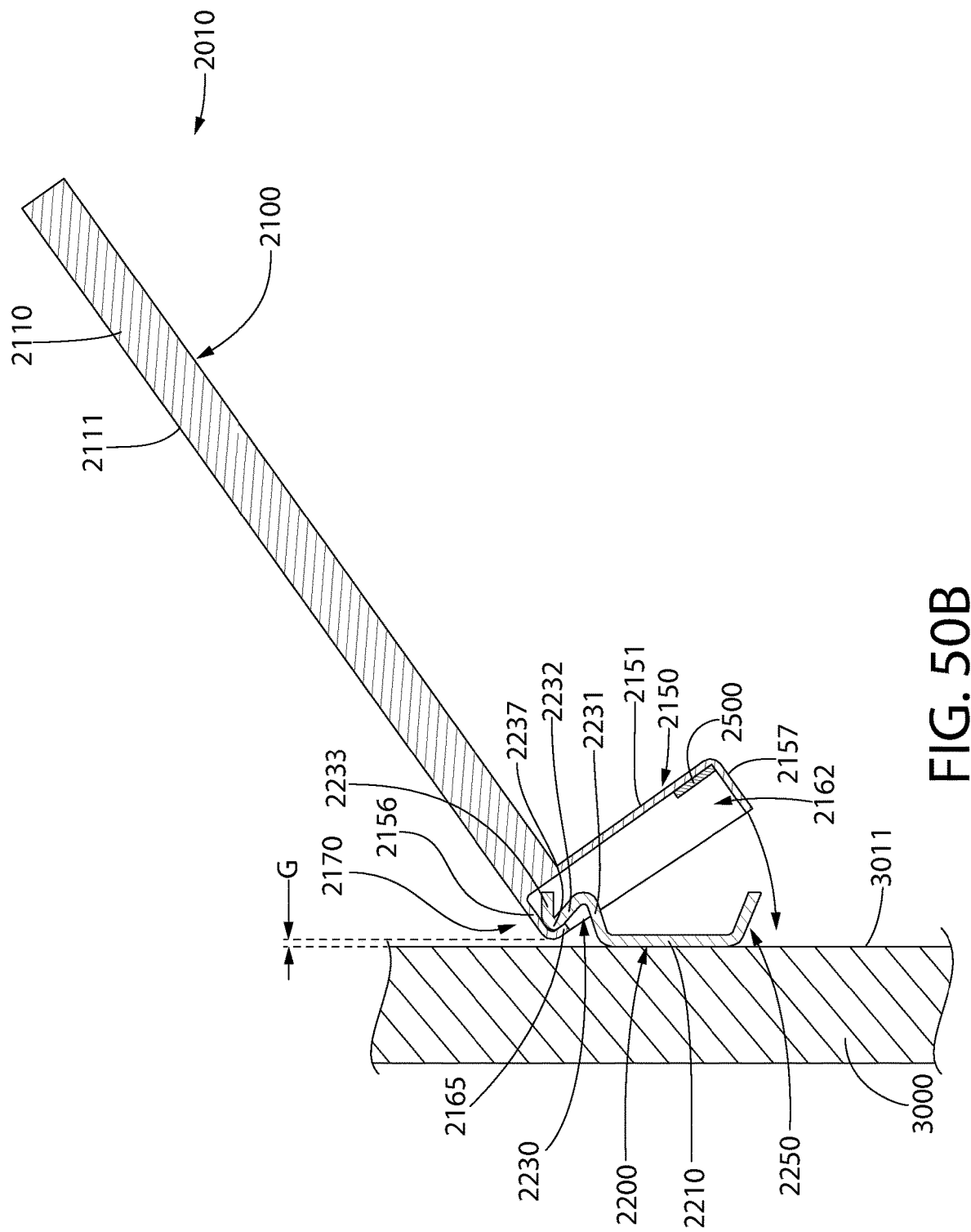
Figure 50C:
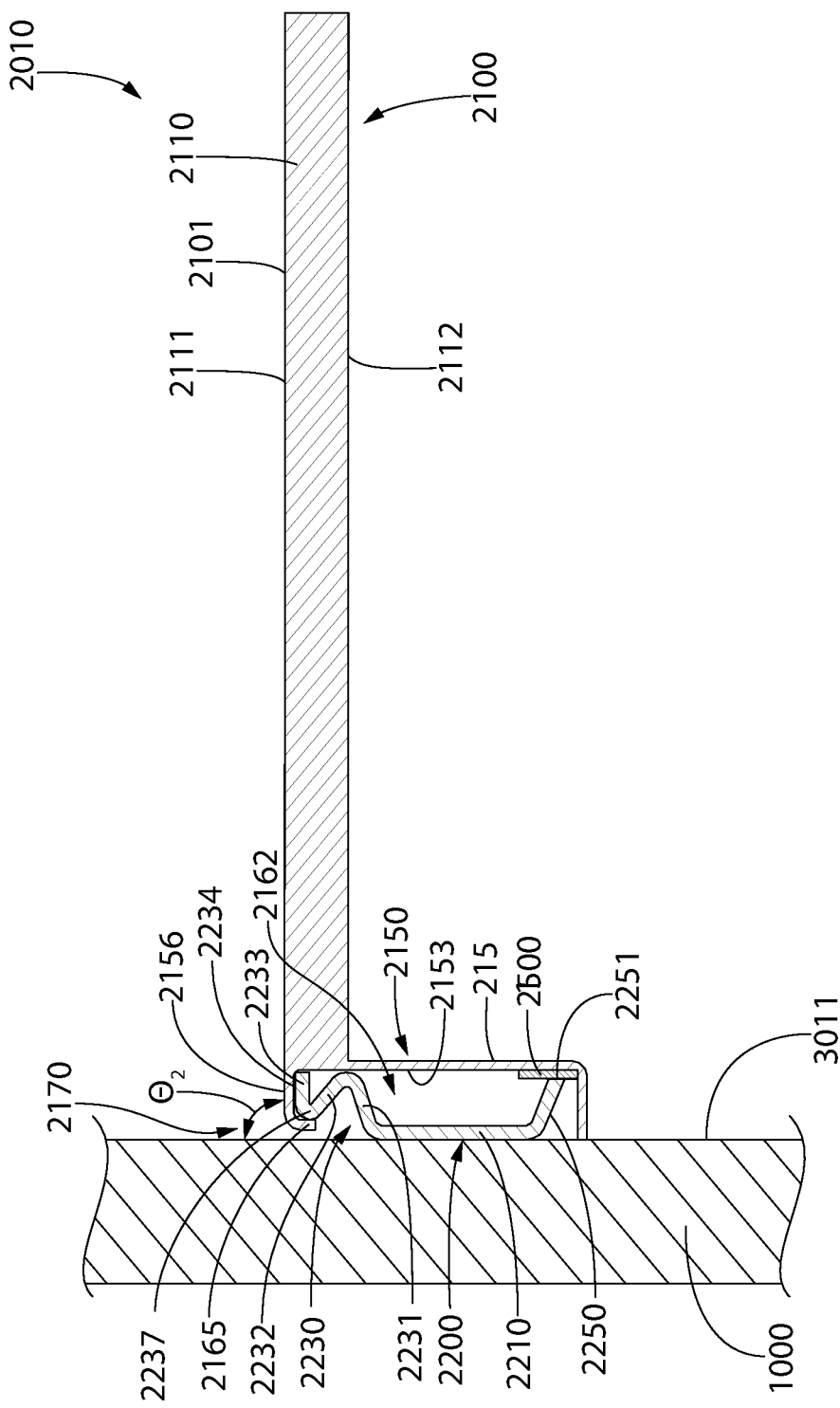

Referring to FIGS. 50A-50C, the process or method of installing the floating shelf apparatus 2010 on the wall 3000 will be described. Although not shown in this embodiment, the first step may be to couple the first adhesive component 2400 either to the wall 3000 or to the rear surface 2212 of the first portion 2210 of the mounting bracket 2200. Either way, the first adhesive component 2400 will be disposed between the rear surface 2212 of the first portion 2210 of the mounting bracket 2200 and the first surface 3011 of the wall 3000, although this is not illustrated in this embodiment (it is illustrated in the embodiment depicted in FIGS. 52A-52C, described below, and it should be appreciated that the first adhesive component 2400 may be included in this embodiment as well).

Next, the fasteners 2300 are inserted through the mounting holes 2290 in the mounting bracket 2200 to couple the mounting bracket 2200 to the wall 3000. The fasteners 2300 may also extend through mounting holes 2490 in the first adhesive component 2400, illustrated in FIG. 45, although the mounting holes 2490 may not be required in all embodiments. In FIG. 50A, the mounting bracket 2200 is already coupled to the wall 3000 and the shelf 2100 is being held in preparation for mounting to the mounting bracket 2200. In that regard, the shelf 2100 is positioned with the mounting portion 2150 adjacent to the mounting bracket 2200 to facilitate the mounting of the shelf 2100 to the mounting bracket 2200.

Next, referring to FIG. 50B, the mounting portion 2150 of the shelf 2100 is moved towards the mounting bracket 2200 so that the mounting element 2170 of the mounting portion 2150 of the shelf 2100 engages the second portion 2230 of the mounting bracket 2200. Specifically, the flange portion 2165 of the mounting element 2170 is inserted into the gap G that exists between the second bent portion 2237 of the second portion 2230 of the mounting bracket 2200 and the first surface 3011 of the wall 3000 (which lies in the plane P-P). In this position, the mounting element 2170 wraps around the second bent portion 2237 of the second portion 2230 of the mounting bracket 2200 and the top surface 2111 of the ledge portion 2110 of the shelf 2100 extends upwardly at an oblique angle relative to the first surface 3011 of the wall 3000. During this procedure, the ledge portion 2110 is held at an angle relative to the wall 3000 so that an acute angle is formed between the front surface 3011 of the wall 3000 and the top surface 2111 of the ledge portion 2110.

FIG. 50C illustrates the floating shelf apparatus 2010 in the fully assembled state with the shelf 2100 mounted to the mounting bracket 2200 and the mounting bracket 2200 coupled to the wall 3000. Moving from FIG. 50B to FIG. 50C in the assembly process, the shelf 2100 rotates downwardly until the top surface 2111 of the ledge portion 2110 of the shelf 2100 is oriented at an approximately perpendicular angle relative to the first surface 3011 of the wall 3000 (an approximately perpendicular angle including angles that are between 87° and 93° relative to the first surface 3011 of the wall 3000). When the shelf 2100 is mounted to the mounting bracket 2200, the mounting bracket 2200 is located within the mounting cavity 2162 of the mounting portion 2150 of the shelf 2100. In the exemplified embodiment, an entirety of the mounting bracket 2200 is located within the mounting cavity 2162, although in other embodiments only portions of the mounting bracket 2200 may be located within the mounting cavity 2162. However, it is preferable that the mounting bracket 2200 be entirely concealed by the shelf 2100 to provide the shelf with the appearance that it is "floating" or "suspended" on the wall 3000.

Furthermore, the upper portion 2156 of the sidewall 2154 (which forms a portion of the mounting element 2170) rests atop of the top surface 2234 of the third leg 2233 of the second portion 2230 of the mounting bracket 2200 (said top surface 2234 also forming the top surface of the mounting bracket 2200). Furthermore, the flange portion 2165 of the mounting element 2170 extends into the gap G between the bent portion 2237 and the wall 3000. Thus, the mounting element 2170 of the mounting portion 2150 of the shelf 2100 rests atop the third leg 2233 of the second portion 2230 of the mounting bracket 2200 and extends into the gap G between the bent portion 2237 of the second portion 2230 of the mounting bracket 2200 and the wall 3000 or plane P-P. This interaction between the mounting element 2170 of the mounting portion 2150 of the shelf 2100 and the second portion 2230 of the mounting bracket 2200 achieves a mounting of the shelf 2100 to the mounting bracket 2200. In this position, the shelf 2100 is supported on the wall 3000 by the mounting bracket 2200 which is coupled to the wall 3000.

Because the inner surface of the mounting element 2170 is curved between the flange portion 2165 and the upper portion 2156 of the sidewall 2154, the shelf 2100 can pivot/rotate upwardly and downwardly until it is essentially locked into position. Specifically, the curved inner surface of the mounting element 2170 can rotate/pivot around the second bent portion 2237 of the mounting bracket, as shown in FIGS. 50B and 50C.

In addition to the above, when the shelf 2100 is mounted to the mounting bracket 2200 as shown in FIG. 50C, the distal end 2251 of the third portion 2250 of the mounting bracket 2200 contacts or otherwise engages the second adhesive component 2500 that is located on the rear surface 2153 of the vertical wall 2151 of the mounting portion 2150 of the shelf 2100. The contact between the distal end 2251 of the third portion 2250 of the mounting bracket 2200 and the second adhesive component 2500 stops disassembly of the shelf 2100 relative to the mounting bracket 2200 (i.e., locks the shelf 2100 into place relative to the mounting bracket 2200). Specifically, without having the mounting bracket 2200 contact the second adhesive component 2500, applying an upward force onto the bottom surface 2112 of the ledge portion 2110 of the shelf 2100 would cause the shelf 2100 to tilt/rotate upwardly. However, because the third portion 2250 of the mounting bracket 2200 contacts the second adhesive component 2500, this creates a coupling or adhesive bond between the third portion 2250 of the mounting bracket 2200 and the lower part of the mounting portion 2150 of the shelf 2100 via the second adhesive component 2500, which prevents such tilting of the shelf 2100 even if bumped as noted above.

As noted above, in some embodiments the lower portion 2157 of the sidewall 2154 of the mounting portion 2150 of the shelf 2100 has a greater length than the upper portion 2156 of the sidewall 2154 of the mounting portion 2150 of the shelf 2100. Thus, when the shelf 2100 is mounted to the mounting bracket 2200, the lower portion 2157 of the sidewall 2154 will cause the shelf 2100 to be inclined relative to the wall 3000 rather than being perpendicular to the wall 3000. However, because the difference in the lengths between the lower and upper portions 257, 2156 of the sidewall 2154 is small (i.e., 1-2 mm), the angle θ2 of the shelf 2100 relative to the wall 3000 may be between 85° and 89°, and more specifically between 87° and 89°. Of course, in other embodiments the shelf 2100 may be oriented perfectly or approximately perpendicular relative to the first surface 3011 of the wall 3000.

Figure 51:
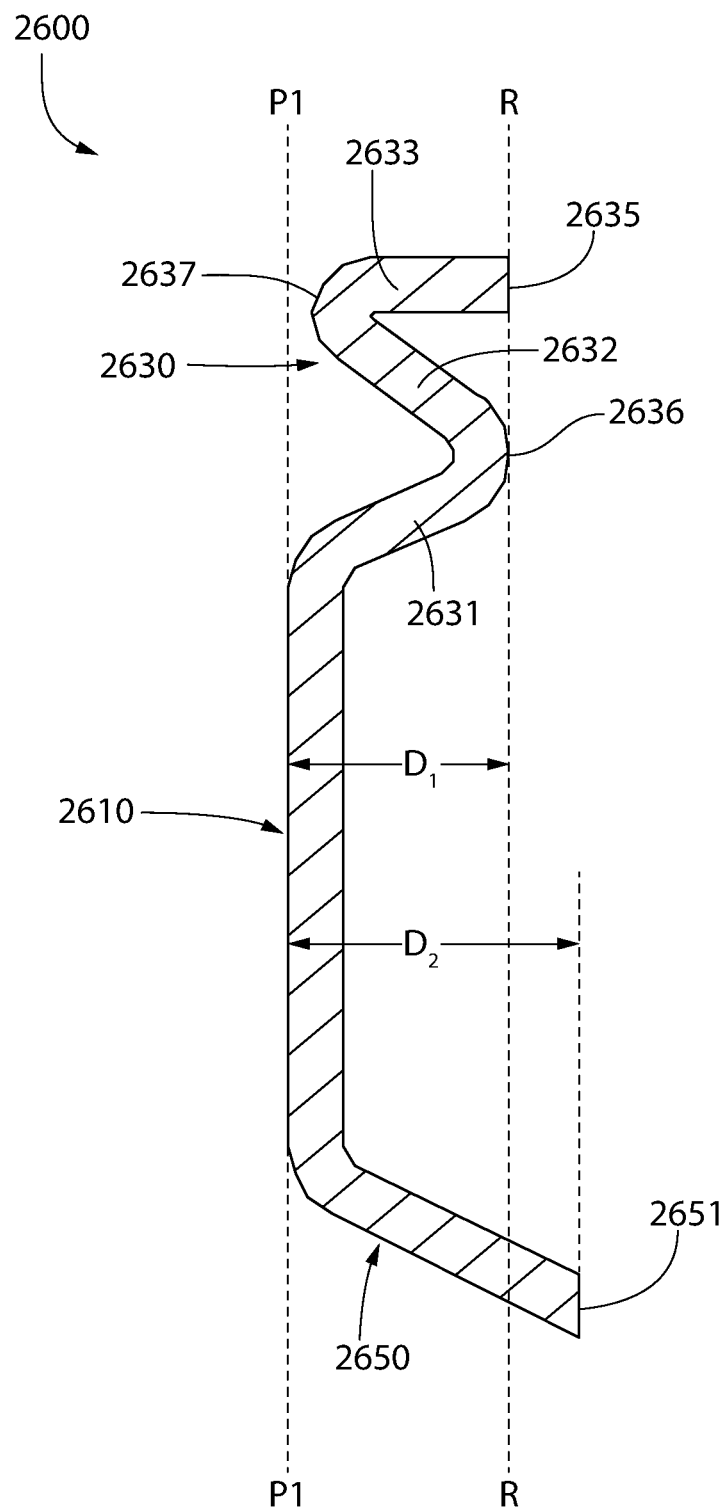
FIG. 51 is a cross-sectional view of a mounting bracket of the floating shelf apparatus taken along line LI-LI of FIG. 45 in accordance with an alternative embodiment of the present invention.

Referring now to FIG. 51, a mounting bracket 2600 is illustrated in accordance with an alternative embodiment of the present invention. The mounting bracket 2600 is very similar to the mounting bracket 2200 except for the differences described herein. Thus, the features and components of the mounting bracket 2600 will be similarly numbered to the mounting bracket 2200 except that the 2600-series of numbers will be used. For similarly numbered features, it should be appreciated that the description provided above with regard to the mounting bracket 2200 is applicable unless specifically stated otherwise herein.

The mounting bracket 2600 comprises a first portion 2610, a second portion 2630, and a third portion 2650. The second portion 2630 comprises a first leg 2631, a second leg 2632, and a third leg 2633. The first and second portions 2610, 2630 of the mounting bracket 2600 are identical to the first and second portions 2210, 2230 of the mounting bracket 2200. In this embodiment, the distal end 2635 of the third leg 2633 is aligned with the first bent portion 2636 (i.e., they lie in a common plane R-R). However, in this embodiment the distal end 2651 of the third mounting portion 2650 is not also aligned with the distal end 2635 of the third leg 2633. Rather, the third mounting portion 2650 extends through and beyond the plane R-R. Stated another way, in this embodiment the rear surface 2612 of the first portion 2610 of the mounting bracket 2600 lies in a plane P1-P1. The distal end 2635 of the third leg 2633 is located a first distance D1 from the plane P1-P1 and the distal end 2651 of the third portion 2650 is located a second distance D2 from the plane P1-P1, the second distance D2 being greater than the first distance D1. As can be seen, the first and second distances D1, D2 are measured in a direction that is perpendicular to the plane P1-P1.

Figure 52A:
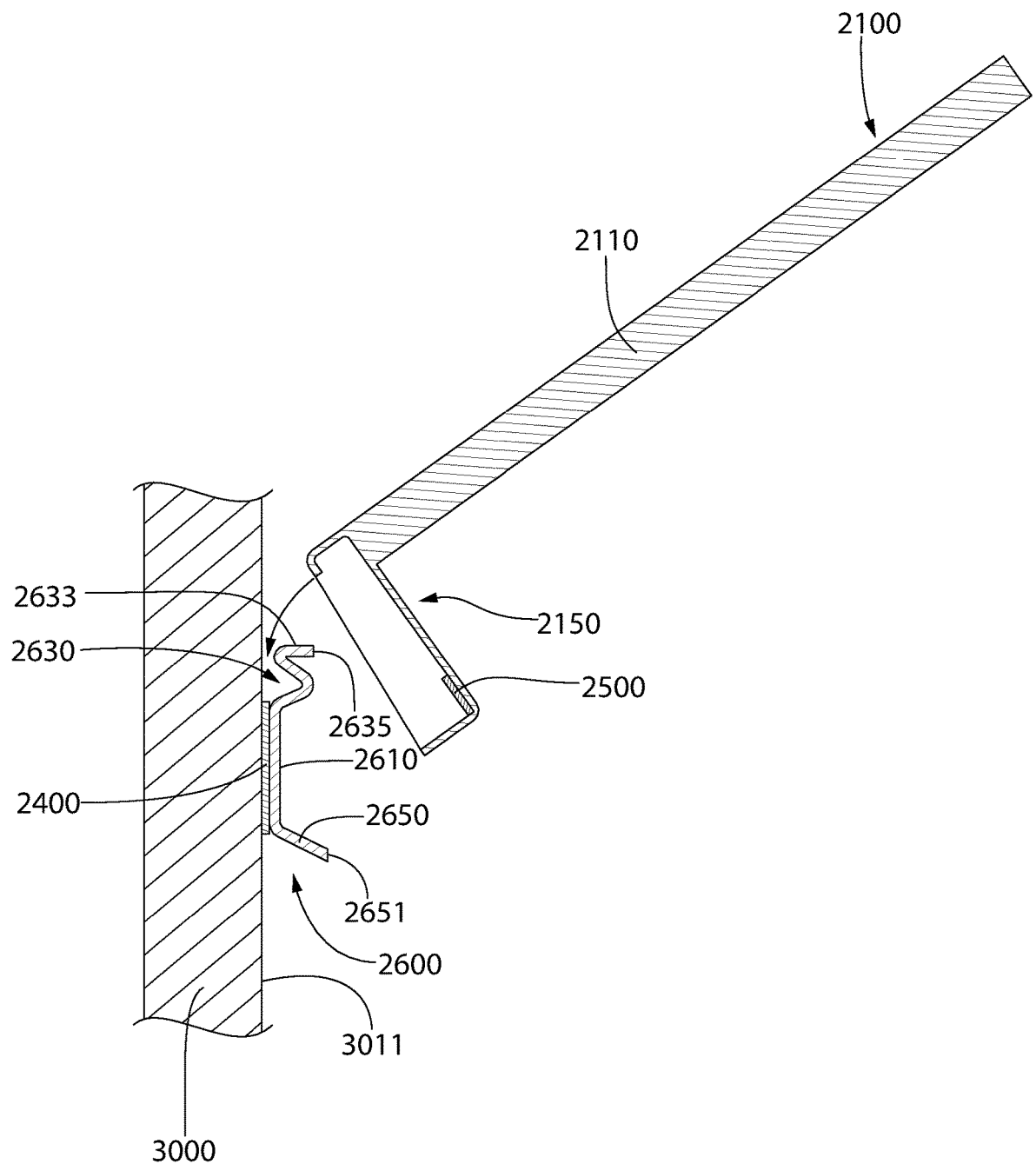
FIGS. 52A-52C are schematic cross-sectional views taken along line LII-LII of FIG. 46 illustrating the manner in which the shelf of FIG. 7 is mounted to the mounting bracket of FIG. 51.
Figure 52B:
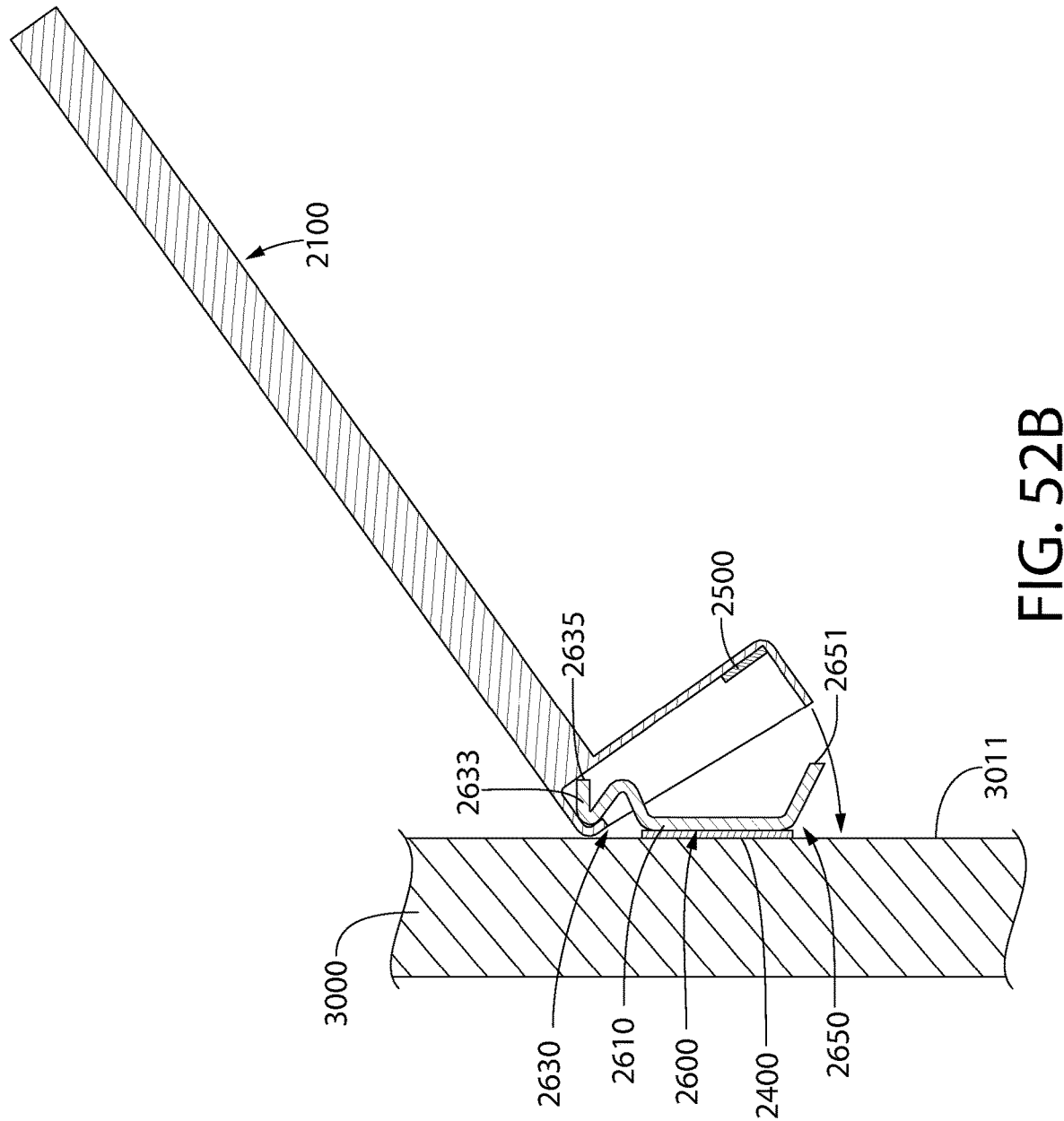
Figure 52C:
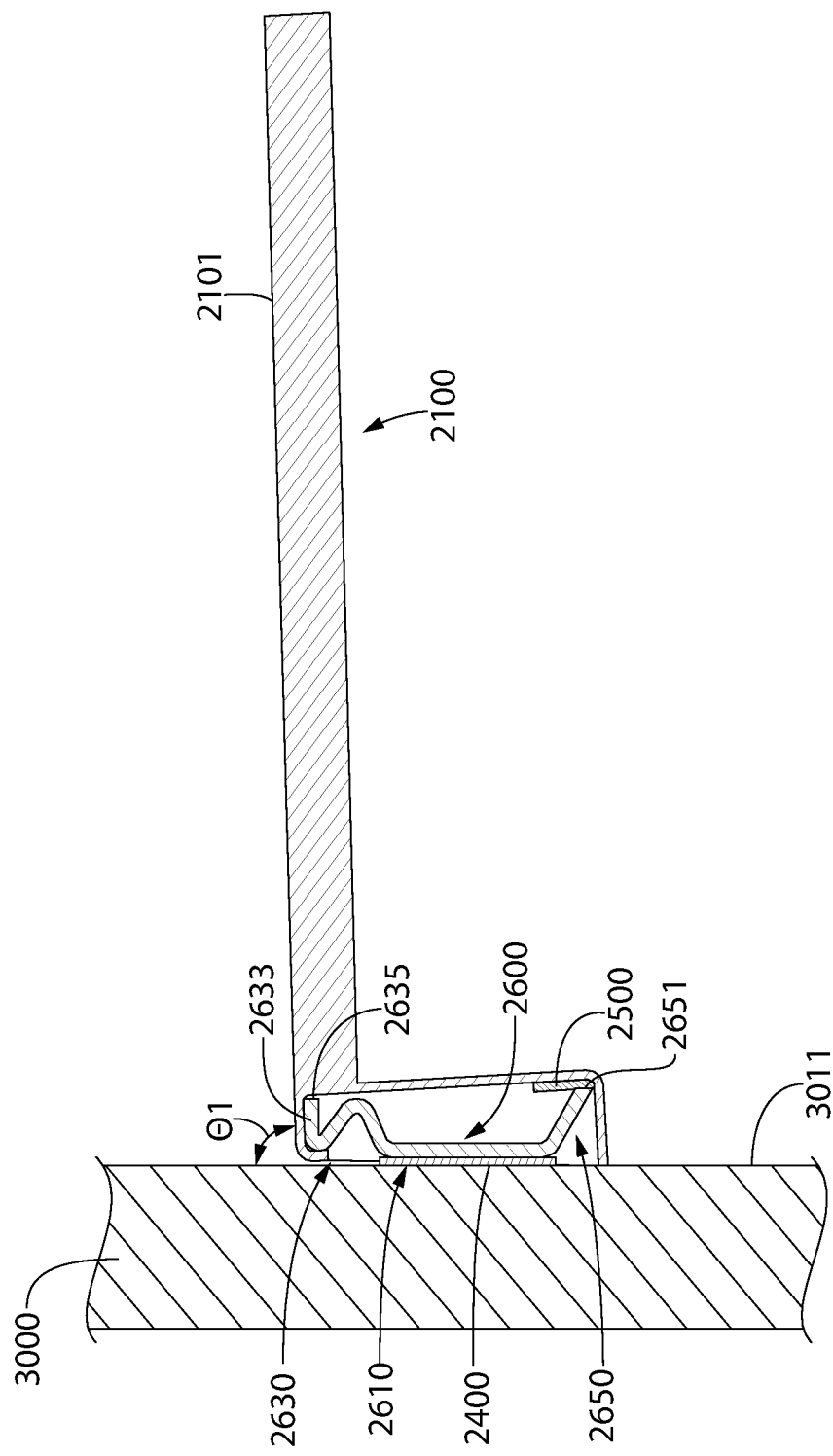

FIGS. 52A-52C illustrate the manner in which the shelf 2100 is mounted to the mounting bracket 2600. This process is identical to the process described above with regard to FIGS. 50A-50C and thus a detailed description will not be provided herein the interest of brevity, but rather the drawings can speak for themselves along with a review of the description of FIGS. 50A-50C. However, it will be mentioned that in FIGS. 52A-52C, the first adhesive component 2400 is illustrated between the mounting bracket 2600 and the wall 3000 and that the first adhesive component 2400 can be similarly positioned in the embodiment of FIGS. 50A-50C.

Furthermore, the only difference in FIGS. 52A-52C relative to that shown and described with reference to FIGS. 50A-50C is that because D2 is greater than D1, the top surface 2101 of the shelf 2100 may be at a slightly greater upwardly inclined angle relative to the wall 3000. Specifically, the distal end 2651 of the third portion 2650 of the mounting bracket 2600 being spaced further from the wall 3000 than the distal end 2635 of the third leg 2633 of the second portion 2630 of the mounting bracket 2600 may cause the top surface 2101 of the shelf 2100 to be angled relative to the wall 3000. The angle θ1 may be between 85° and 89° in some embodiments.

Figure 53:
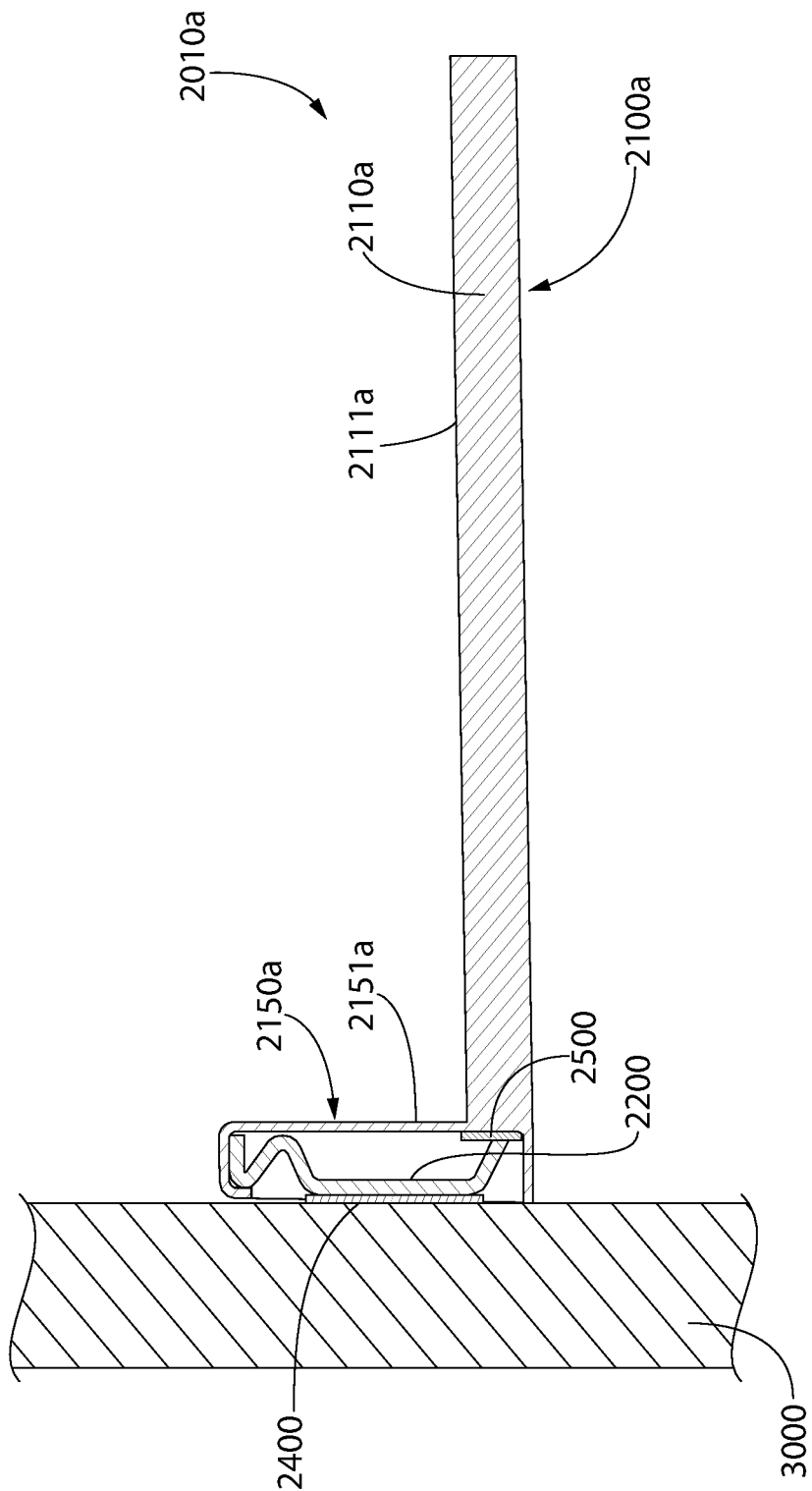
FIG. 53 is a cross-sectional view taken along line LIII-LIII of FIG. 46 in accordance with another embodiment of the present invention.

FIG. 53 illustrates an alternative embodiment of a floating shelf apparatus 2010a whereby the mounting bracket 2200 is used to mount a shelf 2100a to the wall 3000. Thus, the mounting bracket 2200 is the one previously described, but the shelf 2100a has a slightly different configuration. Specifically, in this embodiment the vertical wall 2151a of the mounting portion 2150a extends upwardly from the top surface 2111a of the ledge portion 2110a of the shelf 2100a rather than downwardly from the bottom surface as with the shelf 2100 that was previously described. Other than this minor difference, the shelf 2100a is identical to the shelf 1200 and thus the description provided above is applicable and the shelf 2100a will not be described in greater detail in the interest of brevity.

Figure 54:
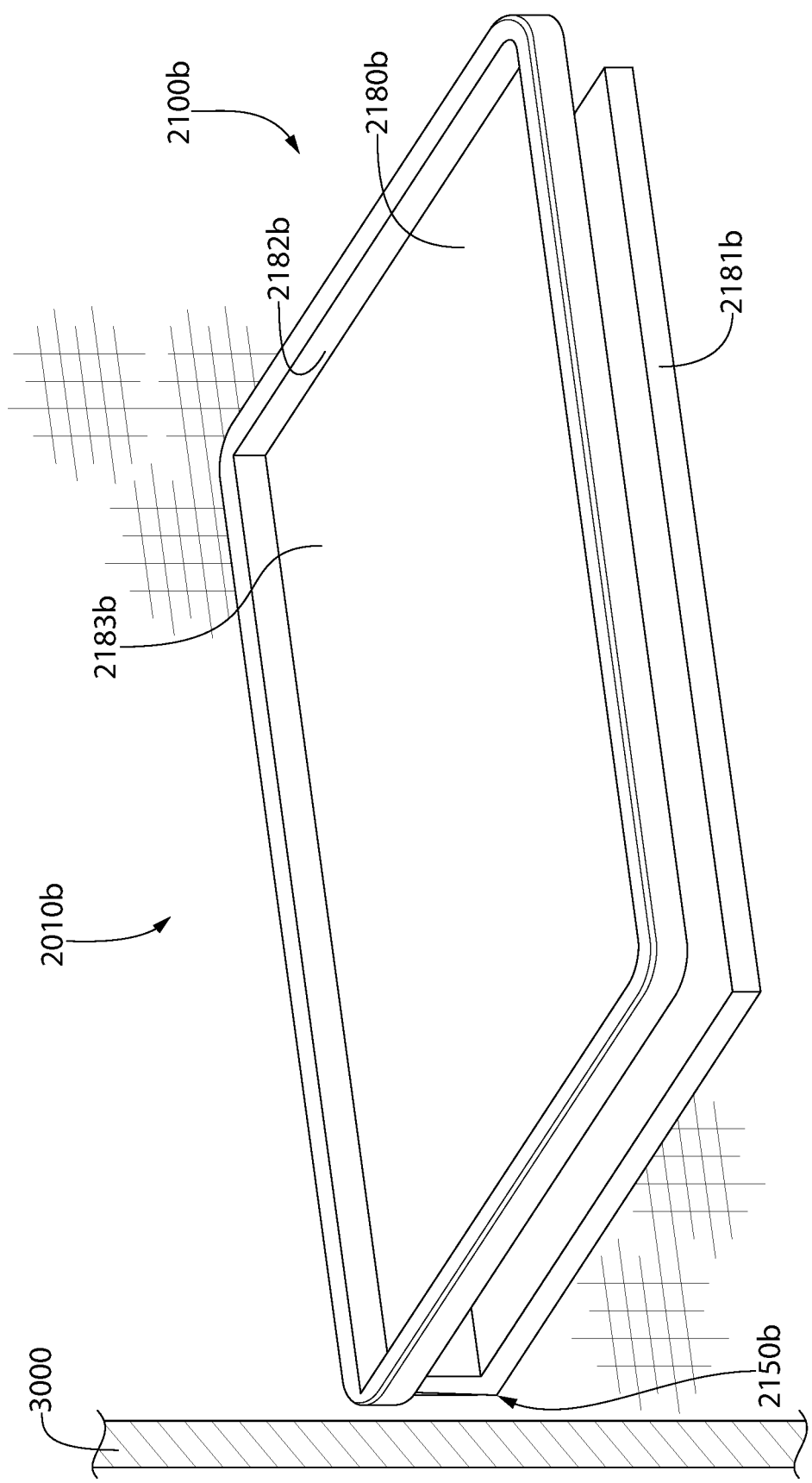
FIG. 54 is a perspective view of a floating shelf apparatus in accordance with another embodiment of the present invention.

Finally, referring to FIG. 54, a floating shelf apparatus 2010b is illustrated in still another embodiment in an assembled state. In this embodiment, the mounting bracket is not visible, but it should be appreciated that it may be identical to the mounting bracket 2200 or the mounting bracket 2600 previously described herein. In this embodiment, the floating shelf apparatus 2010b comprises a shelf 2100b that is different in structure than the shelves 2100, 2100a described previously. Specifically, in this embodiment the ledge portion 2110b of the shelf 2100b is two-tiered such that it includes an upper ledge 2180b and a lower ledge 2181b that are spaced apart from one another by a gap. The upper ledge 2180b comprises a top surface 2183b and a wall 2182b protruding upwardly from the top surface 2183b along the perimeter of the upper ledge 2180b. The wall 2182b may prevent items from rolling or falling off of the upper ledge 2180b. The mounting of the shelf 2100b to the mounting bracket 2200, 2600 is identical to that which has been described above. Thus, the shelf 2100b includes a mounting portion 2150b that is identical the mounting portion 2150 of the shelf 2100 described above.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A shelf support system comprising:
a perimeter frame formed by a plurality of side elements, at least one of the side elements configured to be mounted to a wall for supporting the perimeter frame in a cantilevered manner;
the perimeter frame defining an upwardly open receptacle;
a shelf insert at least partially positioned within the upwardly open receptacle, the perimeter frame circumscribing the shelf insert and at least partially concealing a side surface of the shelf insert, a top surface of the shelf insert being exposed;
wherein the top surface of the shelf insert extends perpendicularly from the wall when the perimeter frame is mounted to the wall; a force-distributing plate configured to be positioned against an outer surface of the wall, the force-distributing plate positioned between the wall and a rear side element of the plurality of side elements which is configured for fastening to the wall; and wherein the upwardly open receptacle is defined by the plurality of side elements and a floor, and wherein a bottom surface of the shelf insert abuts the floor of the upwardly open receptacle so that an entirety of the upwardly open receptacle is filled by the shelf insert.

2. The shelf support system of claim 1, wherein the shelf insert is completely inserted into the perimeter frame such that the side surface of the shelf insert is completely concealed by the plurality of side elements of the perimeter frame and the shelf insert does not extend laterally beyond the side elements.

3. The shelf support system according to claim 1, wherein the top surface of the shelf insert is flush with top edges of the side elements.

4. The shelf support system of claim 1, wherein the shelf insert has a monolithic unitary construction formed of a single material.

5. The shelf support system of claim 1, wherein the shelf insert has a composite construction comprising a lower core layer formed of a first material, and a veneered upper layer formed of a second material and which defines the top surface.

6. The shelf support system according to claim 1 further comprising an opening in the floor of the upwardly open receptacle through which a portion of the bottom surface of the shelf insert is exposed to facilitate removal of the shelf insert from the upwardly open receptacle by pushing the shelf insert in an upward direction towards and through a top opening of the upwardly open receptacle.

7. The shelf support system according to claim 1 wherein a rear side element of the plurality of side elements comprises at least one hole configured to receive a fastener for mounting the perimeter frame to the wall.

8. A mounting system for fastening an accessory to a wall, the mounting system comprising:
a support structure configured for mounting an accessory thereto, the support structure comprising a perimeter frame formed by a plurality of the side elements, wherein the support structure defines an upwardly open receptacle and a shelf insert is received in the upwardly open receptacle, the shelf insert having a top which does not extend beyond the side elements of the support structure;
a force-distributing plate configured to be positioned against an outer surface of the wall, the force-distributing plate positioned between the wall and a rear side element of the plurality of side elements which is configured for fastening to the wall;
a cover having a first rear face that contacts the outer surface of the wall and a second rear face that is offset from the first rear face and contacts an inner surface of the rear side element; and
a fastener that extends through the cover, the rear side element of the plurality of side elements, and the force-distributing plate, the fastener being configured to fasten the cover, the rear side element, and the force-distributing plate to the wall in stacked relationship.

9. The mounting system according to claim 8, wherein each of the plurality of side elements comprises a vertical portion and a horizontal portion, the vertical portions and the horizontal portions being substantially planar and intersecting to form perpendicular corners between adjacent vertical portions.

10. The mounting system according to claim 9, wherein the horizontal portions converge to define a central opening of the support structure.

11. The mounting system according to claim 8, wherein the top of the shelf insert is substantially flush with top edges of the side elements.

12. The mounting system according to claim 8 wherein the cover comprises a first section comprising the first rear surface, a second section comprising the second rear surface, and a ledge extending between the first and second sections that at least partially covers a gap the exists between the rear side element and the outer surface of the wall.

13. The mounting system according to claim 12 wherein the fastener extends through the second section of the cover.

14. The mounting system according to claim 12 wherein the first section of the cover does not overlap the second section of the cover.

15. The mounting system according to claim 8 wherein the rear side element of the plurality of side elements of the support structure is positioned between the force-distributing plate and the second rear surface of the cover.

16. The mounting system according to claim 15 wherein the second rear surface of the cover is in surface contact with the inner surface of the rear side element and the force-distributing plate is in surface contact with an outer surface of the rear side element.

17. The mounting system according to claim 8 wherein the force-distributing plate is positioned directly between the wall and the rear side element of the plurality of side elements of the support structure so that the force-distributing plate is in direct contact with the wall and the rear side element.

* * * * *